(12) United States Patent
Kandasamy

(10) Patent No.: US 12,350,740 B2
(45) Date of Patent: *Jul. 8, 2025

(54) PROCESSES AND/OR MACHINES FOR PRODUCING CONTINUOUS PLASTIC DEFORMATION, AND/OR COMPOSITIONS AND/OR MANUFACTURES PRODUCED THEREBY

(71) Applicant: Kumar Kandasamy, Blacksburg, VA (US)

(72) Inventor: Kumar Kandasamy, Blacksburg, VA (US)

( * ) Notice: Subject to any disclaimer, the term of this patent is extended or adjusted under 35 U.S.C. 154(b) by 46 days.

This patent is subject to a terminal disclaimer.

(21) Appl. No.: 18/197,137

(22) Filed: May 15, 2023

(65) Prior Publication Data
US 2023/0311210 A1    Oct. 5, 2023

Related U.S. Application Data

(63) Continuation of application No. PCT/US2022/018441, filed on Mar. 2, 2022, and a
(Continued)

(51) Int. Cl.
*B23K 20/12*    (2006.01)
*B21C 23/00*    (2006.01)
(Continued)

(52) U.S. Cl.
CPC .............. *B22F 10/22* (2021.01); *B21C 23/00* (2013.01); *B22D 11/00* (2013.01); *B22F 9/04* (2013.01);
(Continued)

(58) Field of Classification Search
CPC ......... B21C 25/02; B21C 25/04; B21C 27/00; B21C 29/02; B21C 31/00; B21C 37/045; B21C 23/00; B21C 23/001; B21C 23/002; B21C 23/205; B21C 23/211; B21C 23/217; B21J 5/063; B21J 5/00; B22F 10/18; B22F 2999/00; B22F 10/22; B22F 9/04;
(Continued)

(56) References Cited

U.S. PATENT DOCUMENTS 8,397,974 B2    3/2013    Schultz
8,632,850 B2    1/2014    Schultz
(Continued)

FOREIGN PATENT DOCUMENTS

CN    109571707 A  *  4/2019  ............. B28B 1/001
CN    111873411        11/2020
(Continued)

*Primary Examiner* — Kiley S Stoner
(74) *Attorney, Agent, or Firm* — Michael Haynes PLC; Michael N. Haynes

(57) ABSTRACT

Certain exemplary embodiments can provide a manufacturing method, process, machine, and/or system for continuously consolidating granular materials, creating new alloys and/or composites, and/or modifying and/or refining material microstructure, by using plastic deformation of feedstock(s) provided in various structural forms. Materials produced during this process can be fabricated directly and/or in forms such as, e.g., wires, rods, tubes, sheets, plate and/or channels, etc.

52 Claims, 55 Drawing Sheets

Related U.S. Application Data continuation of application No. 17/684,655, filed on Mar. 2, 2022, now Pat. No. 11,691,201.

(60) Provisional application No. 63/156,497, filed on Mar. 4, 2021.

(51) Int. Cl.

| | | |
|---|---|---|
| *B22D 11/00* | (2006.01) | |
| *B22F 9/04* | (2006.01) | |
| *B22F 10/22* | (2021.01) | |
| *B22F 12/53* | (2021.01) | |
| *B22F 12/55* | (2021.01) | |
| *B22F 12/58* | (2021.01) | |
| *B28B 3/26* | (2006.01) | |
| *B29C 41/04* | (2006.01) | |
| *B33Y 10/00* | (2015.01) | |
| *B33Y 30/00* | (2015.01) | |
| *B33Y 40/10* | (2020.01) | |
| *B21J 5/00* | (2006.01) | |

(52) U.S. Cl.
CPC .............. *B22F 12/53* (2021.01); *B22F 12/55* (2021.01); *B22F 12/58* (2021.01); *B23K 20/122* (2013.01); *B28B 3/2609* (2013.01); *B29C 41/045* (2013.01); *B33Y 10/00* (2014.12); *B33Y 30/00* (2014.12); *B33Y 40/10* (2020.01); *B21J 5/00* (2013.01); *B22F 2009/041* (2013.01); *B22F 2998/10* (2013.01)

(58) Field of Classification Search
CPC .......... B22F 12/53; B22F 12/55; B22F 12/58; B22F 2009/041; B22F 2998/10; B23K 20/12–1295; B22D 11/00; B28B 3/2609; B29C 41/045; B33Y 10/00; B33Y 30/00; B33Y 40/10
USPC ............................. 228/112.1–114.5, 2.1–2.3
See application file for complete search history.

(56) References Cited

U.S. PATENT DOCUMENTS

| | | |
|---|---|---|
| 8,636,194 B2 | 1/2014 | Schultz |
| 8,875,976 B2 | 11/2014 | Schultz |
| 8,893,954 B2 | 11/2014 | Schultz |
| 9,205,578 B2 | 12/2015 | Schultz |
| 9,266,191 B2 | 2/2016 | Kandasamy |
| 9,511,445 B2 | 12/2016 | Kandasamy |
| 9,511,446 B2 | 12/2016 | Kandasamy |
| 9,643,279 B2 | 5/2017 | Schultz |
| 9,862,054 B2 | 1/2018 | Kandasamy |
| 9,943,929 B2 | 4/2018 | Schultz |
| 10,105,790 B2 | 10/2018 | Kandasamy |
| 10,500,674 B2 | 12/2019 | Kandasamy |
| 10,583,631 B2 | 3/2020 | Kandasamy |
| 11,311,959 B2 | 4/2022 | Hardwick |
| 11,845,220 B2 * | 12/2023 | Mu ..................... B29C 64/295 |
| 11,890,807 B1 * | 2/2024 | Luick ................... B29C 64/214 |
| 2003/0042292 A1 | 3/2003 | Hatten |
| 2008/0006678 A1 | 1/2008 | Packer |
| 2009/0152328 A1 | 6/2009 | Okamoto |
| 2009/0200275 A1 | 8/2009 | Twelves |
| 2011/0266330 A1 | 11/2011 | Bruck |
| 2016/0175982 A1 | 6/2016 | Kandasamy |
| 2017/0122322 A1 | 5/2017 | Zinniel |
| 2020/0306869 A1 | 10/2020 | Hardwick |
| 2021/0078258 A1 | 3/2021 | Lalande |
| 2021/0197457 A1 | 7/2021 | Broach |
| 2021/0245293 A1 | 8/2021 | Hardwick |
| 2021/0308937 A1 | 10/2021 | Broach |
| 2022/0080522 A1 | 3/2022 | Cox |
| 2022/0176633 A1 | 6/2022 | Hardwick |
| 2024/0100624 A1 * | 3/2024 | Hardwick ............ B23K 20/124 |

FOREIGN PATENT DOCUMENTS

| | | | | |
|---|---|---|---|---|
| EP | 3028841 A1 * | 6/2016 | ............ | B01D 46/00 |
| EP | 3740369 | 11/2020 | | |
| JP | H11207772 | 8/1999 | | |
| JP | 2000029540 | 1/2000 | | |
| JP | 2000059980 | 2/2000 | | |
| JP | 2001191394 | 7/2001 | | |
| JP | 2004025296 | 1/2004 | | |
| NL | 2028068 | 11/2022 | | |
| WO | WO-2017194792 A1 * | 11/2017 | ......... | B23K 20/1245 |
| WO | WO-2019141606 A1 * | 7/2019 | ............ | B29B 7/424 |
| WO | WO-2019149546 A1 * | 8/2019 | ............ | B29C 64/10 |

* cited by examiner

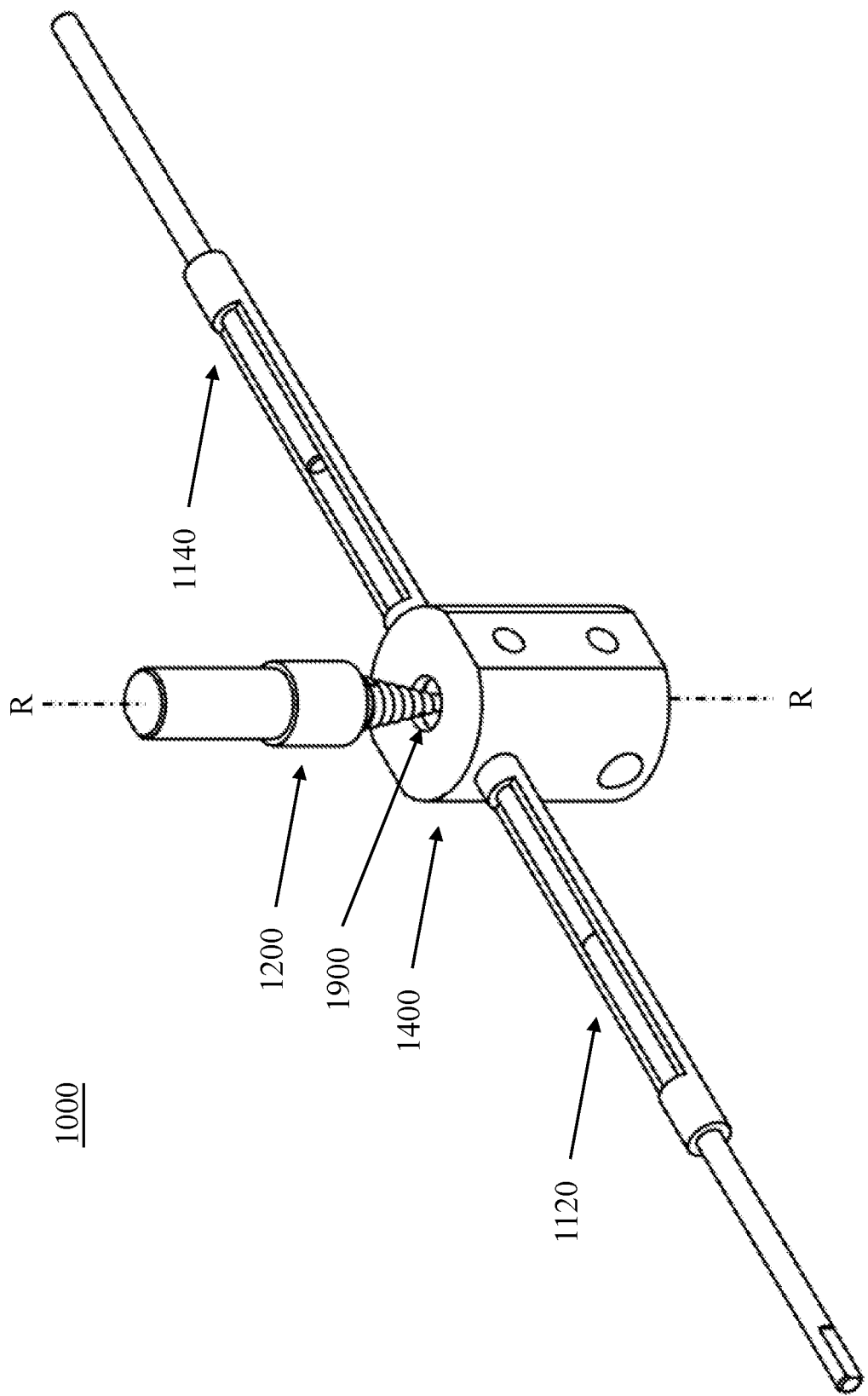

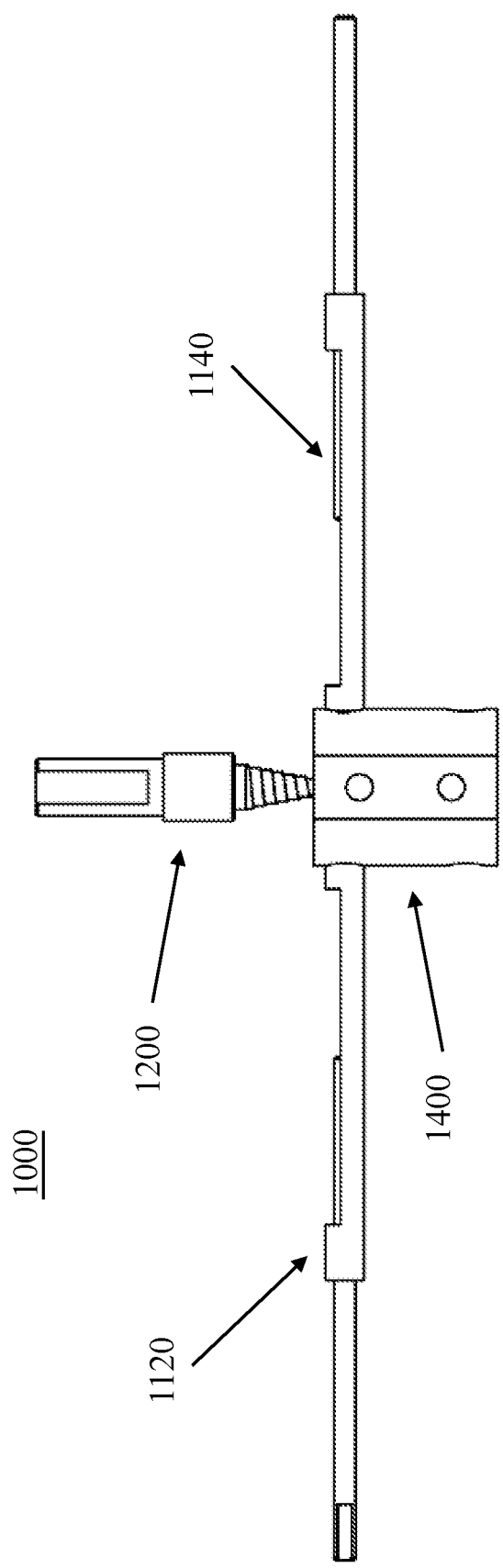
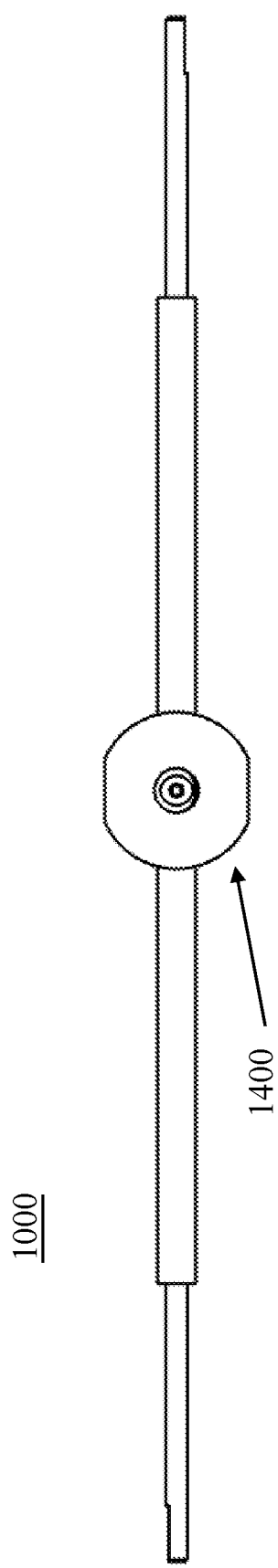

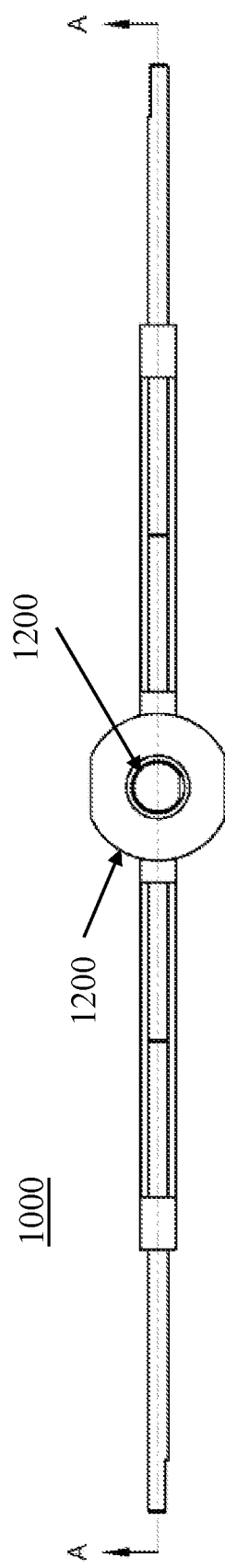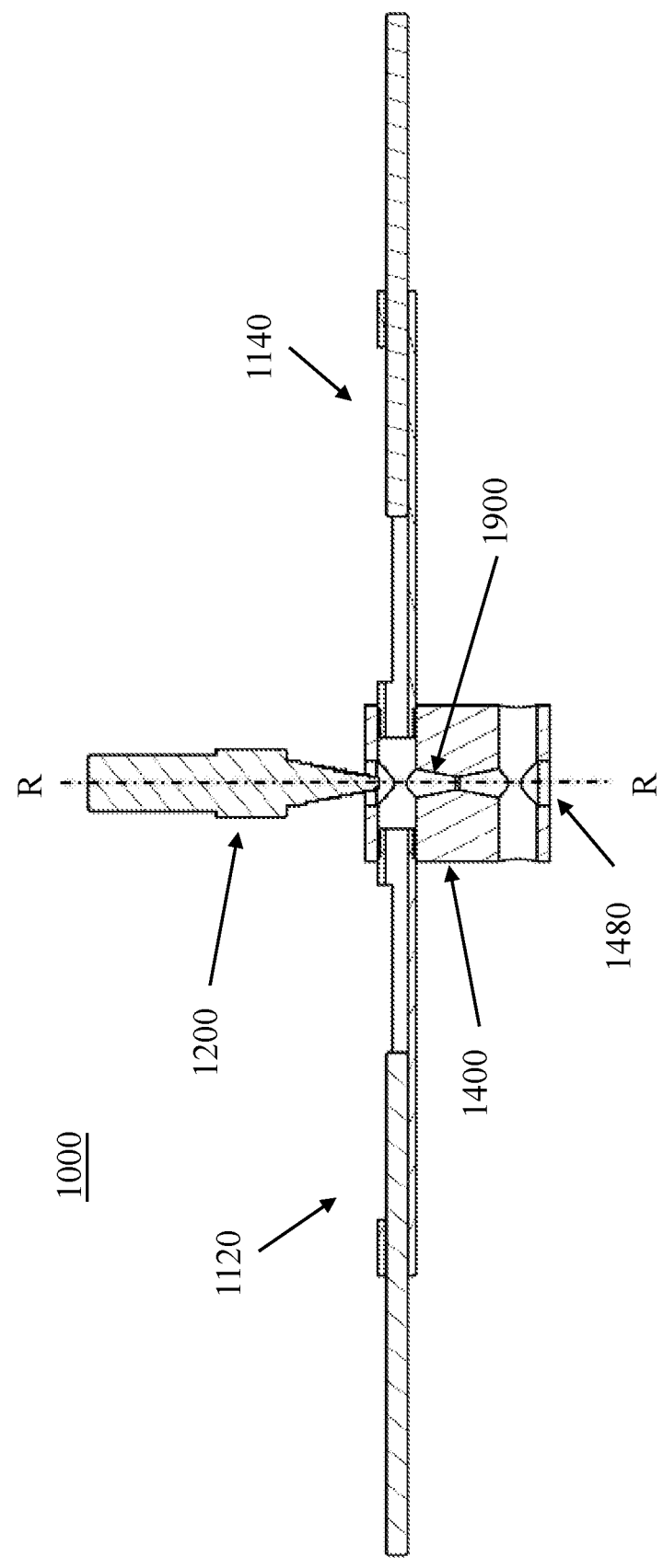
FIG. 4
FIG. 5

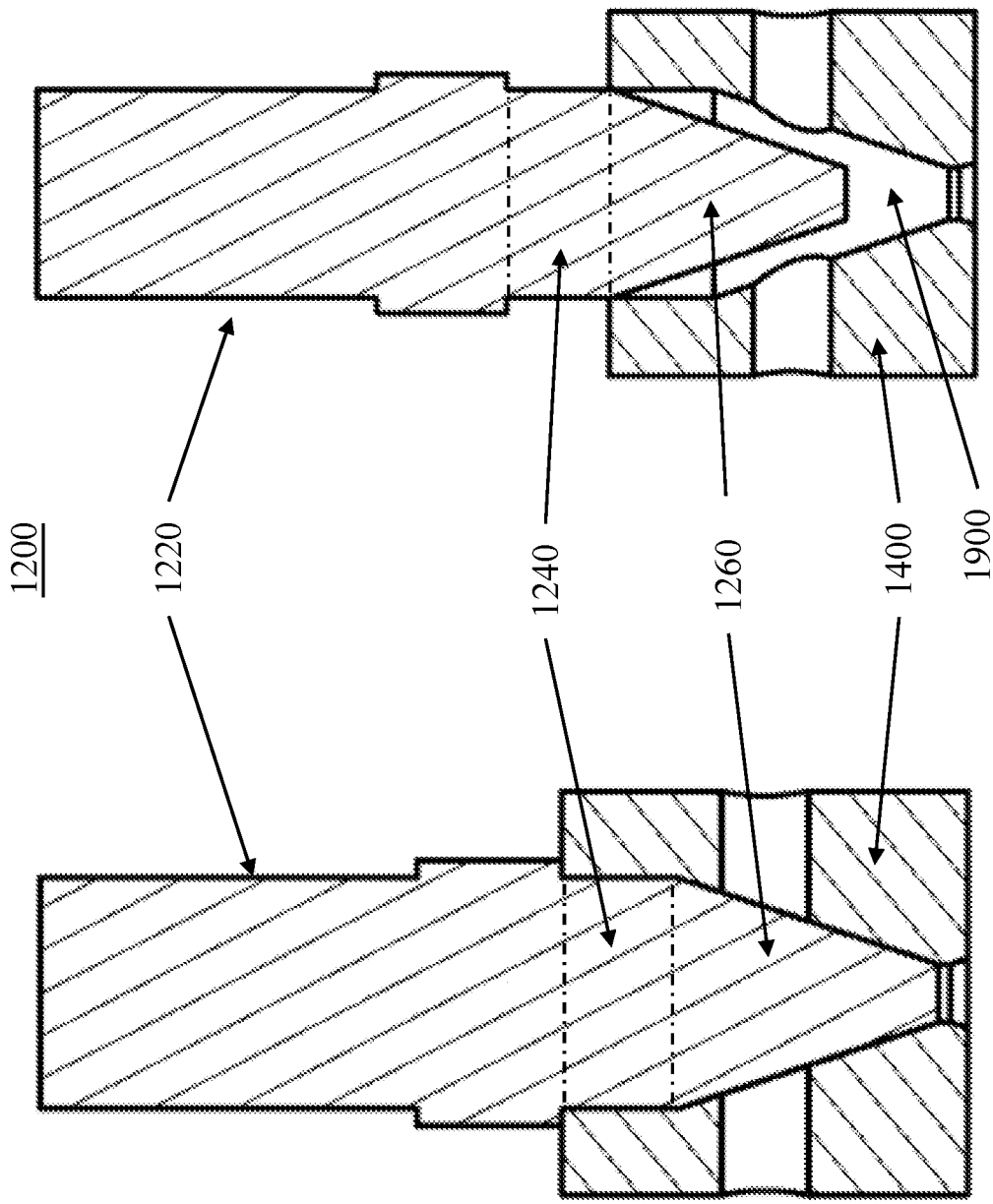

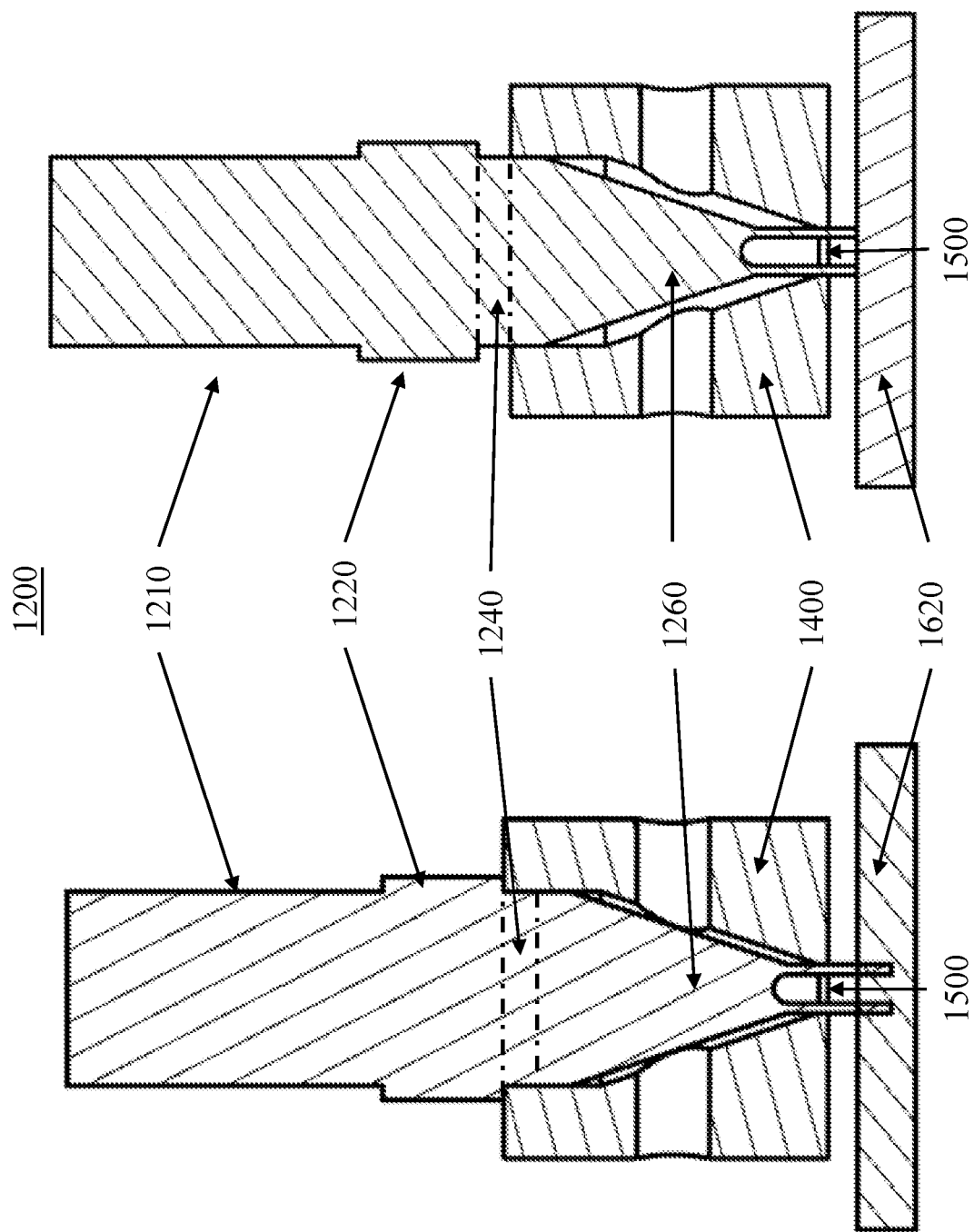

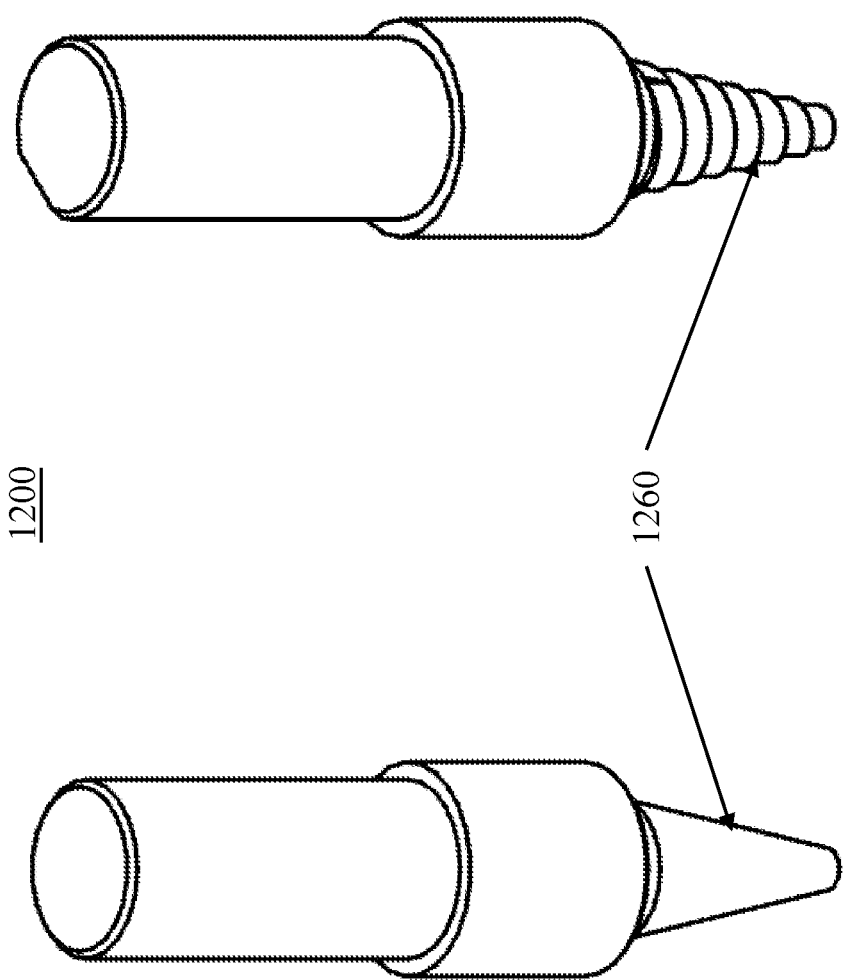

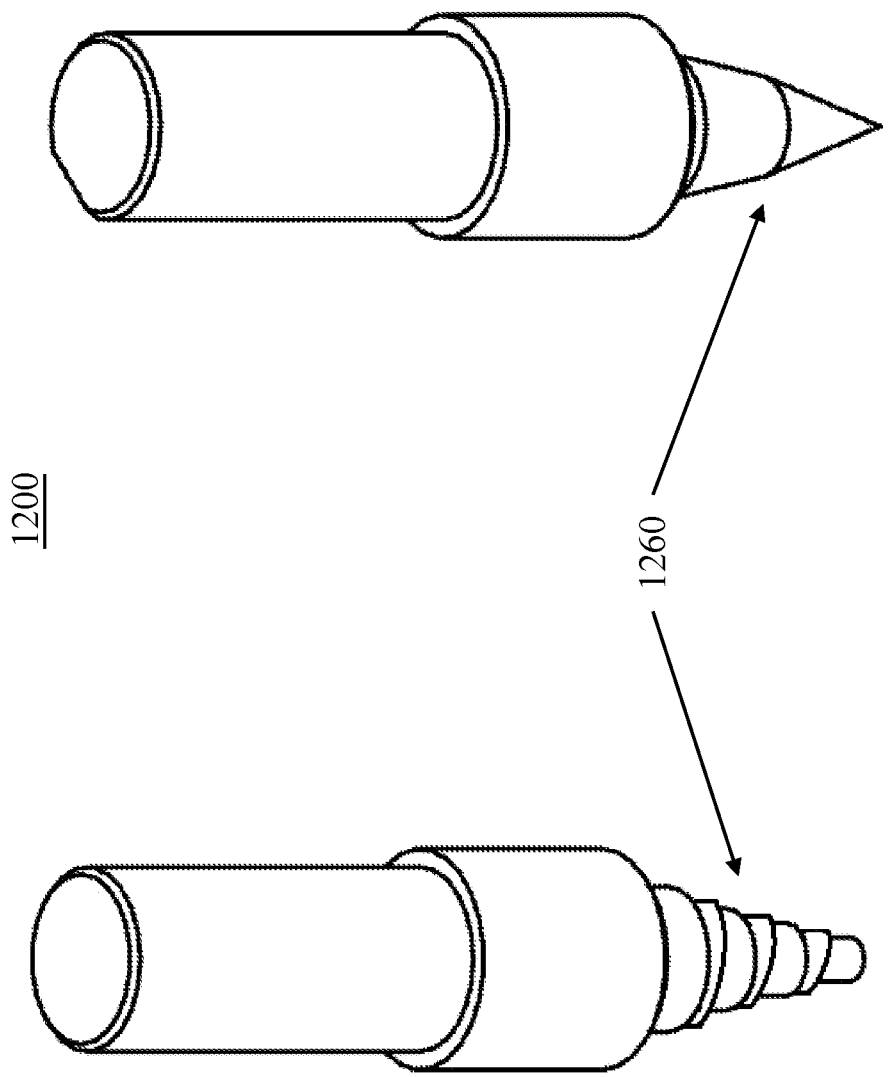

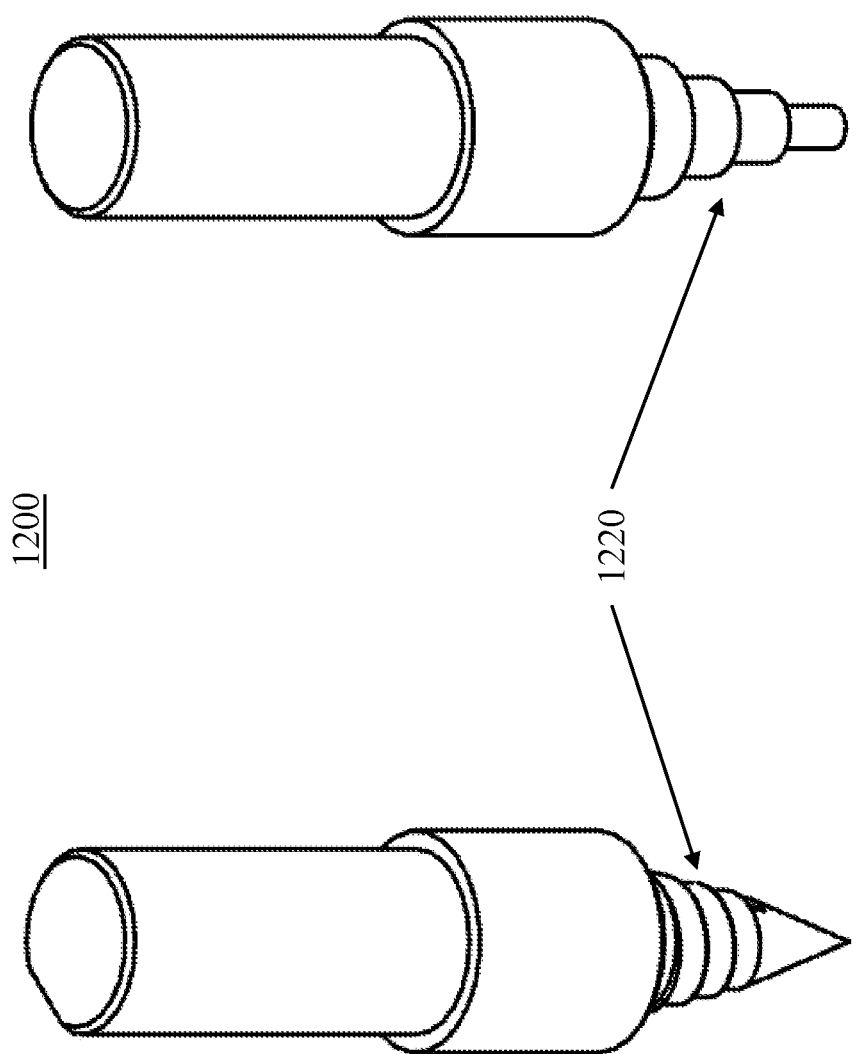

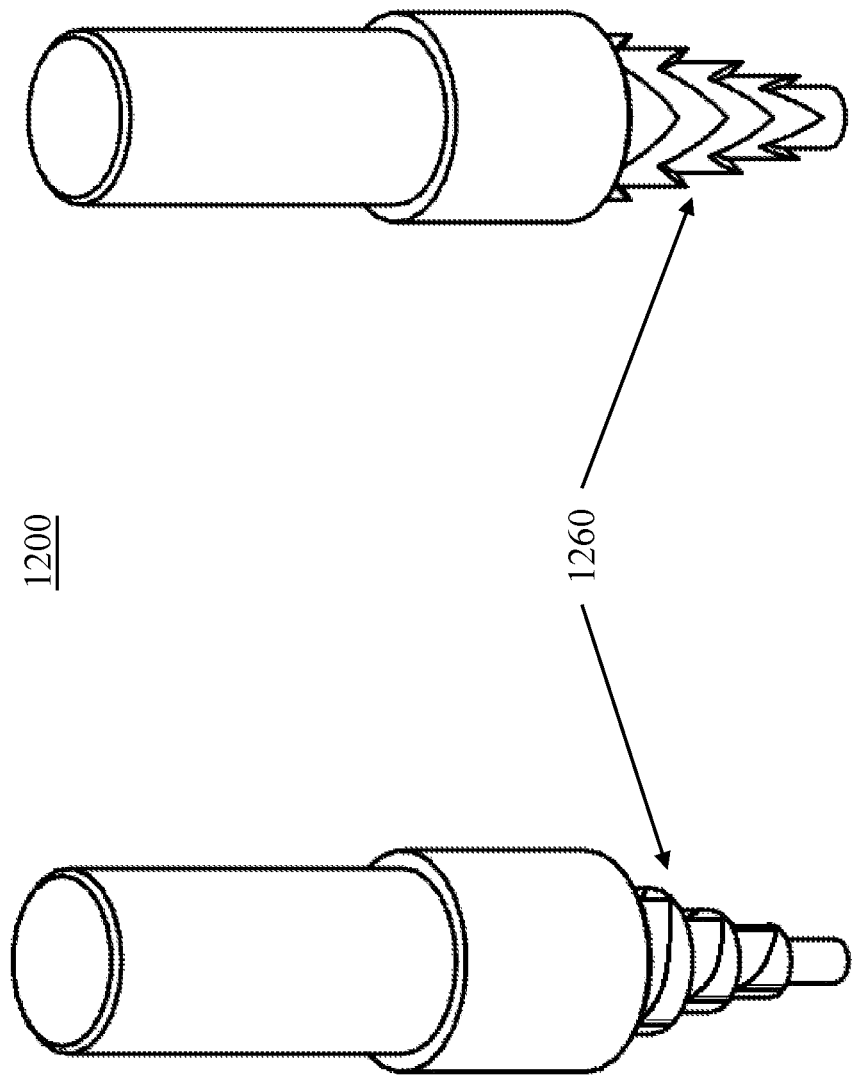

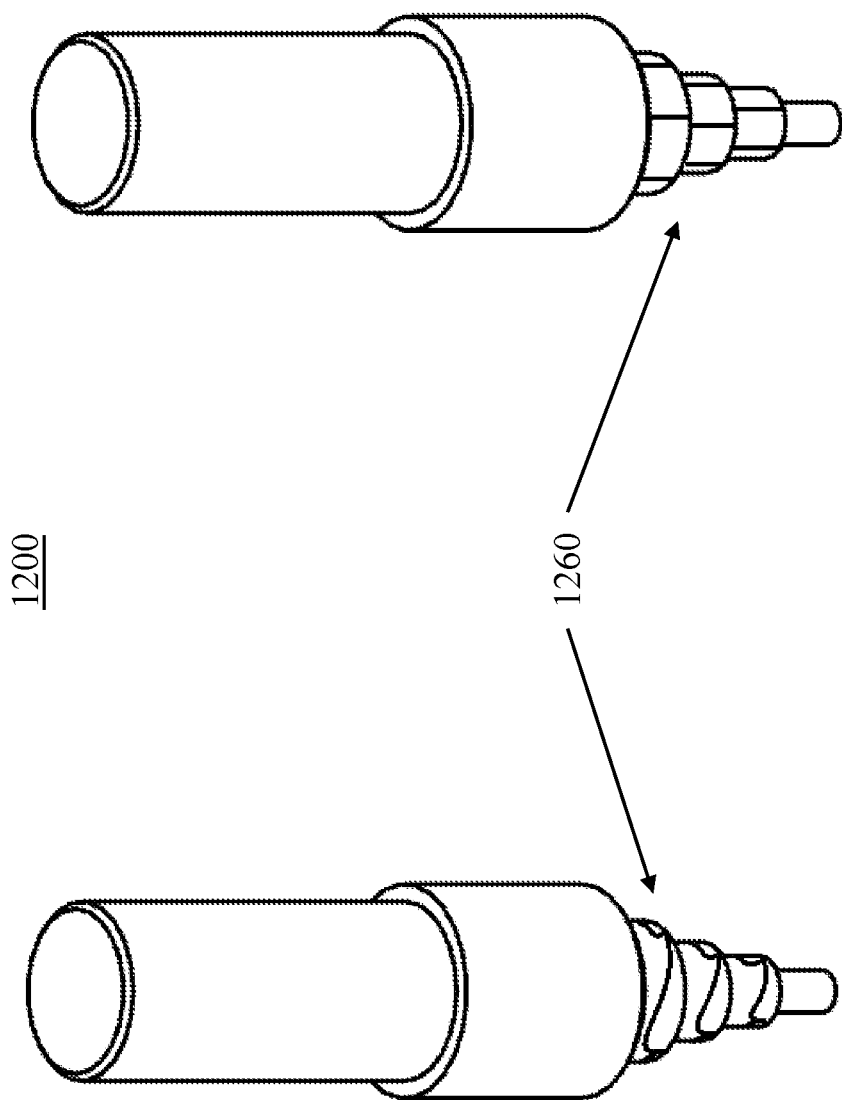

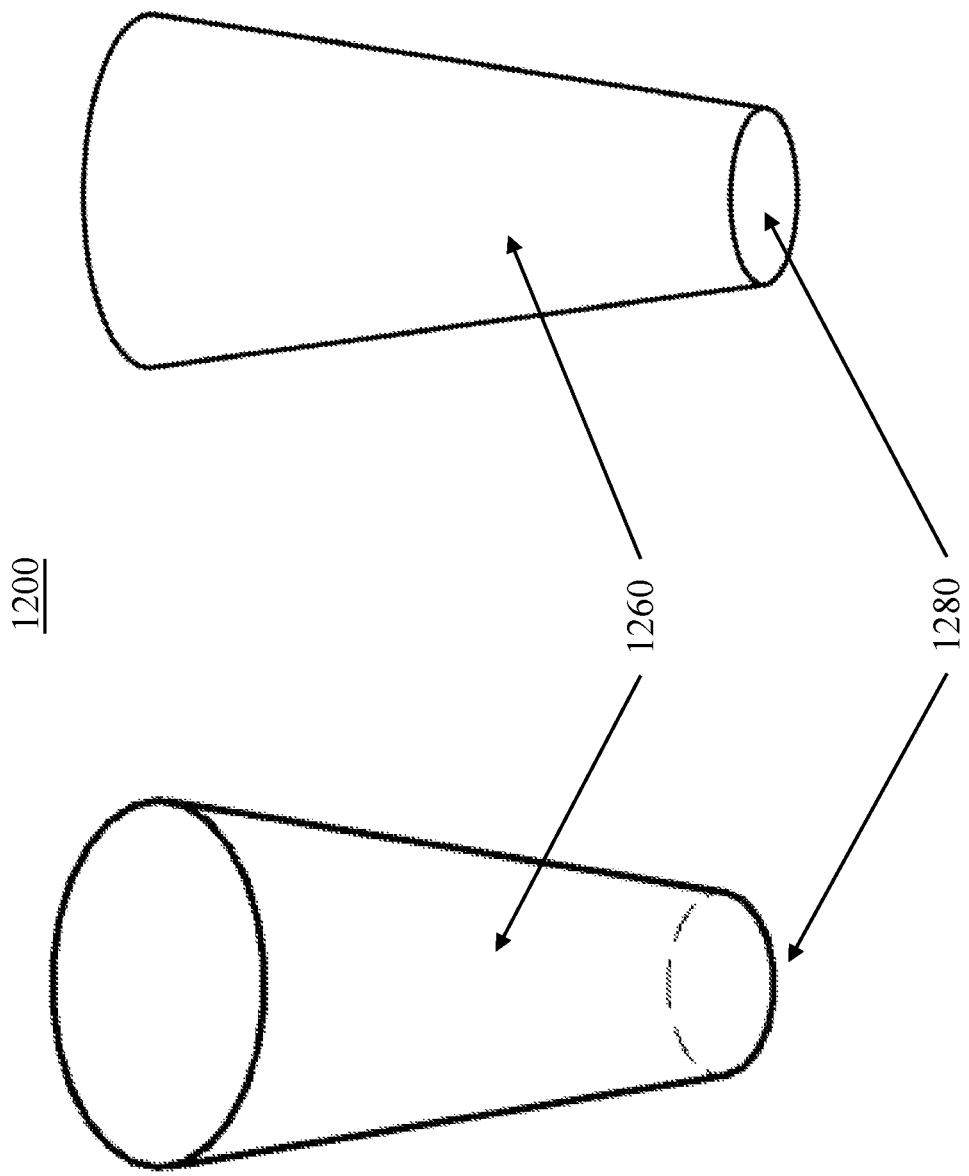

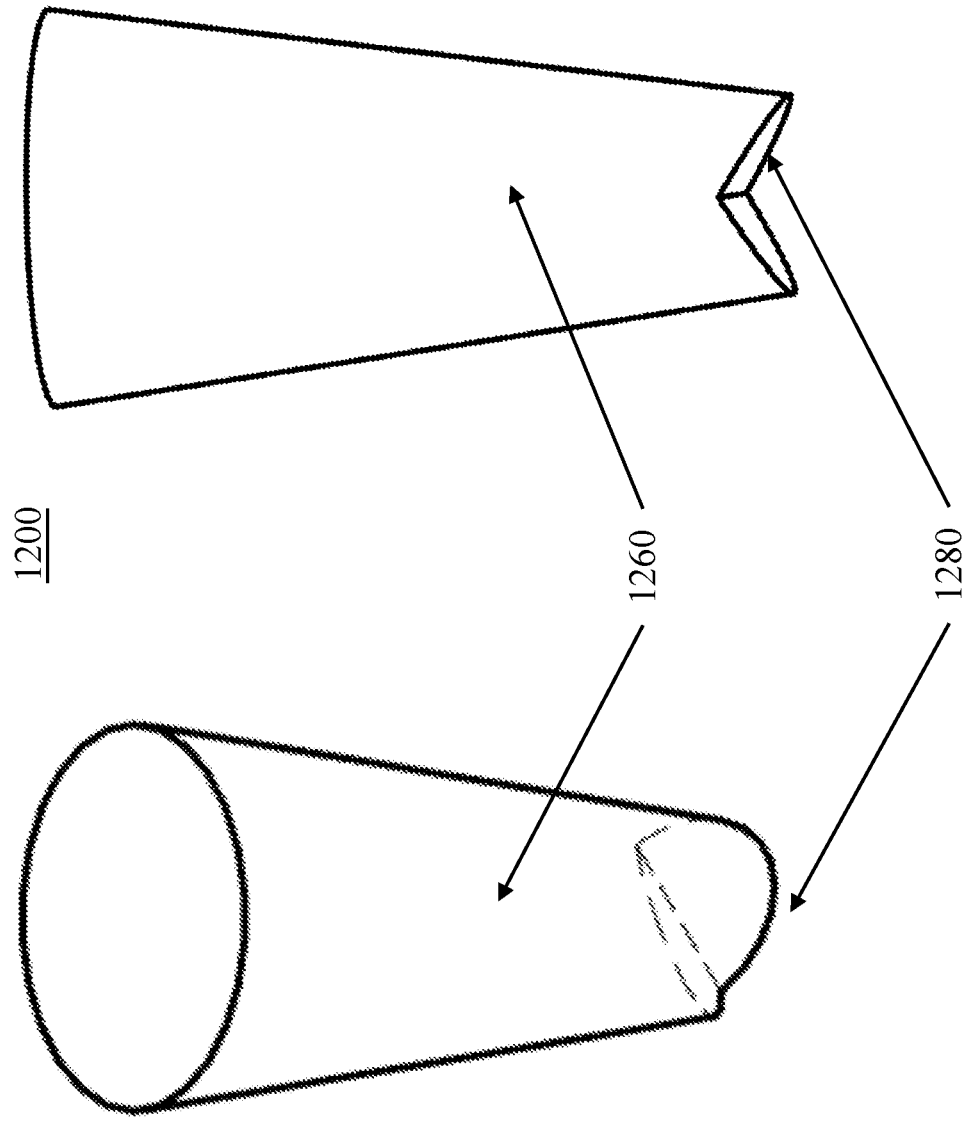

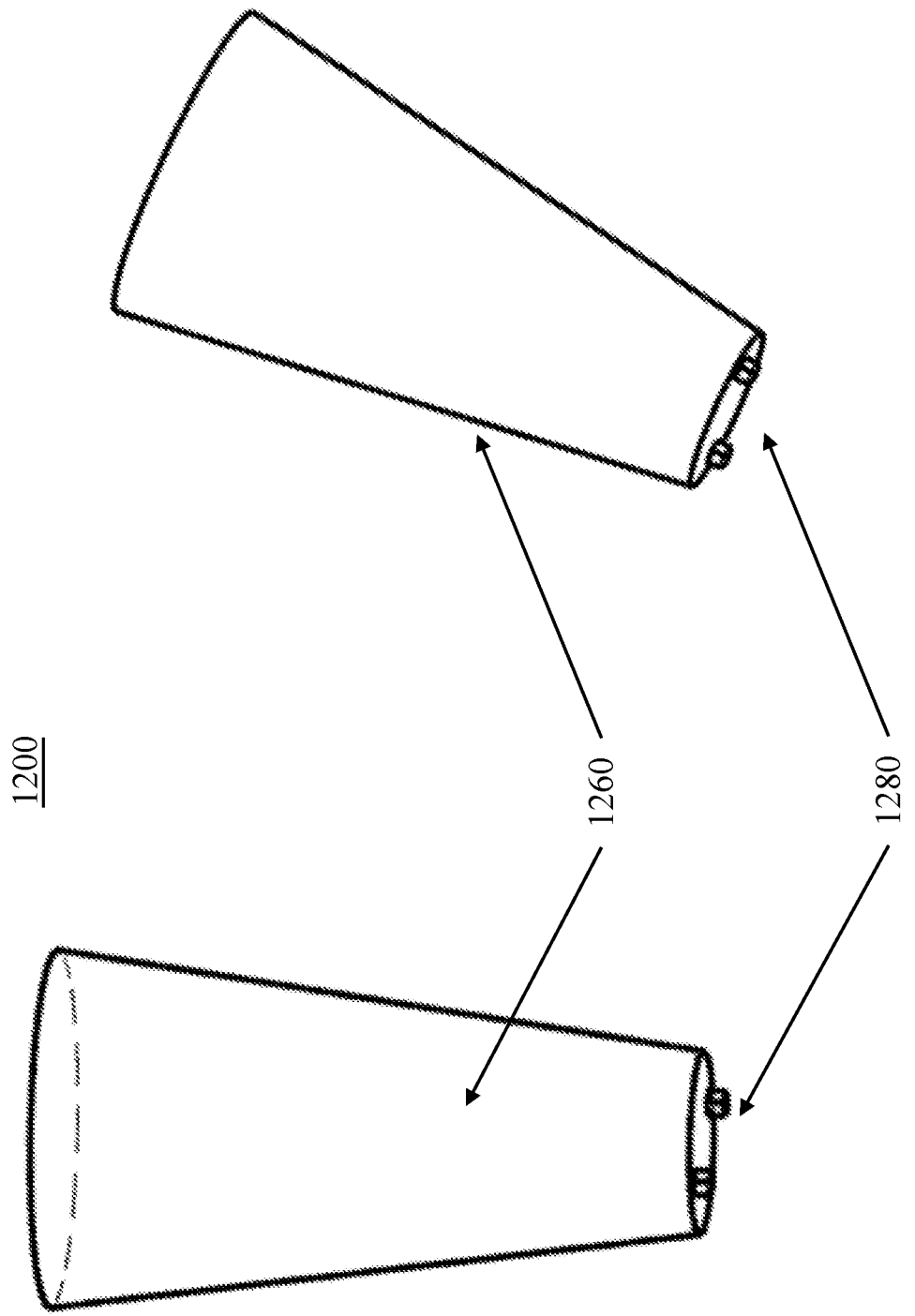

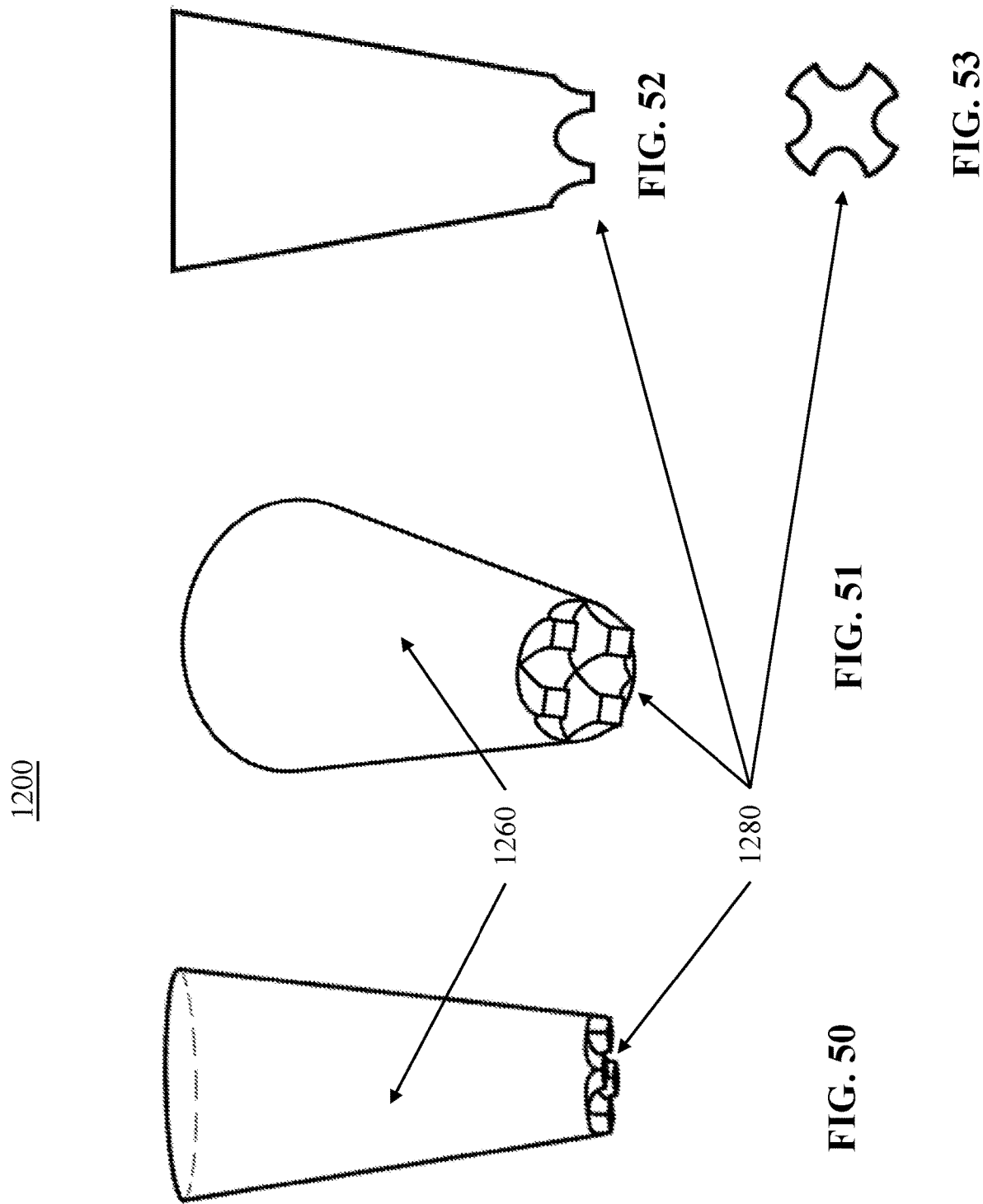

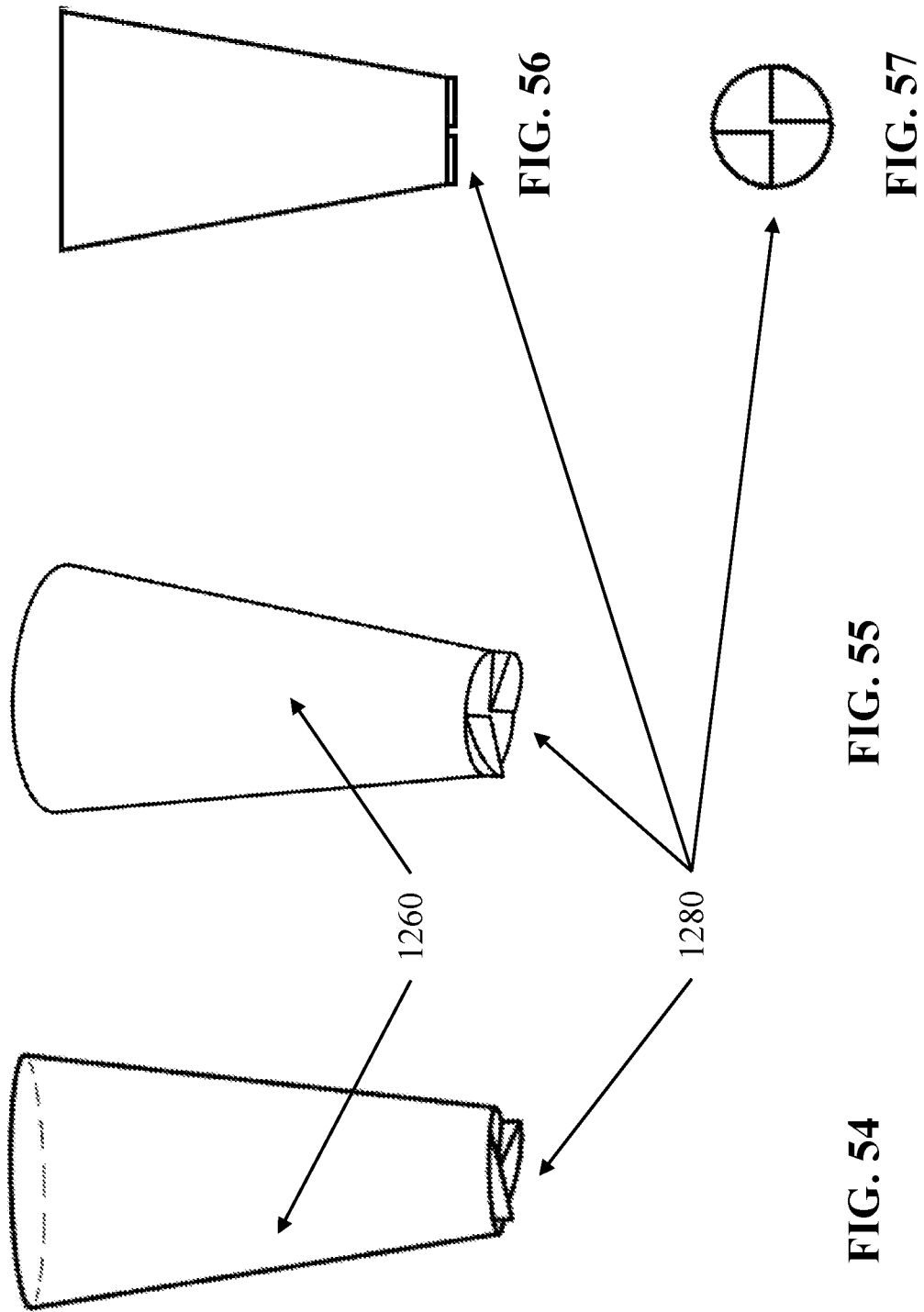

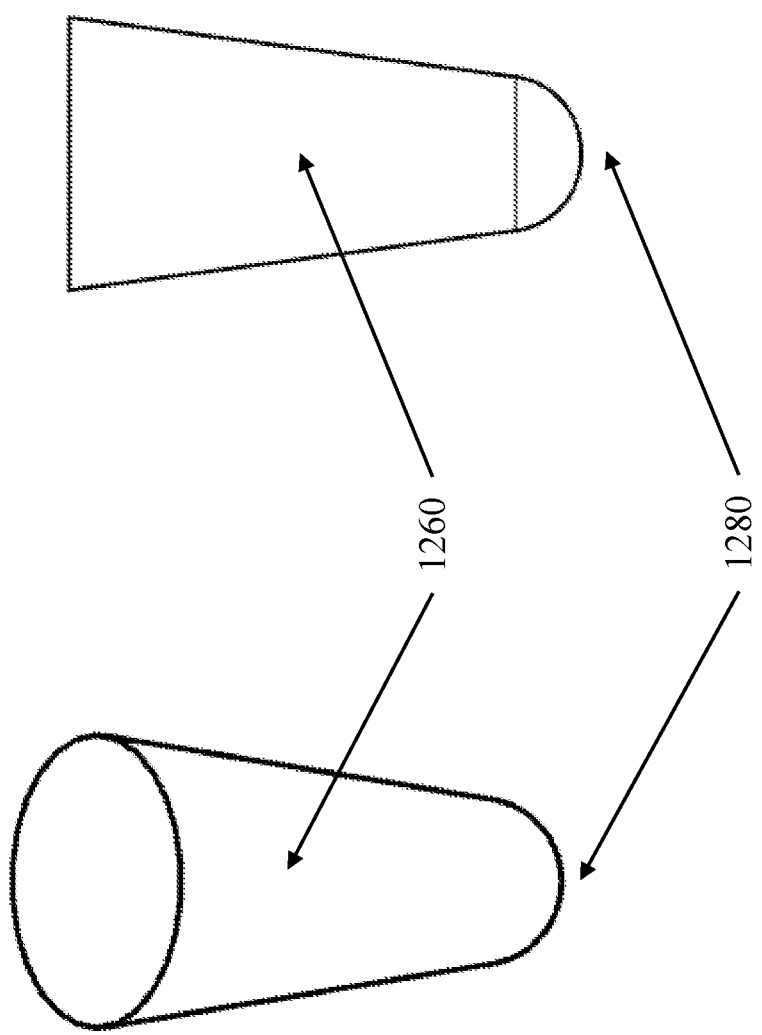

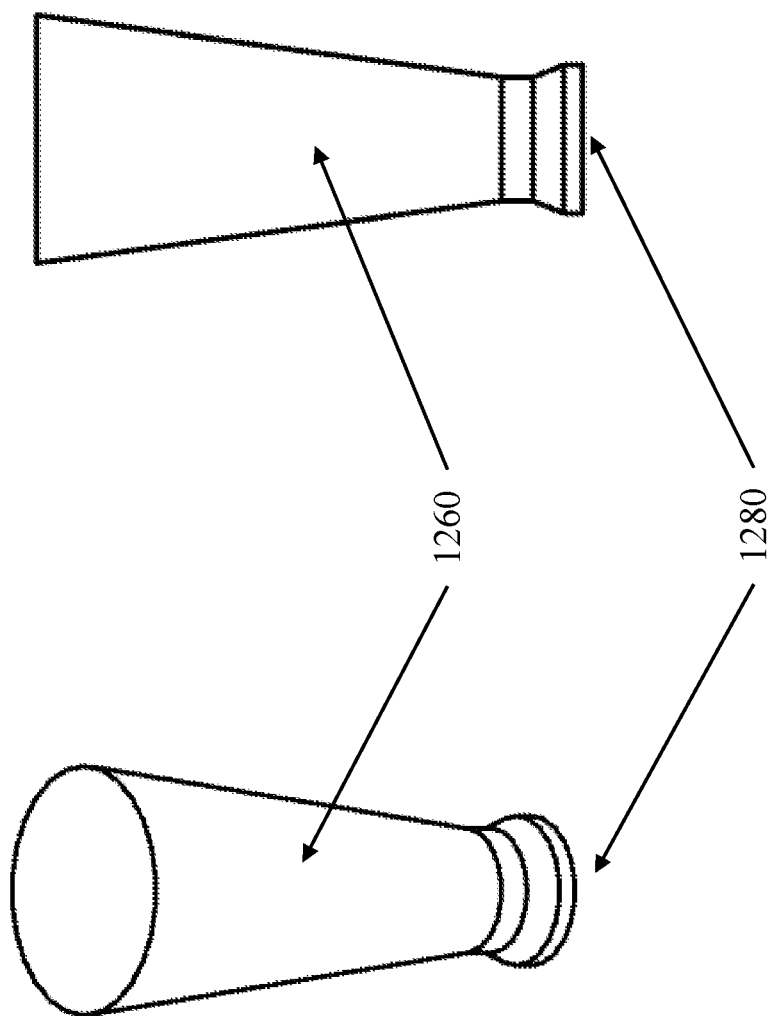

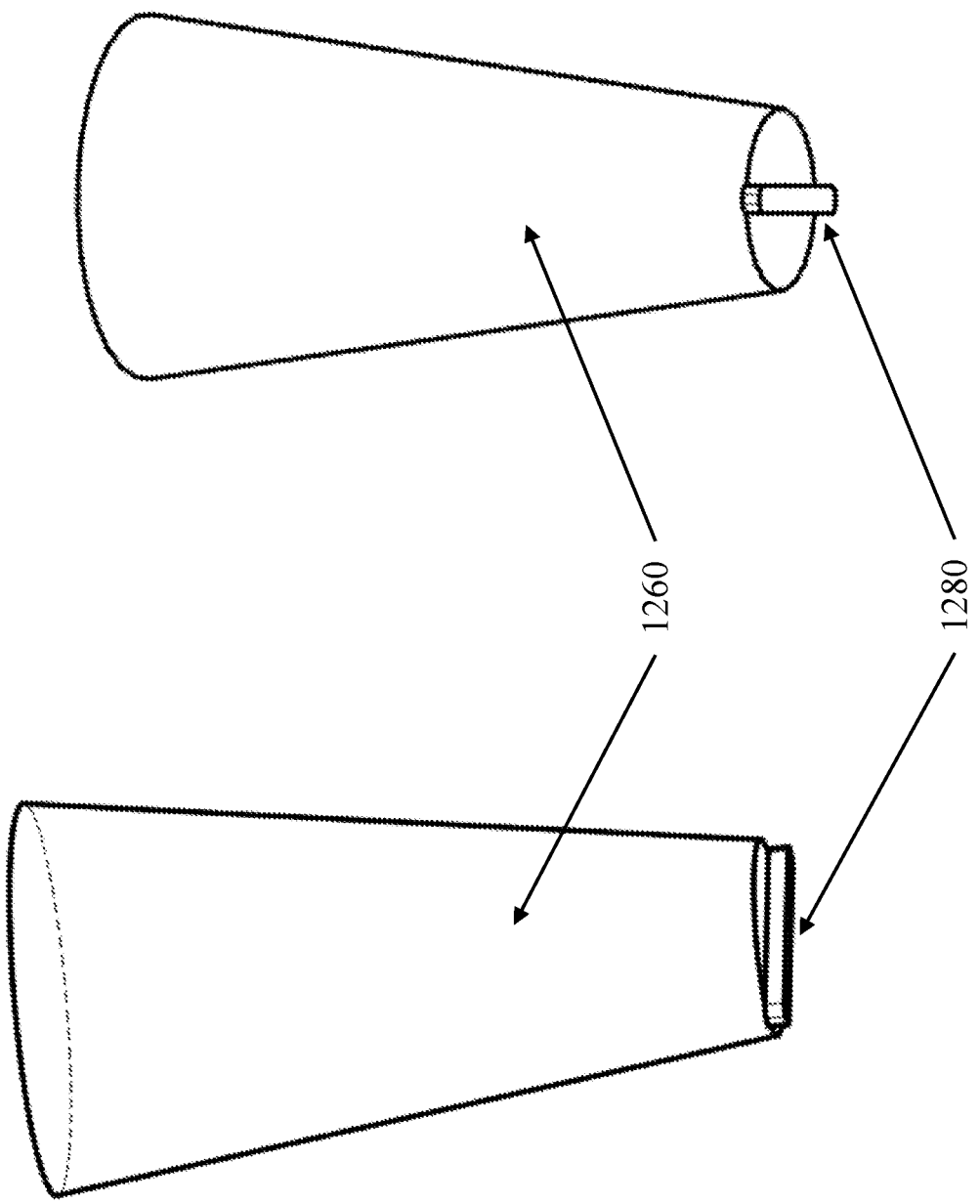

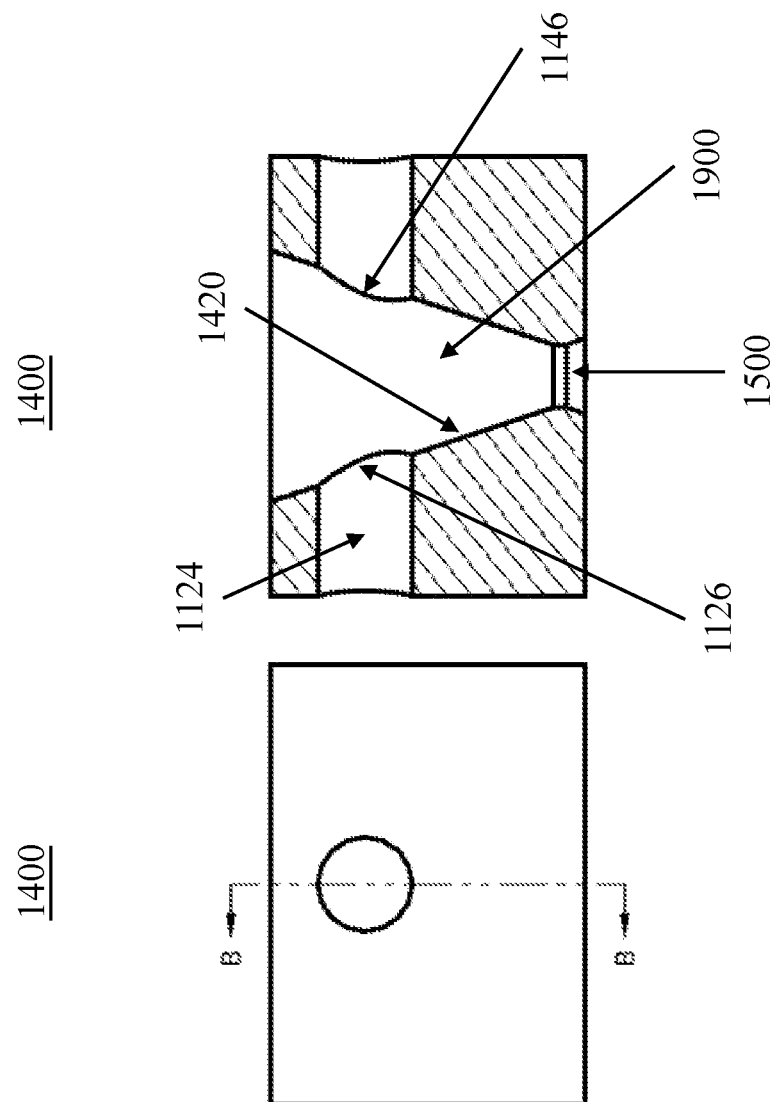
FIG. 66
FIG. 65
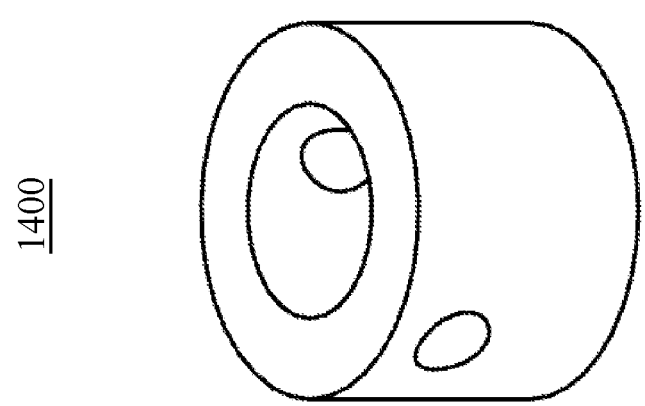
FIG. 64

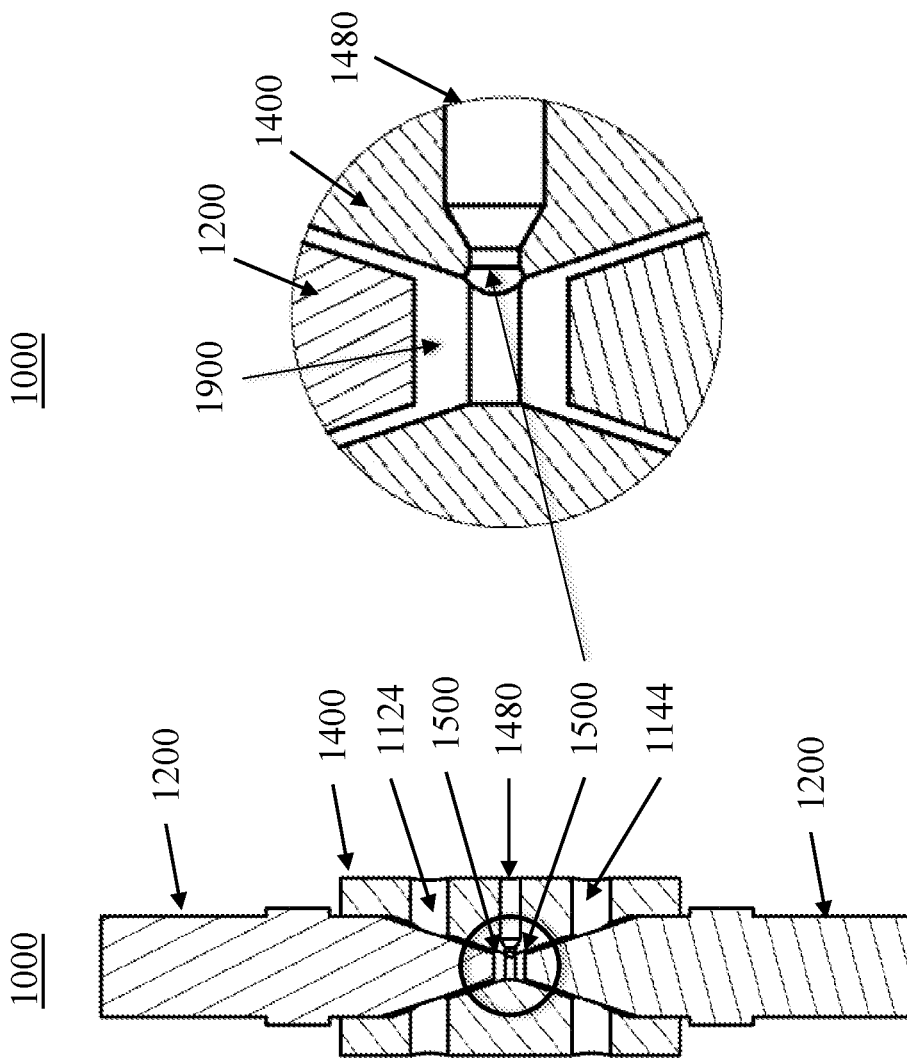
FIG. 90
FIG. 89
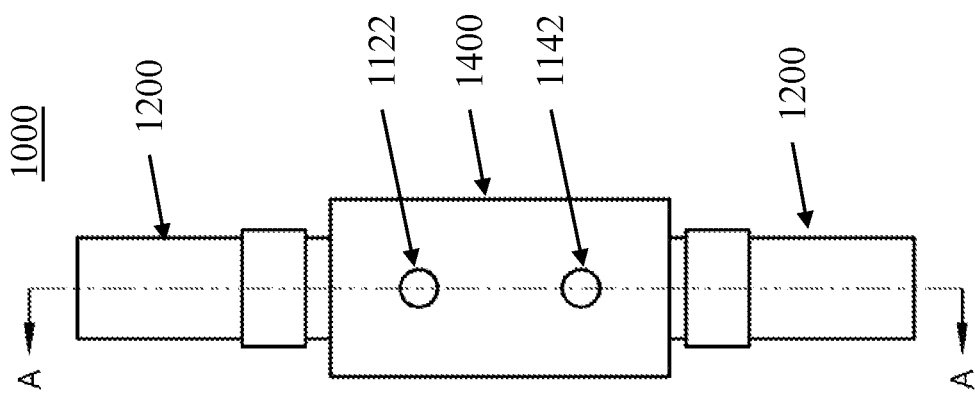
FIG. 88

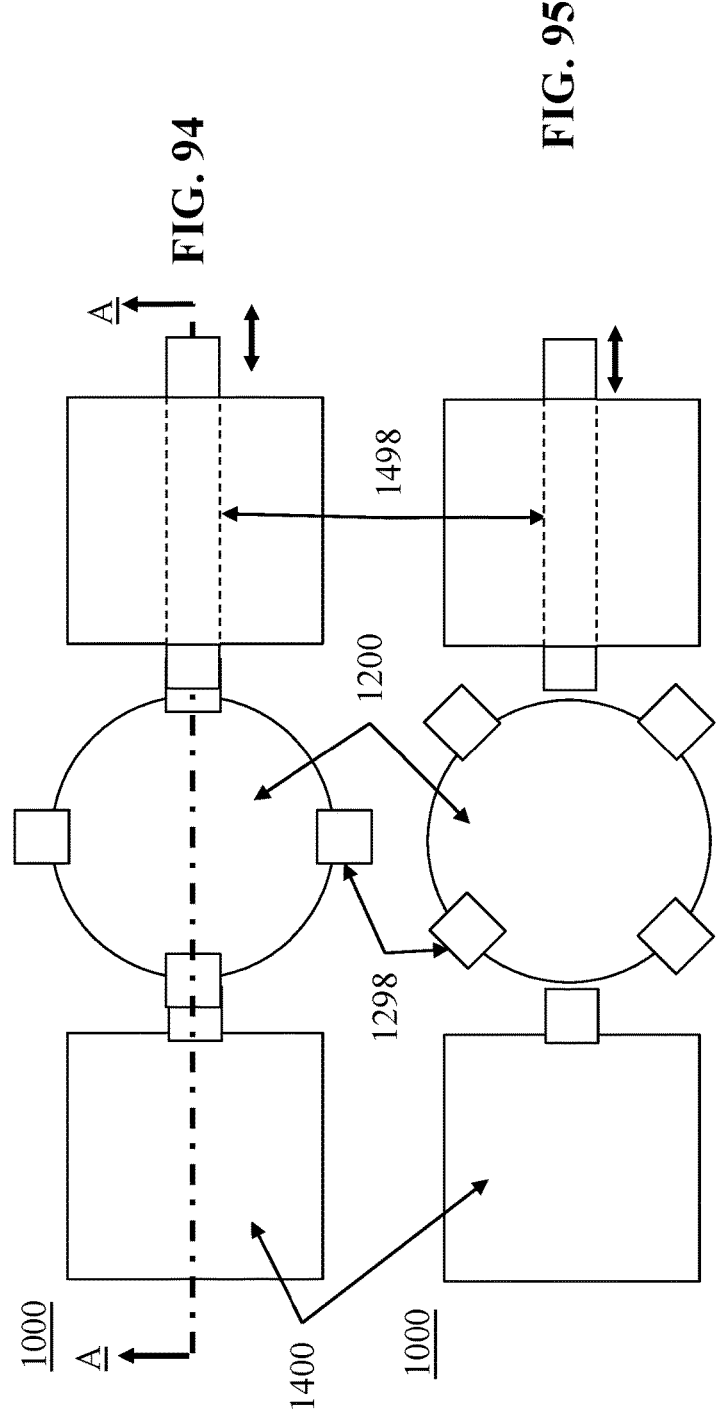
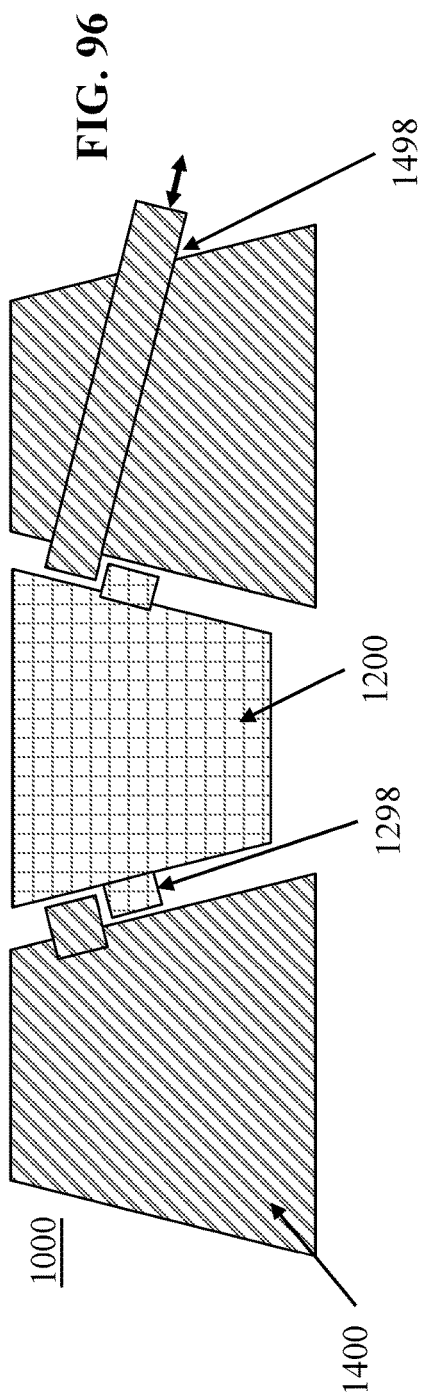

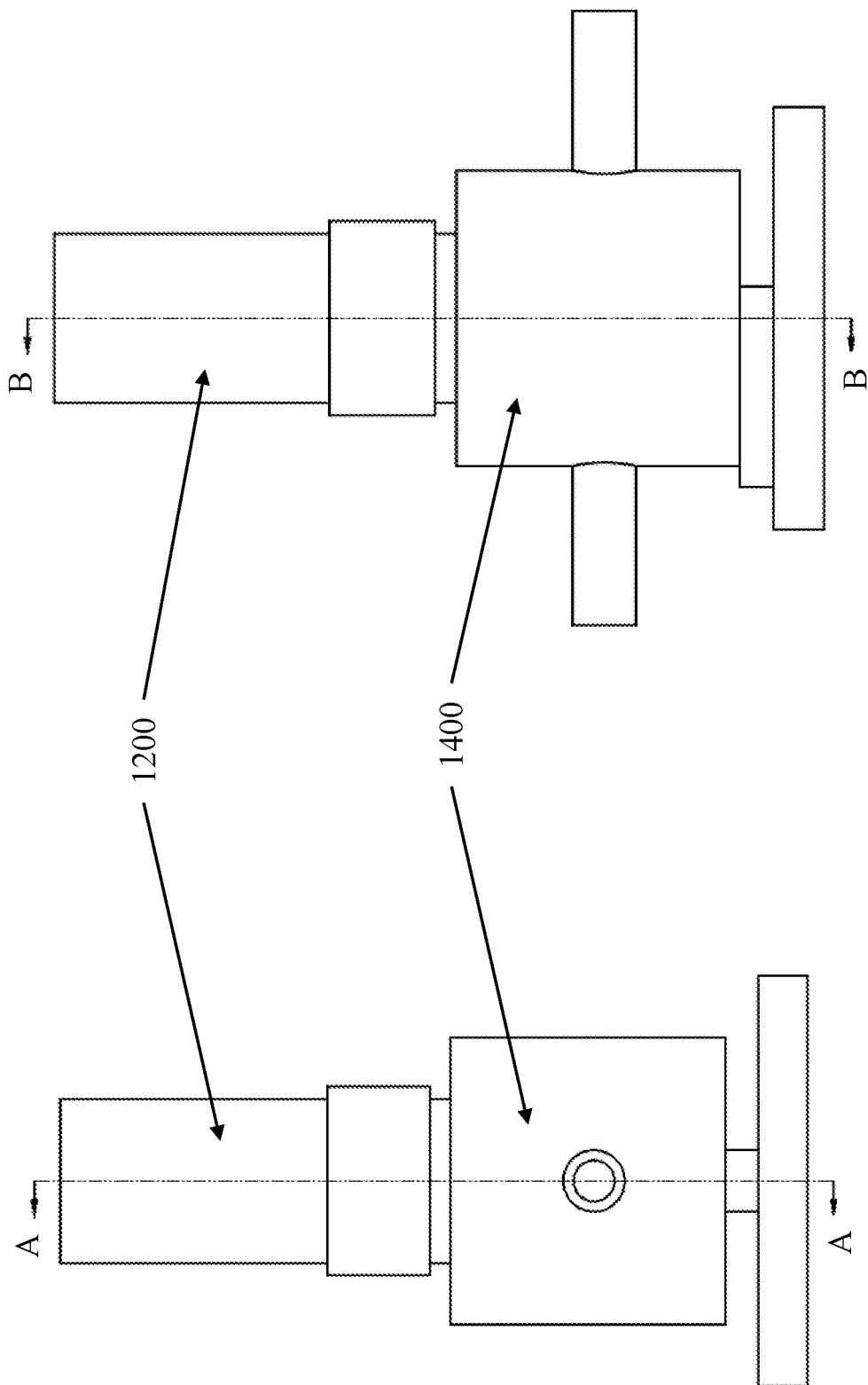

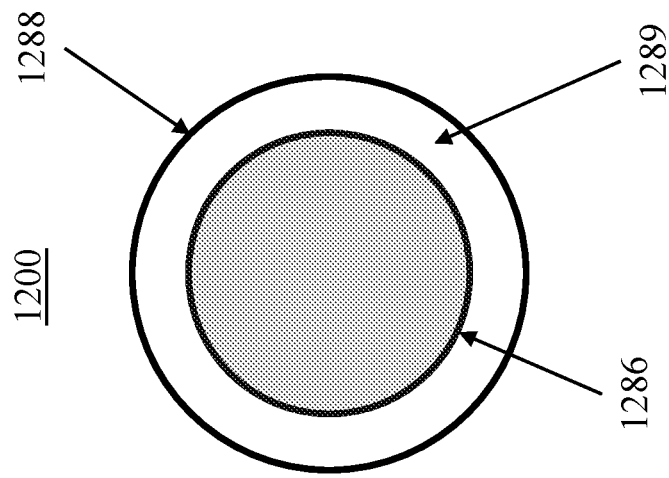
FIG. 105
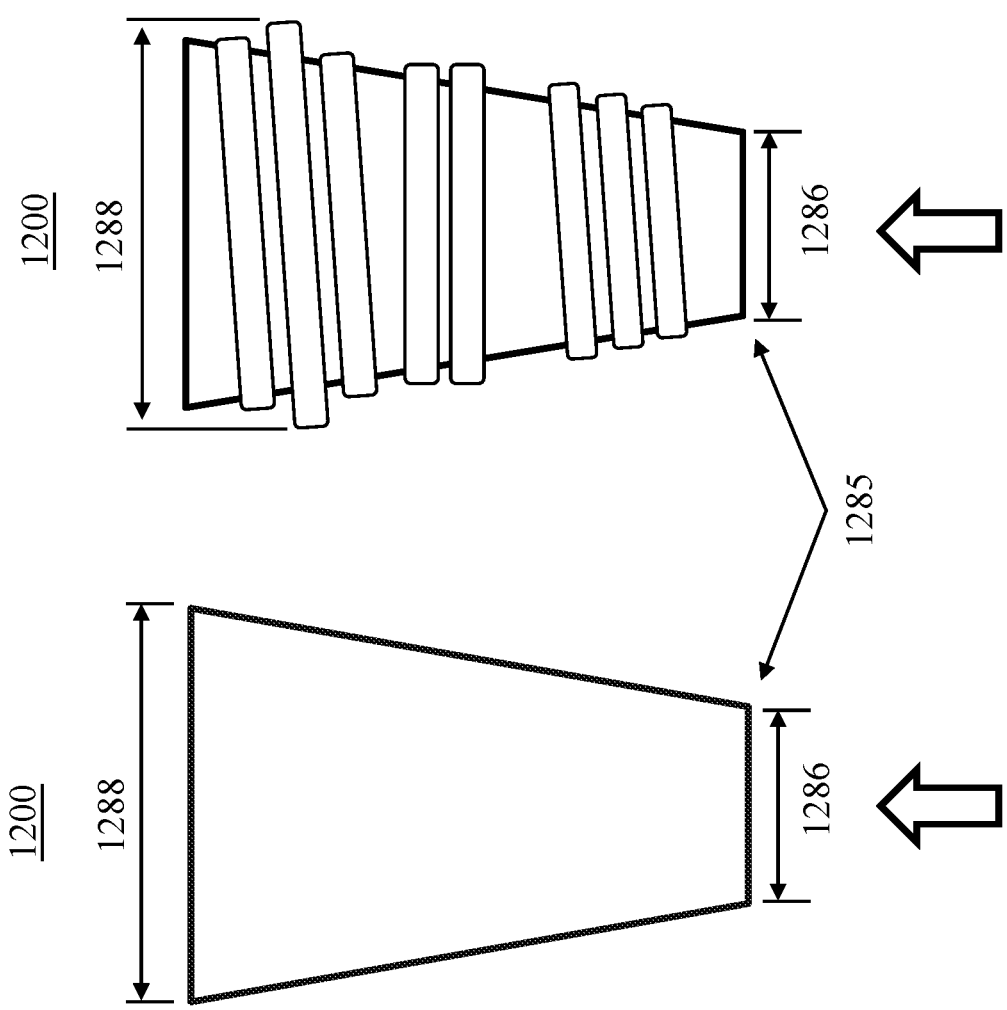
FIG. 104
FIG. 103

PROCESSES AND/OR MACHINES FOR PRODUCING CONTINUOUS PLASTIC DEFORMATION, AND/OR COMPOSITIONS AND/OR MANUFACTURES PRODUCED THEREBY

CROSS-REFERENCES TO RELATED APPLICATIONS

This application claims priority to, and incorporates by reference herein in its entirety, U.S. Provisional Patent Application 63/156,497, filed 4 Mar. 2021.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which:

FIG. 1 is a perspective view of an exemplary embodiment of a machine 1000;

FIG. 2 is a side view of an exemplary embodiment of a machine 1000;

FIG. 3 is a bottom view of an exemplary embodiment of a machine 1000;

FIG. 4 is a top view of an exemplary embodiment of a machine 1000;

FIG. 5 is a cross-sectional view, taken at section A-A of FIG. 4, of an exemplary embodiment of a machine 1000;

FIG. 24 is a cross-sectional view, taken at section S-S of FIG. 12, of an exemplary embodiment of a machine 1000;

FIG. 25 is a cross-sectional view, taken at section S-S of FIG. 12, of an exemplary embodiment of a machine 1000;

FIG. 28 is a cross-sectional view, taken at section S-S of FIG. 12, of an exemplary embodiment of a machine 1000;

FIG. 29 is a cross-sectional view, taken at section S-S of FIG. 12, of an exemplary embodiment of a machine 1000;

FIG. 30 is a perspective view of an exemplary embodiment of a rotor 1200;

FIG. 31 is a perspective view of an exemplary embodiment of a rotor 1200;

FIG. 32 is a perspective view of an exemplary embodiment of a rotor 1200;

FIG. 33 is a perspective view of an exemplary embodiment of a rotor 1200;

FIG. 34 is a perspective view of an exemplary embodiment of a rotor 1200;

FIG. 35 is a perspective view of an exemplary embodiment of a rotor 1200;

FIG. 36 is a perspective view of an exemplary embodiment of a rotor 1200;

FIG. 37 is a perspective view of an exemplary embodiment of a rotor 1200;

FIG. 38 is a perspective view of an exemplary embodiment of a rotor 1200;

FIG. 39 is a perspective view of an exemplary embodiment of a rotor 1200;

FIG. 40 is a perspective view of an exemplary embodiment of a rotor 1200;

FIG. 41 is a perspective view of an exemplary embodiment of a rotor 1200;

FIG. 44 is a perspective view of an exemplary embodiment of a rotor 1200;

FIG. 45 is a perspective view of an exemplary embodiment of a rotor 1200;

FIG. 48 is a perspective view of an exemplary embodiment of a rotor 1200;

FIG. 49 is a perspective view of an exemplary embodiment of a rotor 1200;

FIG. 50 is a perspective view of an exemplary embodiment of a rotor 1200;

FIG. 51 is a perspective view of an exemplary embodiment of a rotor 1200;

FIG. 52 is a side view of an exemplary embodiment of a rotor 1200;

FIG. 53 is a bottom view of an exemplary embodiment of a rotor 1200;

FIG. 54 is a perspective view of an exemplary embodiment of a rotor 1200;

FIG. 55 is a perspective view of an exemplary embodiment of a rotor 1200;

FIG. 56 is a side view of an exemplary embodiment of a rotor 1200;

FIG. 57 is a bottom view of an exemplary embodiment of a rotor 1200;

FIG. 58 is a perspective view of an exemplary embodiment of a rotor 1200;

FIG. 59 is a side view of an exemplary embodiment of a rotor 1200;

FIG. 60 is a perspective view of an exemplary embodiment of a rotor 1200;

FIG. 61 is a perspective view of an exemplary embodiment of a rotor 1200;

FIG. 62 is a perspective view of an exemplary embodiment of a rotor 1200;

FIG. 63 is a perspective view of an exemplary embodiment of a rotor 1200;

FIG. 64 is a perspective view of an exemplary embodiment of a container 1400;

FIG. 65 is a side view of an exemplary embodiment of a container 1400;

FIG. 66 is a cross-sectional view, taken at section B-B of FIG. 65, of an exemplary embodiment of a container 1400;

FIG. 88 is a side view of an exemplary embodiment of a machine 1000;

FIG. 89 is a cross-sectional view, taken at section A-A of FIG. 88, of an exemplary embodiment of a machine 1000;

FIG. 90 is a detailed view of an identified portion of FIG. 89;

FIG. 94 is a top view of an exemplary embodiment of a machine 1000, showing a rotational position of rotor 1200 at a first time;

FIG. 95 is a top view of an exemplary embodiment of the machine 1000 of FIG. 94, but showing a rotational position of rotor 1200 at a second time;

FIG. 96 is a cross-sectional view, taken at section A-A of FIG. 94, of an exemplary embodiment of machine 1000;

FIG. 97 is a front view of an exemplary embodiment of a machine 1000;

FIG. 98 is a side view of an exemplary embodiment of a machine 1000;

FIG. 103 is a side view of an exemplary embodiment of a rotor 1200;

FIG. 104 is a side view of an exemplary embodiment of a rotor 1200;

FIG. 105 is a distal end view of an exemplary embodiment the rotor 1200 of FIG. 103 and/or FIG. 104; and The following table links each numbered drawing element to its description:

Figure 6:
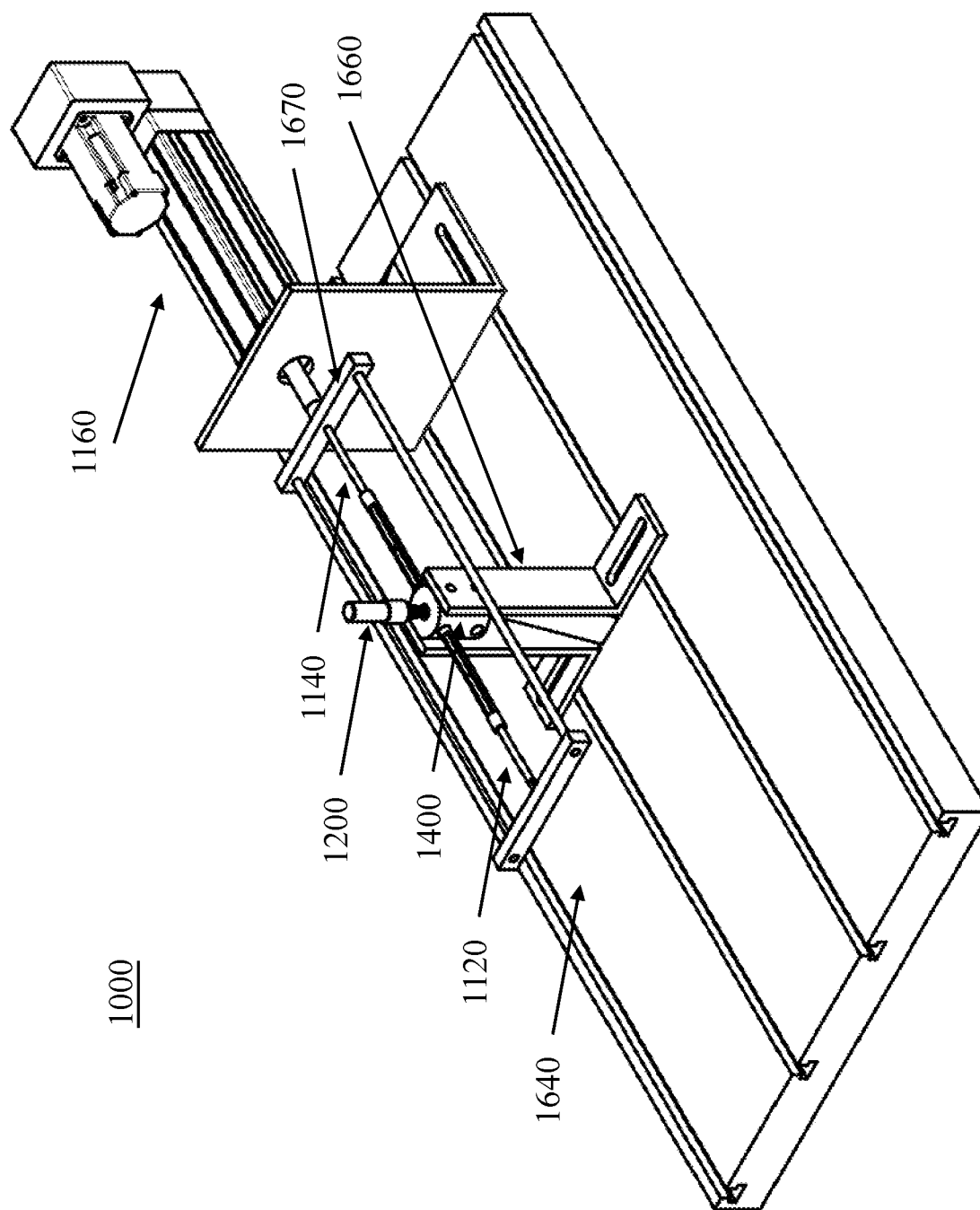
FIG. 6 is a side view of an exemplary embodiment of a machine 1000.

| | |
|---|---|
| 1000 | Machine |
| 1120 | Feeder A |
| 1121 | Feedport entrance A |
| 1122 | Feedstock A |
| 1123 | Feed mechanism A |
| 1124 | Feedport A |
| 1126 | Feedport exit A |
| 1140 | Feeder B |
| 1141 | Feedport entrance B |
| 1142 | Feedstock B |
| 1143 | Feed mechanism B |
| 1144 | Feedport B |
| 1146 | Feedport exit B |
| 1150 | Filling |
| 1160 | Feeder drive |
| 1200 | Rotor |
| 1210 | Non-Contact portion |
| 1220 | Contact portion |
| 1240 | Semi-Contained portion |
| 1260 | Contained portion |
| 1280 | Distal end portion |
| 1285 | Distal terminus |
| 1286 | Distal visible perimeter |
| 1288 | Proximal visible perimeter |
| 1289 | Annular portion |
| 1290 | Conduit |
| 1295 | Rotor passage |
| 1298 | Rotor protrusion |
| 1300 | Drive |
| 1400 | Container |
| 1410 | Container body |
| 1420 | Container inner surface |
| 1440 | Container housing |
| 1460 | Container layer |
| 1480 | Container exit |

-continued

| | |
|---|---|
| 1498 | Container protrusion |
| 1500 | Die |
| 1520 | Die plate |
| 1620 | Substrate |
| 1640 | Bed |
| 1660 | Frame |
| 1670 | Feeder frame |
| 1680 | Deposited material |
| 1700 | Stirred material |
| 1800 | Extruded material |
| 1850 | Extruded tube |
| 1900 | Cavity |

DESCRIPTION

Referring to FIGS. 1-105, certain exemplary embodiments can provide a method, process, device, machine, and/or system for continuously consolidating granular materials, creating new alloys and/or composites, and/or modifying and/or refining material microstructure, by using plastic deformation of feedstock(s) provided in various structural forms. Materials produced in this manner can be fabricated directly and in forms such as, e.g., wires, rods, tubes, sheets, plate and/or channels, etc., and/or deposited directly on a substrate to create a three-dimensional structure. Certain exemplary embodiments can operate independently and/or can be augmented with equipment having at least one rotating spindle and/or rotor such as a friction stir welding machine, lathe, milling machine, and/or drilling machine, etc.

FIGS. 1-6 show an exemplary embodiment of a machine 1000, which comprises feeders 1120, 1140 that are configured to feed at least one feedstock toward a non-rotating and/or stationary container 1400 that defines an interior cavity 1900. A rotor 1200, which can be located at least partially within cavity 1900, can rotate around a rotational axis R-R, with/without translation along rotational axis R-R, to cause continuous, severe, and/or plastic deformation of at least one feedstock within a cavity 1900 defined in container 1400. Feeders 1120, 1140, container 1200, and/or rotor 1400 can be supported by a bed 1640 and/or a frame 1660. Feeders 1120, 1140 can be driven by a drive and/or actuator 1160.

As shown in FIGS. 7-11, a feedstock 1122, 1142 that includes at least one malleable and/or deformable material in non-liquid form can be fed into cavity 1900 while rotor 1200 is rotating and/or translating due power applied by drive 1300. Note that for clarity FIGS. 7-11 do not show cross hatching.

Figure 12:
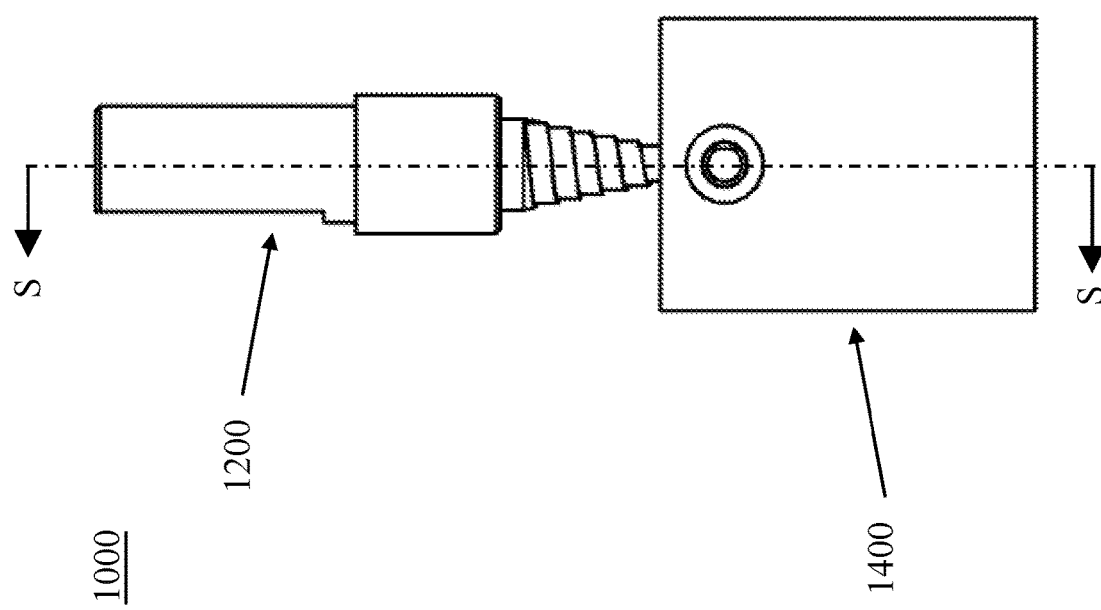
FIG. 12 is a side view of an exemplary embodiment of a machine 1000.
Figure 13:
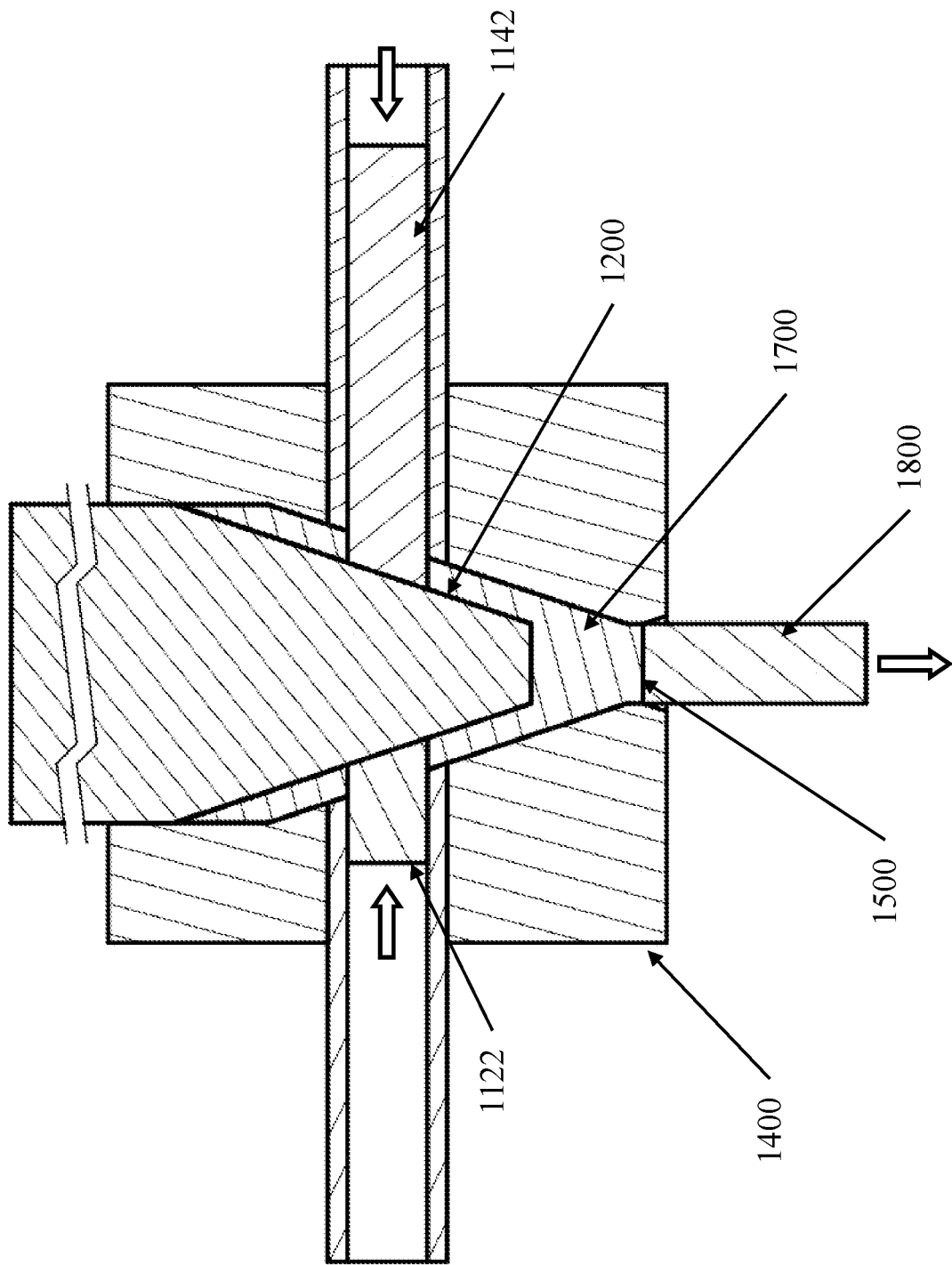
FIG. 13 is a cross-sectional view, taken at section S-S of FIG. 12, of an exemplary embodiment of a machine 1000.
Figure 14:
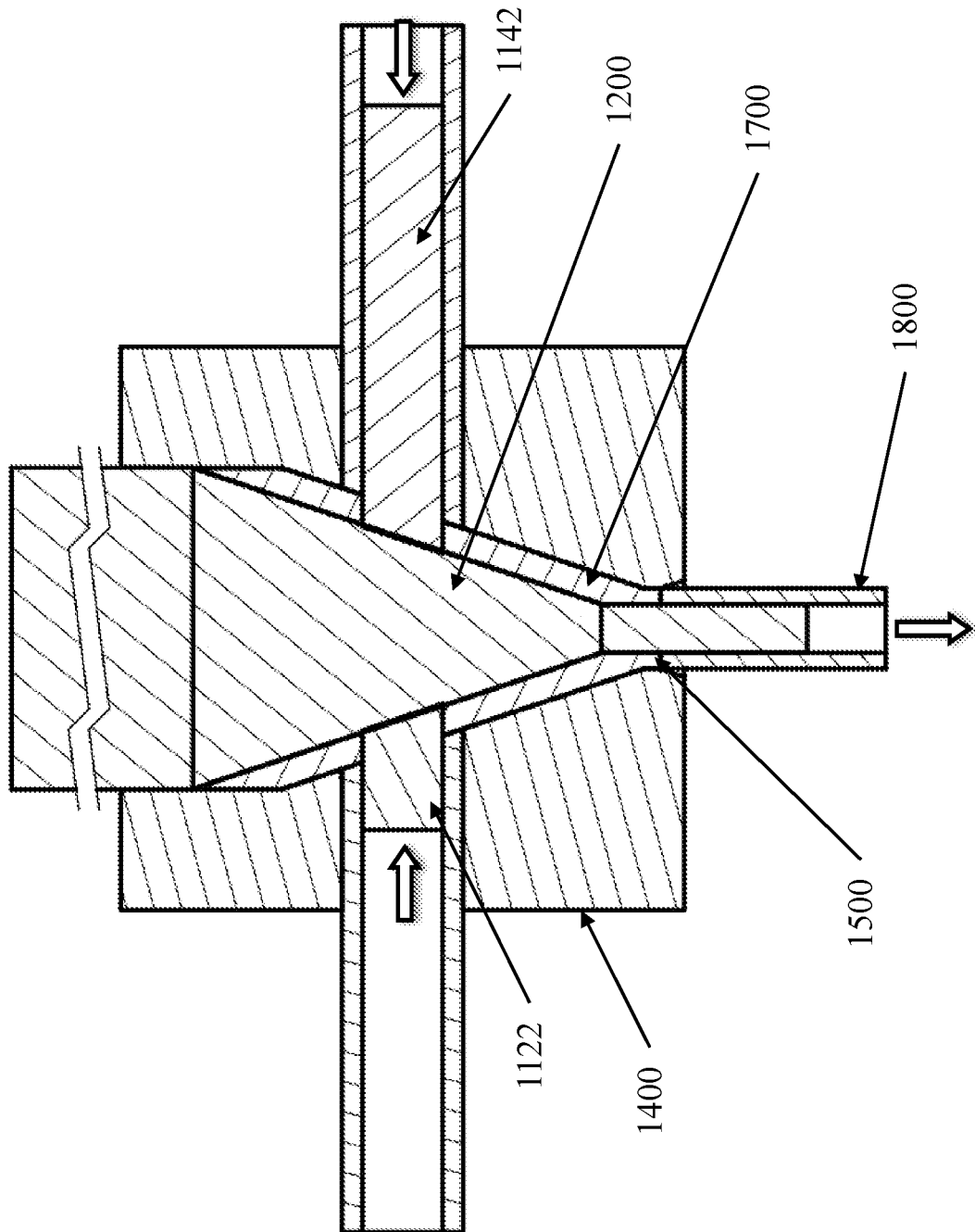
FIG. 14 is a cross-sectional view, taken at section S-S of FIG. 12, of an exemplary embodiment of a machine 1000.

FIG. 12 represents a generic rotor 1200 and container 1400, which are presented to show cross-sectional plane S-S that defines the view of FIGS. 13-19, among others. Note that to clarify and highlight feedstocks 1122, 1142, stirred material 1700, and extruded material 1800, FIGS. 17-19 do not show cross hatching for rotor 1200 or container 1400. Upon entering cavity 1900, feedstock 1122, 1142 can touch moving rotor 1200 and/or become transformed into stirred material 1700. The stirred material 1700 itself, entering feedstock 1122, 1142, and/or one or more wipers that can be operable using external actuators (which, as seen in FIGS. 94, 95, and 96, can be a rotor protrusion 1298 that is attached to or integral to rotor 1200 and/or a container protrusion 1498 that is attached to or integral to container 1400) that protrude into cavity 1900, any such wiper less deformable than and/or non-deformable with respect to at least one of the feedstocks at the temperatures and pressures present in cavity 1900, can fully or partially wipe, dislocate, and/or urge stirred material 1700, which is then in contact with rotor 1200, off of and/or along rotor 1200. Wiping can help reduce build-up of stirred material 1700 on rotor 1200 that might otherwise cause little to no stirred material to advance toward die 1500. Wiping of stirred material 1700 from and/or along rotor 1200 can transfer forces applied to push feedstock 1122, 1142 toward cavity 1900 onto stirred material 1700, which can help advanced stirred material 1700 towards non-rotating and/or stationary die 1500, and/or can allow entering feedstock 1122, 1142 and/or stirred material 1700 to more easily and/or rapidly undergo plastic deformation, consolidation, distribution, and/or microstructure modification. The degree of wiping can range from approximately 1% to approximately 99% of the stirred material then in the cavity per rotor revolution.

Figure 18:
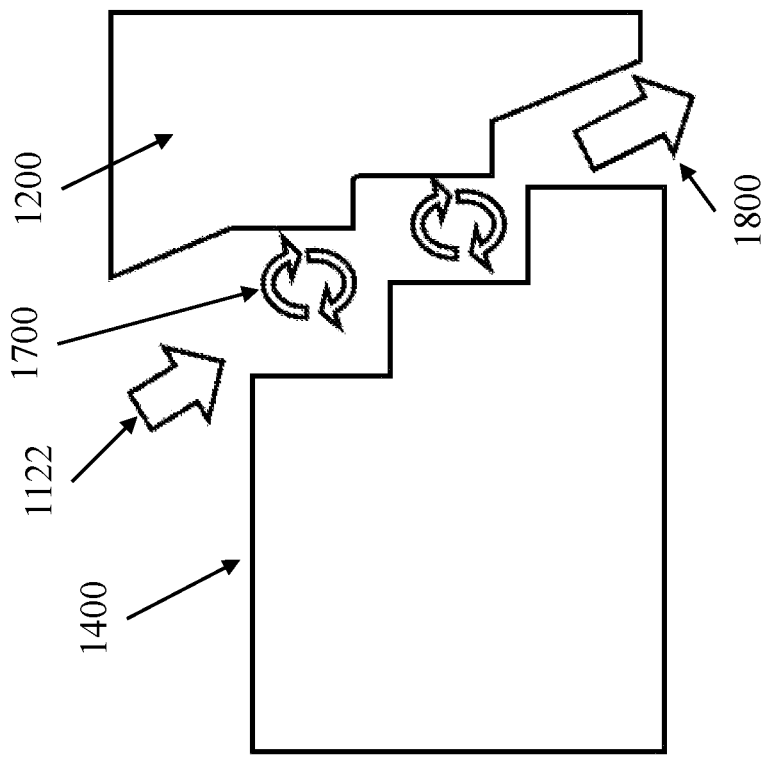
FIG. 18 is a cross-sectional view, taken at detail D of FIG. 16, of an exemplary embodiment of a machine 1000.
Figure 17:
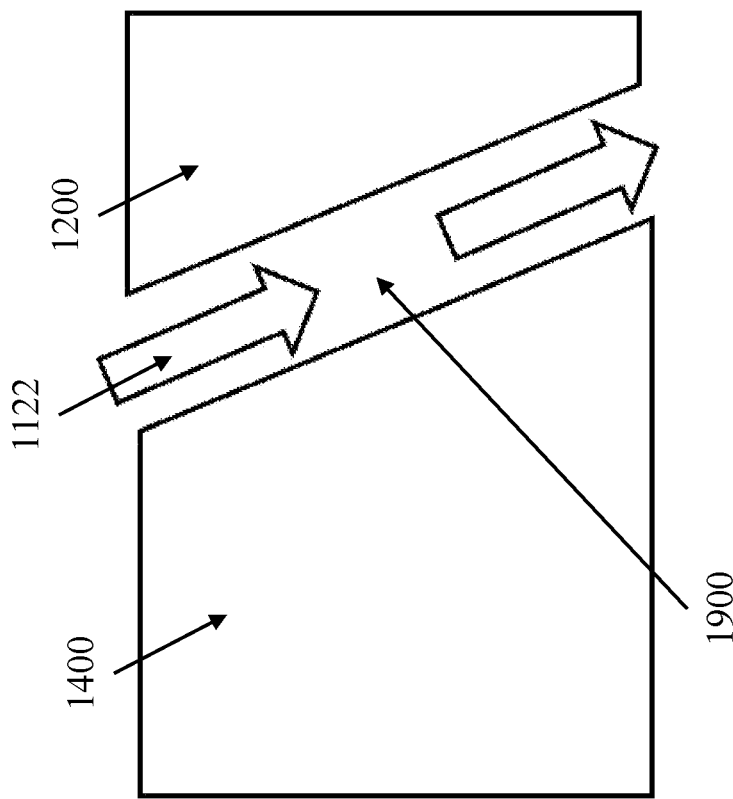
FIG. 17 is a cross-sectional view, taken at detail D of FIG. 16, of an exemplary embodiment of a machine 1000.
Figure 19:
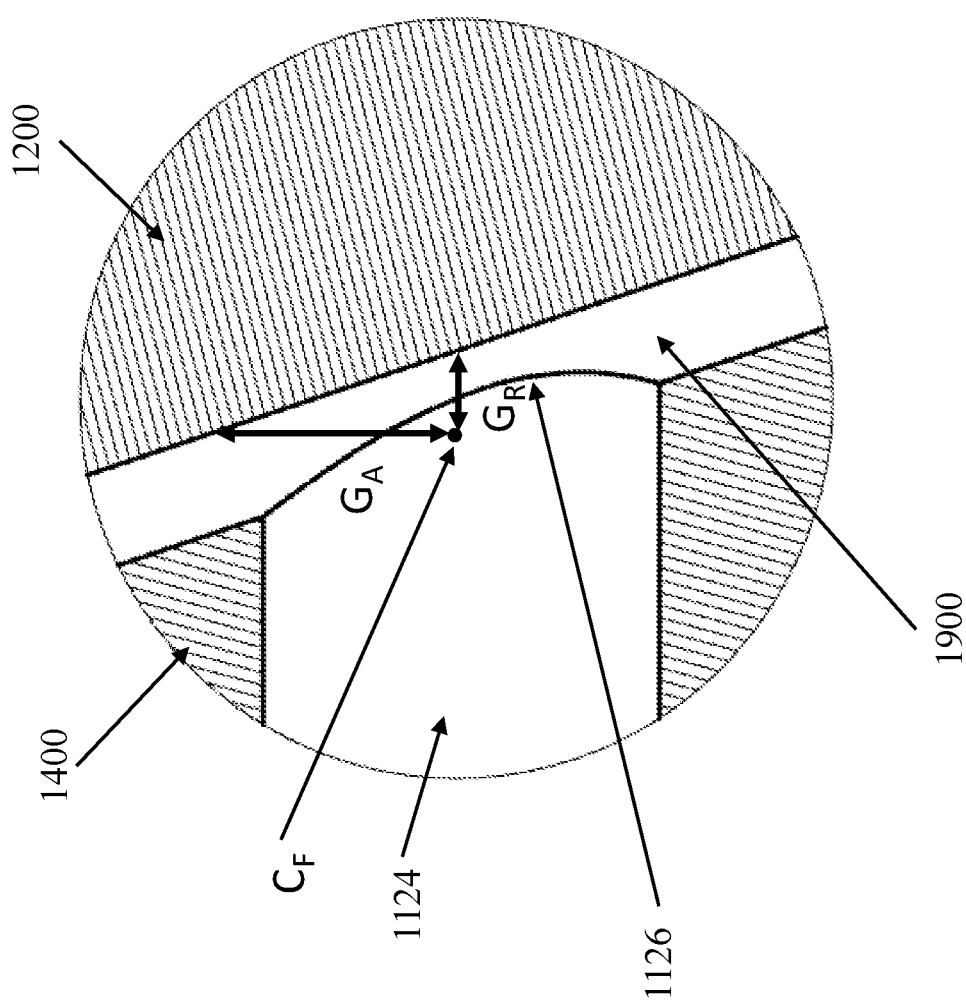
FIG. 19 is a cross-sectional view, taken at detail D of FIG. 16, of an exemplary embodiment of a machine 1000.

Referring to FIGS. 17-19, within cavity 1900 heat can be generated due to frictional contact between a feedstock 1122 and the interior walls of container 1400, the rotating and/or translating rotor 1200, and/or other feedstock, and/or due to deformation of the feedstock. Such heat can further soften and/or deform the feedstock within cavity 1900. Feedstock 1122 that enters cavity 1900 while rotor 1200 is moving is considered stirred material 1700. Due to the motion of rotor 1200, stirred material 1700 can flow towards non-rotating and/or stationary die 1500 and/or a container exit and/or be pushed through die 1500 and/or a container exit, eventually emerging from container 1400 as extruded material 1800. Generally, FIGS. 17-19 show the flow direction of stirred material 1700. This flow can be linear, turbulent, and/or chaotic.

Within cavity 1900, a through mixing of feedstock can be achieved. If dissimilar feedstock and/or filler materials and/or reinforcement phases are fed into cavity 1900, the harder phases can be uniformly distributed within the softer matrix materials. The deformation, level of mixing, stirred material temperature, and/or processing time can be controlled to allow for in-situ composite manufacturing and/or in-situ solid-state alloying. The deformation achieved in stirred material 1700 can be a function of rotational speed, rotor geometry, container geometry, feed stock geometry, and/or feedstock feeding rate. Increases in rotational speed and/or diameter and/or length of rotor 1200 can increase the deformation.

As shown in FIG. 19, during normal operation of the machine, a radial gap $G_R$ and/or an axial gap $G_A$ can exist between rotor 1200 and container 1400 and the magnitude of each such gap can change over time as rotor 1200 rotates and/or translates. For example, within the cross-section shown in FIG. 19, which contains rotational axis R-R, a magnitude of axial gap $G_A$ can be defined as a distance measured along a line segment that extends parallel to rotational axis R-R and between a centroid CF (and/or along a line segment that extends parallel to rotational axis R-R and from a radial line that is oriented perpendicular to rotational axis R-R and that intersects centroid CF) of a feedstock exit 1126, 1146 and the then-closest point to centroid CF, that closest point located on the exterior surface of the contained portion 1260 of rotor 1200. Likewise, on the same cross-section, a magnitude of radial gap $G_R$ can be defined as a distance measured along a line segment that extends perpendicular to the rotational axis and between centroid CF and the then-closest point to centroid CF that's located on the exterior surface of the contained portion 1260 of rotor 1200. Stated differently, a magnitude of the axial gap can continuously change across time, the axial gap being measured along a first line extending in a predetermined perpetual cross-sectional plane that includes the rotational axis, the first line extending parallel to the rotational axis, the gap being the shortest distance, on the predetermined perpetual cross-sectional plane and along the first line, between (a) the exterior surface of the rotor and (b) a second line that extends in the predetermined perpetual cross-sectional plane, is perpendicular to the rotational axis, and intersects a centroid of an exit of the first feedport. A magnitude of the radial gap can continuously change across time, the radial gap measured being along the second line and being the shortest distance, on the predetermined perpetual cross-sectional plane and along the second line, between the exterior of the rotor and the first line. Stated in yet another manner, the axial distance and/or radial distance between the feedport centroid and the rotor can change over time.

Depending on the dimensions of rotor 1200 and/or container 1400, viewed on a cross-section that is perpetual and/or unchanging over time in its orientation, such as that of FIG. 19, a magnitude of radial gap $G_R$ and/or axial gap $G_A$ can change over time. The magnitude of radial gap $G_R$ can change, potentially within a single rotation of rotor 1200 to within 100 rotations of rotor 1200, from zero (i.e., direct contact between rotor 1200 and container 1400) to (assuming rotor 1200 is withdrawn sufficiently from cavity 1900) a distance equal to maximum radius of container 1400 for a radius that is measured perpendicularly to rotational axis R-R and passes through the centroid CF. The magnitude of axial gap $G_A$ can change, potentially within a single rotation of rotor 1200 to within 10,000 rotations of rotor 1200, from zero (i.e., direct contact between rotor 1200 and container 1400) to (assuming rotor 1200 is withdrawn sufficiently from cavity 1900) a distance equal to the distance from the proximal entrance of rotor 1200 into container 1400 and centroid CF as measured along a line that passes through centroid CF and is parallel to rotational axis R-R. of the contained portion 1260 of rotor 1200 during the time needed for one revolution of the contained portion 1260 of rotor 1200 within cavity 1900. The change in the magnitude of axial gap $G_A$ can be limited by the maximum travel distance, along a line extending parallel to the axis of rotation, of contact portion 1220 away from container inner surface 1420 and/or contact of the exterior surface of contained portion 1260 with container inner surface 1420. The change in the magnitude of radial gap $G_R$ can be limited by the maximum possible distance, measured along a line extending perpendicular to the axis of rotation, of contained portion 1260 from container inner surface 1420 within cavity 1900 and/or contact of the exterior surface of contained portion 1260 with container inner surface 1420. The magnitude of any gap, including radial gap $G_R$ and/or axial gap $G_A$, can be measured using any traditional gap measurement device, including a ruler, feeler gauge, caliper, micrometer, gap sensor, gap monitor, optical or imaging gap gauge, laser scanner, capacitance gap sensor, eddy current gap sensor, air or pneumatic gap sensor, industrial computed tomography (ICT), and/or X-ray radiography, etc.

Decreases in a magnitude of radial gap $G_R$, axial gap $G_A$, and/or the die exit cross-sectional area can increase the deformation of stirred material 1700. The deformation can be measured in terms of strain and/or strain rate. Strain can vary between approximately 0.1 and approximately 200, and/or strain rate can vary between 0.1/s and 1000/s, at locations closer to the contact between rotor 1200 and stirred material 1700. Strain can be measured by comparing the dimensional and/or orientation change of a feedstock from various locations and/or by comparing an average aspect ratio of a feedstock's grains prior to and post deformation and/or by comparing measurements of surface markings such as a grid pattern and/or marker material that has been placed on an exterior surface of the feedstock, where any dimensional and/or orientation measurement is performed using well-known measurement techniques. Likewise, strain can be measured according to standards such as ASTM D790 and/or ASTM E1319-21.

The reduction in cross-sectional area at the initial contact between feedstock 1122, 1142 and rotor 1200 can be measured by calculating the ratio between the changed cross-sectional area and the original cross-sectional area of feedstock 1122, 1142. The change in cross-sectional area is the difference in cross-sectional area between the original cross-sectional area of the feedstock and the cross-sectional area of the feedstock entering cavity 1900. The feedstock thickness entering cavity 1900 can be measured by measuring the gap between rotor 1200 and container 1400. The percentage reduction in cross-sectional area for a full-size solid feedstock at a feedport 1124, 1144 can be calculated from the following formula:

$$\% \text{ reduction in area} = \frac{CS_{feedstock} - (h_{feedstock} \times t_{def.layer})}{CS_{feedstock}} \times 100$$

where, $CS_{feedstock}$ is cross-sectional area of the feedport; $h_{feedstock}$ is height of the feedport, and $t_{def.layer}$ is thickness of deformed layer, which is equal to the magnitude (e.g., thickness) of the gap between container 1400 and rotor 1200.

The percentage reduction in cross-sectional area at the feedstock entry can vary from approximately 1% to approximately 99%. The initial reduction in cross-sectional area can further be reduced during downward movement of the stirred material. The final change in cross-sectional area can be calculated by using the following formula.

$$\% \text{ Change in cross section area} = \frac{CS_{feedstock} - CS_{extruded\ material}}{CS_{feedstock}} \times 100$$

where, $CS_{feedstock}$ is the cross-sectional area of the feedport and $CS_{extruded\ material}$ is the cross-sectional area of the extruded material.

Since certain exemplary embodiments can be used to consolidate various feedstock materials, the final cross-sectional area can be higher than the initial feedstock's cross-sectional area. In this case, the reduction in cross-sectional area can be negative based on the above formula for calculating the percentage reduction in cross-sectional area.

The level of mixing in cavity 1900 can be increased by increasing the rotational speed and/or by providing rotor features and/or container features that promote localized material flow before the processed material exits die 1500. In various exemplary embodiments, the level of mixing can be inferred and/or determined by studying the microstructure (e.g., size, shape, type, and/or density of crystals, grains, phases, secondary particles, reinforcement particles, dispersoids, dislocations, and/or voids, etc.) of the extruded material 1800 for uniformity. For example, a substantially uniform distribution of reinforcement particles and/or a uniform distribution of secondary phases might mean satisfactory mixing and/or might distinguish an extruded material 1800 formed from machine 1000 from materials created and/or processed via other machines, tools, and/or processes. A non-uniform microstructure and/or non-distribution and/or agglomeration of alloying elements, phases, secondary phases, and/or reinforcement phases might indicate insufficient mixing. A microstructure can be considered sufficiently modified when, with respect to the microstructure of the feedstock, the microstructure of the extruded material exhibits a difference:

a. in average grain size change of 5% or more as measured using ASTM E 112-13, ASTM E2627-13, and/or ASTM E1382-97 (2015);
b. in average dislocation density change of 5% or more as counted on electron microscopic images, and/or
c. in change of distribution, shape, size, and/or number of secondary phases of 5% or more as determined using ASTM E1245-03.

The temperature of rotor 1200, container 1400, and/or extruded material 1800 can be measured using various methods such as one or more thermocouples, infra-red thermal cameras, etc. The temperature of feedstock 1122, 1142, the stirred material 1700, and/or the extruded material 1800 at any time and/or location during the operation can be up to approximately 0.95 times the melting point of the feedstock 1122, 1142. For example, when processing aluminum, the temperature of stirred material 1700 can reach as high as 627C. When processing dissimilar feedstocks 1122, 1142, the temperature of the stirred material 1700 can reach approximately 0.95 times of the melting point of a feedstock having the highest melting point. In this case, the temperature generated in one feedstock can cause the onset of incipient melting. At least one feedstock being processed can remain in a solid state.

Via certain exemplary embodiments, at least one of the feedstocks 1122, 1142 can be plastically deformed by rotor 1200 almost immediately after entering container 1400 and/or cavity 1900. The plasticized feedstock material/stirred material 1700 can be moved around cavity 1900 by rotor 1200, which can force that stirred material 1700 downward with the aid of pressure difference generated by rotor 1200 and/or the feed pressure. The material flow and/or pressure caused by rotor 1200 and/or the feed pressure can be utilized for extrusion. The extruded material 1800 can flow from machine 1000 substantially continuously and/or uniformly across time and/or its cross-sectional area with respect to its properties such as composition, density, shape, microstructure, etc.

Rotor 1200 can range between approximately 1 mm and approximately 500 mm in diameter at the non-contact portion 1210 and/or contact portion 1220 and/or between approximately 1 mm and approximately 1000 mm in length. Generally, smaller diameter rotors can operate at a higher rotation speed, and/or larger diameter rotors can have higher torque requirements. The selection of the size and/or material of rotor 1200 can depend on the feedstock material or materials and/or its/their geometry. The friction force can be calculated by multiplying the contact area of rotor 1200 with the flow stress of the feedstock at the time of contact and the corresponding coefficient of friction. For example, when processing a feedstock with a 20 MPa flow stress at a processing temperature using a rotor 1200 with 100 mm$^2$ surface area and coefficient of friction 0.5, the frictional forces will be approximately 1000 N. If a rotor 1200 had 5 mm diameter the torque requirement would be 5 Nm. Similarly, depending on the size of rotor 1200 and/or the stirred material 1700, the friction force can range from approximately 0.1 kN to approximately 5000 kN. For processing feedstocks with a surface area of less than approximately 100 mm$^2$, the torque requirement often can be satisfied by an approximately 1 HP electrical motor, which can be available in conventional industrial machine tools such as milling machines, lathe, drilling machines etc. Certain exemplary embodiments of machine 1000 can be implemented on commonly available machine tools having rotary spindles, such as milling machines, lathes, drilling machines, etc. In this case, rotor 1200 can be attached to the rotary spindle. An independent, standalone machine 1000 can have its own spindle with a drive system. Hence, certain exemplary embodiments of machine 1000 can operate independently and/or can inter-operate with a machine such as, but not limited to, a friction stir welding machine, drilling machine, lathe, and/or milling machine, etc.

Since rotor 1200 can be completely moved and/or translated out of cavity 1900 at the end of the process and/or at any point during the process while rotor 1200 is rotating, the potential problem of rotor 1200 sticking and/or bonding to container 1400 can be reduced and/or avoided and/or rotor 1200 easily can be cleaned and/or wiped.

To avoid excessive wear of rotor 1200 and/or container 1400 due to a continuous exposure to high temperature and/or contact forces, the process can be carried out by applying an intermittent cooling cycle to rotor 1200 and/or container 1400, which can allow feedstocks 1122, 1142 with high flow stresses and/or high plastic deformation temperatures, such as ferrous alloys, nickel alloys, cobalt alloys, etc., to be processed. Depending on the feedstocks being processed, additional heating and/or cooling can be provided to container 1400 and or to rotor 1200 via external means.

More than one feedstock type and/or form such as, but not limited to, solid or powdered aluminum, copper, zinc, tin, lead, lithium, magnesium, iron, nickel, titanium, niobium, tantalum, chromium, molybdenum, cobalt, tungsten, gold, silver, platinum, and/or theirs alloys, and/or nonmetallic materials such as naturally occurring minerals and/or compounds, ceramic particulates such as silicon carbide, boron carbide, alumina, tungsten carbide, fly ash, etc., and/or naturally occurring and/or laboratory made carbon nanotubes, graphene, graphite, and hydroxyapatite, etc., can be fed via single or multiple feedports 1124, 1144 to container 1400 and/or cavity 1900. Feedstocks such as alloys, composites, organics, inorganics, polymers, and/or glass also can be fed.

To consolidate malleable or deformable feedstocks in the form of particulates, a feedstock 1122, 1142 can be pushed into cavity 1900 through more than one feedport 1124, 1144 to increase the feed rate and/or to maintain continuous operation. In certain exemplary embodiments, extruded material 1800 of a first machine can serve as feedstock 1122, 1142 to a second machine 1000. To produce extruded materials 1800 with a refined microstructure, such as with a grain size ranging from approximately 10 nm to approximately 100 μm, a feedstock, such as in the form of solid and/or granular materials, can be provided through multiple feedports 1124, 1144. Certain monolithic feedstocks used for making a composite material can be fed though together via a single feedport 1124 or separately through multiple feedports 1124, 1144. Via certain exemplary embodiments, a metal-matrix composite such as containing ceramic particles (of single size or various sizes), e.g., silicon carbide, boron carbide, alumina, tungsten carbide, fly ash, etc., can be embedded in aluminum, copper, lithium, magnesium, iron, nickel, titanium, niobium, tantalum, molybdenum, cobalt, and/or their alloys, potentially with one or more reinforcement phases, can be produced. In certain exemplary embodiments, a malleable metal alloy of deformable feedstock can serve as a matrix for harder reinforcement phases and/or particles to be uniformly embedded in it.

More than one type of malleable or deformable feedstock 1124, 1144 can be fed at the same time. Depending on their compatibility, elements in feedstocks 1124, 1144, e.g., aluminum, copper, lithium, magnesium, iron, nickel, titanium, niobium, tantalum, molybdenum, cobalt, and/or their alloys, can dissolve partially or completely in each other during the operation, can create new phases through chemical reaction, and/or can coexist with or without any metallurgical bonding between them. Certain exemplary embodiments can cause precipitation of dissolved elements, such as but not limited to, copper and/or silicon from aluminum, carbon from iron, and/or new phases before and/or after processing with and/or without post-processing. The alloys and/or their microstructures can be further optimized using post-processing that involve heating, cooling, and/or plastic deformation, such as under an influence of one or more electrical and/or magnetic fields in an inert and/or ambient atmosphere. In certain exemplary embodiments, the extruded material 1800 can be re-processed via a method disclosed in this document and/or any other existing manufacturing methods such as casting, forging, rolling, machining, welding, pressing, sintering, 3D printing, etc., to generate desired properties.

Applications of certain exemplary embodiments can include:
  Refining the microstructure of the feedstock(s) 1124, 1144 using severe plastic deformation, e.g., with a total shear strain accumulation above 0.5, to enhance material properties such as, but not limited to, tensile strength, yield strength, endurance limit, hardness, wear resistance, creep resistance, electrical conductivity, and/or thermal conductivity, etc.;
  Achieving up to 99% reduction in cross-sectional area of a feedstock 1124, 1144 in a single-step continuous extrusion process;
  Feeding and mixing ceramic and/or metallic materials to achieve in-situ manufacturing composite material;
  Solid-state alloying using metallic elements that are dissolved in each other with or without the influence of severe plastic deformation; and/or
  Forming solid-state alloys using immiscible alloying elements such as, but not limited to, copper and niobium, copper and tantalum, copper and tungsten, aluminum and iron, any combination of which can have very low solubility, such as less than 1% at room temperature as per binary phase diagrams, in each other and/or elements that do not form alloys in normal circumstances. Under the application of hydrostatic pressure above the flow stress of the feedstock 1124, 1144 and/or severe plastic deformation these elements can dissolve in each other to form alloys. This concept can also be applied to multiple element system such as ternary alloy (with three elements) systems and quaternary (four alloying element) systems, etc. In some exemplary alloy systems, solid solubility can be further increased under application of severe plastic deformation. The increased solid solubility can be utilized to engineer properties such as mechanical, electrical, thermal, chemical, and/or electrochemical properties.
  Producing nanostructured extruded materials 1800 with a grain size ranging from approximately 2 nanometers to approximately 100 nanometers and/or ultrafine grained processed materials with grainsize ranging from approximately 2 nanometers to approximately 500 nanometers using severe plastic deformation and/or controlled recrystallization.
  In-situ alloying using reactive feedstocks 1124, 1144 such as, but not limited to, aluminum and nickel, aluminum and copper, aluminum and titanium, any of which combinations can readily interact with each other to create an exothermic reaction. In certain exemplary embodiments, one or more of these feedstocks and/or combinations can be processed without melting to control the reaction rate, such as by maintaining each element's temperature below its melting point. The in-situ alloyed extruded material 1800 produced using this method can be further enhanced using heat treatment and/or other post processing technique (note that this concept can also be applied to multiple element system such as ternary alloy (with three elements) system and quaternary (four alloying element) system);
  Consolidating granular and/or discrete feedstocks 1124, 1144 including mechanically alloyed particulates, powder, granules, machined chips, and/or swarf, etc.;
  Producing extruded material 1800 that can serve as feedstock(s) for welding, soldering, brazing, additive manufacturing, and/or thermal spray applications, etc.; and/or
  Depositing extruded material 1800 directly on to a substrate or previously deposited layer.

The apparatus and/or tool 1000 utilized for implementation of certain exemplary embodiments can be accommodated on a small milling machine with a working envelop of approximately 6 inches in the vertical/Z direction without any X and Y axis movement. A standalone system 1000 with an independent drive unit for material feeding, along with its control system and tooling can be accommodated within an approximately 0.25 m³ envelope.

Since energy can be applied and/or heat can be generated at the point of need, the energy loss through heat loss to the environment can be minimized. Additionally, the energy efficiency of the process can be enhanced by the solid-state nature of the feedstock(s) 1124, 1144.

Heat generated by this process can be dissipated from the surface area surrounding rotor 1200 and/or can be recovered via internal cooling passages in rotor 1200 and/or container 1400 and/or via an external cooling jacket. Recovered energy can be recycled.

Certain exemplary embodiments of machine 1000 can employ continuous severe plastic deformation to produce extruded materials 1800 demonstrating microstructural refinement, composite materials, consolidated particulate materials, and/or solid-state alloys by continuously extruding extruded material 1800 using a rotating non-consumable rotor 1200 that is at least partially confined in cavity 1900 that is defined within container 1400.

An exemplary embodiment is shown in FIGS. 7-11, where an exemplary arrangement of rotor 1200 and container 1400 is shown. Rotor 1200 can be powered by a drive (e.g., electrically-, hydraulically-, and/or pneumatically-powered motor, rotary actuator, linear actuator, piezo electric actuator, solenoid, etc.) and/or connected to a powered and/or driven spindle and/or can be programmed to rotate between approximately 1 rpm and approximately 10,000 rpm and/or translate in a direction parallel to rotational axis R-R and/or radially at a speed between approximately 1 mm/h and approximately 100 m/h. The rotation of rotor 1200 can generate a relative motion with the incoming feedstock to generate heat and/or deformation in the direction of rotation. Rotor 1200 can, but need not, have a generally conical frustum shape and/or can be constructed with or without a shoulder. Rotor 1200 can, but need not, have and/or define geometrical and/or mechanical features, such as one or more fins, flutes, flats, slots, threads, steps, nubs, buttons, and/or protrusions on one or more exterior surfaces and/or one or more interior surfaces of rotor 1200. As shown in FIGS. 103-105, when rotor 1200 is viewed along rotational axis R-R from its distal terminus, rotor 1200 (e.g., semi-contained portion 1240 and/or contained portion 1260) can define a visible proximal perimeter or optical projection 1288 that is located a selected distance toward the proximal end of rotor 1200 with respect to distal terminus 1285. The length of visible proximal perimeter 1288 can be greater than the length of a visible distal perimeter or optical projection 1286 defined by distal end portion 1280. Stated differently, looking along rotational axis from distal terminus 1285, an annular portion 1289 of rotor 1200 can be visible, that annular portion 1289 located closer to the proximal end of rotor 1200 with respect to distal terminus 1285. The existence of this visible annular portion 1289 can geometrically indicate that stirred material 1800 can be operatively forced, by the rotation of rotor 1200, from, e.g., feedport exit 1126, toward the distal end of rotor 1200 and/or toward die 1500, even if stirred material sticks to rotor 1200 and/or goes unwiped from rotor 1200. That is, this geometry can indicate that there is more surface area having a component facing toward the distal end that is available to apply distally-directed pressure to stirred material 1700 than there is surface area having a component facing toward the proximal end to apply a proximally-directed pressure, such that rotor 1200 operatively applies a net positive distally-directed pressure to stirred material 1700.

Container 1400 can define at least one cavity 1900 to accommodate at least a contained portion 1260 of rotor 1200, any semi-contained portion 1240 of rotor 1200, at least one feedport 1124, 1144, a die 1500, and/or a container exit 1480. The die can, but need not, be an integral part of container 1400. Container 1400 can be stationary and/or rigidly fixed to a mounting platform and/or frame 1660 using one or more of mounting brackets and/or mounting fasteners. Container 1400 can, but need not, have cavity-facing and/or externally facing features, such as one or more fins, flutes, threads, steps, nubs, buttons, and/or protrusions, which can be configured to control the material flow direction. Any feedport 1124, 1144 can be the pathway for the feedstock to enter into cavity 1900, where rotor 1200 can rotate and/or can translate in a predefined direction, pattern, and/or path, such as around and/or along its rotational axis. This movement of rotor 1200 can dynamically change a magnitude of the radial gap $G_R$ and/or axial gap $G_A$ between container 1400 and rotor 1200, such as at the feedport exit 1126, 1146. Translation is not necessary if rotor 1200 is designed in such a way that the magnitude of the radial gap $G_R$ and/or axial gap $G_A$ dynamically changes upon rotation of rotor 1200. For example, if rotor 1200 is eccentric and/or out of balance about its rotational axis R-R and/or if rotor 1200 and/or contained portion 1260 has certain external surface features, such as those shown in FIGS. 30-39, the magnitude of the radial gap $G_R$ and/or axial gap $G_A$ can change during rotation. Such gap changes can urge feedstock 1122, 1142 and/or stirred material 1700 toward die 1500. More generally, gap changes that can create such movement of feedstock 1122, 1142 and/or stirred material 1700 can be due to radial wobble, vibration having a radial and/or axial component, and/or surface geometry, etc. Moreover, drive 1300 can be configured to move rotor 1200, rotationally and/or axially, in a continuous, cyclical, controlled, timed, periodic, aperiodic, and/or reciprocating manner. Axial motion of rotor 1200 can be created by interactions between feedstock 1124, 1144 and rotor 1200. For example, as feedstock 1122, 1142 enters cavity 1900, it can intermittently encounter a rotating feature on rotor 1200, that encounter causing periodic forces, a component of which can be aligned parallel to the rotational axis, to be applied to feedstock 1122, 1142 and/or corresponding reaction forces on rotor 1200. When the magnitude of the radial gap $G_R$ and/or axial gap $G_A$ increases, the feedstock 1122, 1142 can enter cavity 1900 via feedstock exit 1126, 1146. During this process, entering feedstock can contact and/or fully or partially remove stirred material that is sticking to the exterior surface of rotor 1200. When the magnitude of the radial gap $G_R$ and/or axial gap $G_A$ decreases, rotor 1200 can apply a force on, deform, mix, consolidate, and/or move the stirred material 1700 towards die 1500 and/or container exit 1480, and/or can decrease and/or block the flow of feedstock 1122, 1142 into cavity 1900.

Figure 7:
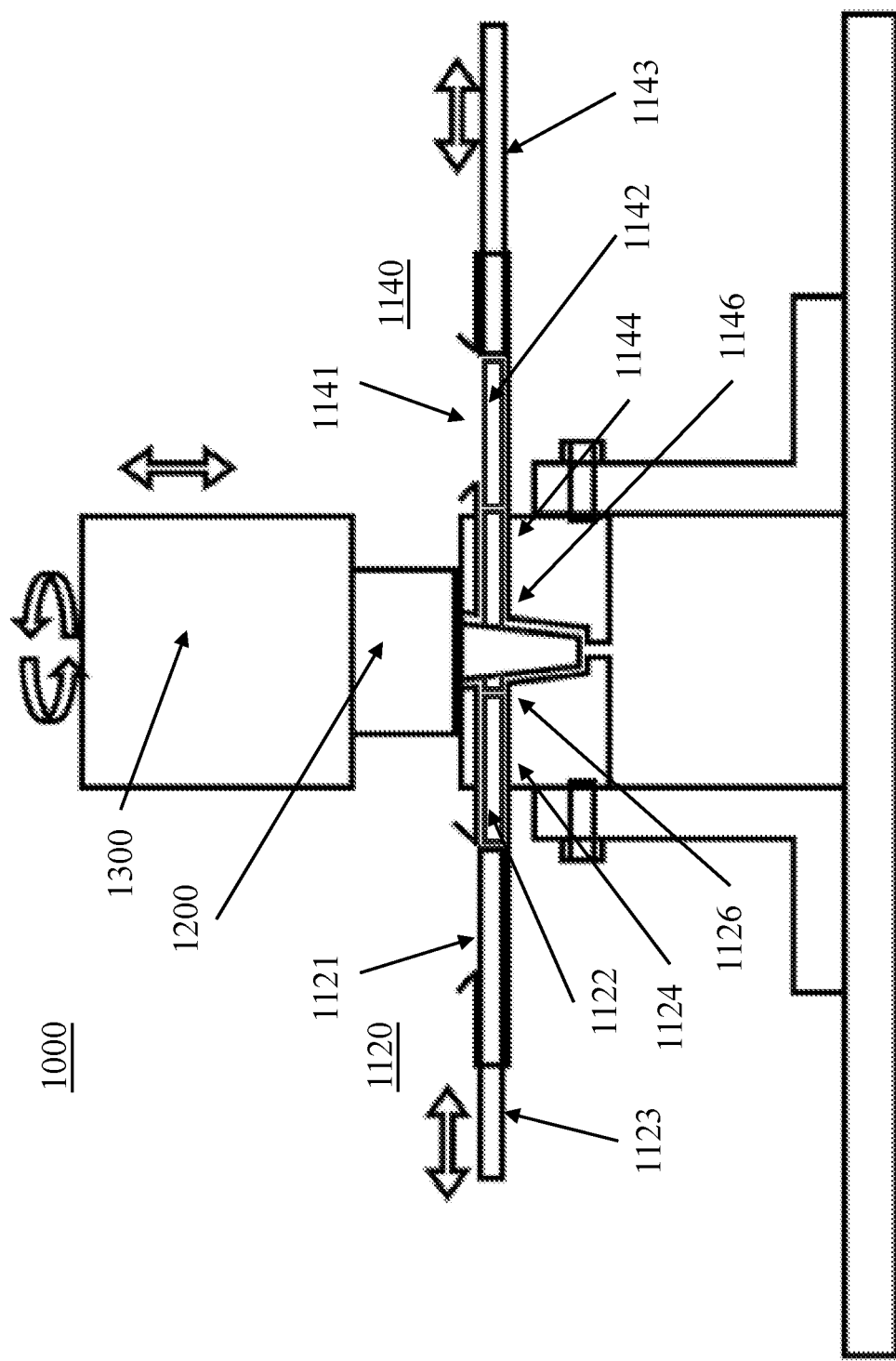
FIG. 7 is a perspective view of an exemplary embodiment of a machine 1000.
Figure 8:
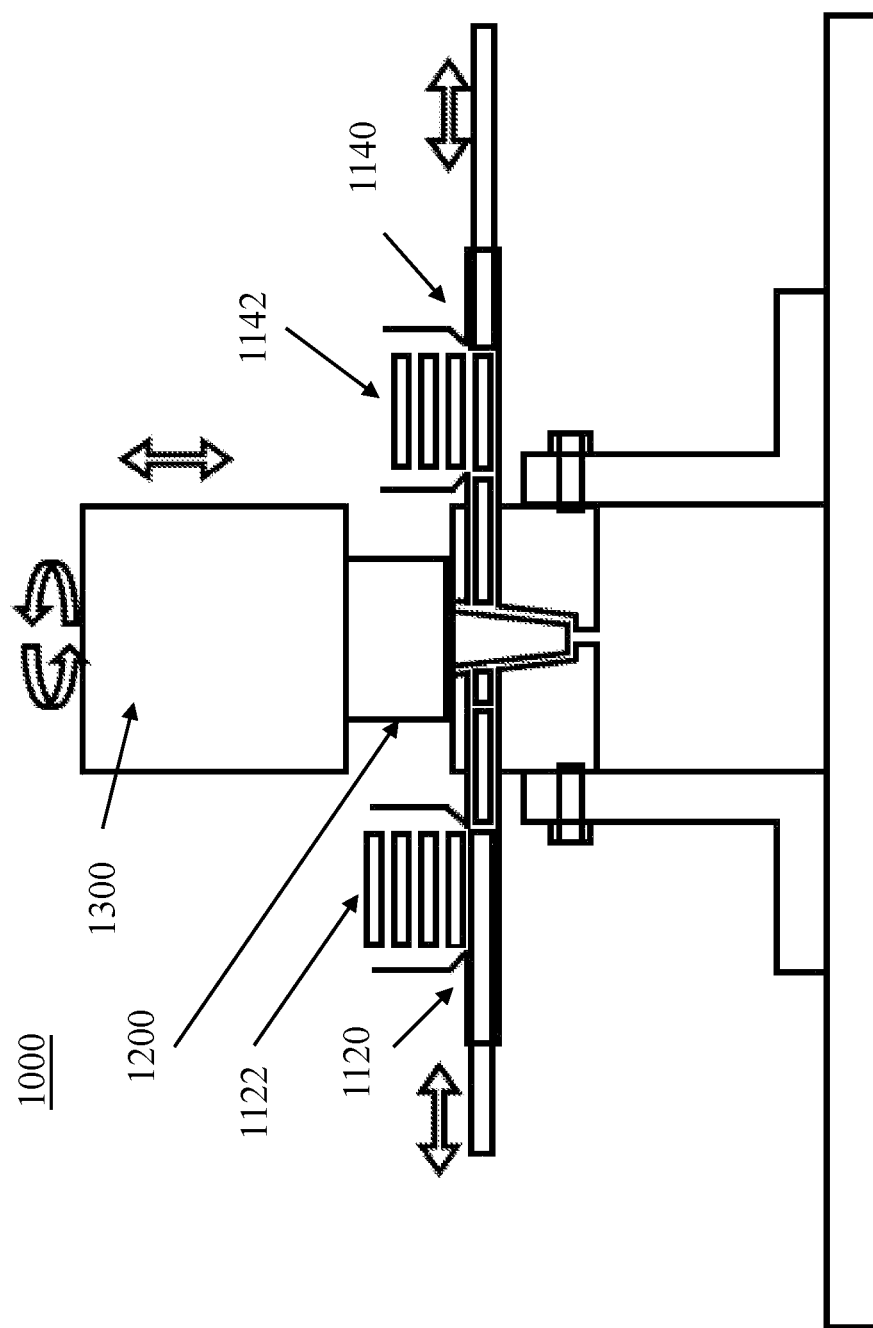
FIG. 8 is a cross-sectional view, taken at section S-S of FIG. 12, of an exemplary embodiment of a machine 1000.
Figure 9:
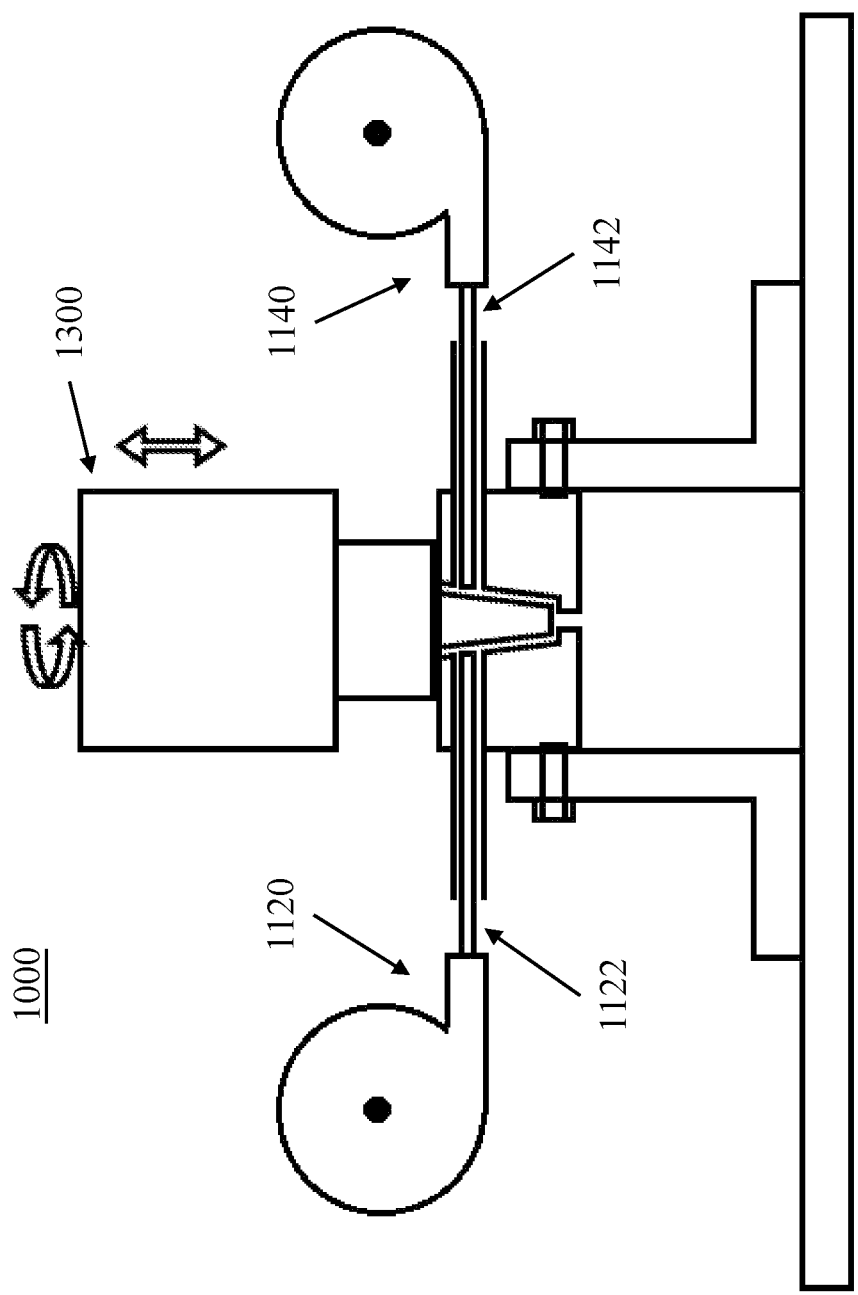
FIG. 9 is a cross-sectional view, taken at section S-S of FIG. 12, of an exemplary embodiment of a machine 1000.
Figure 10:
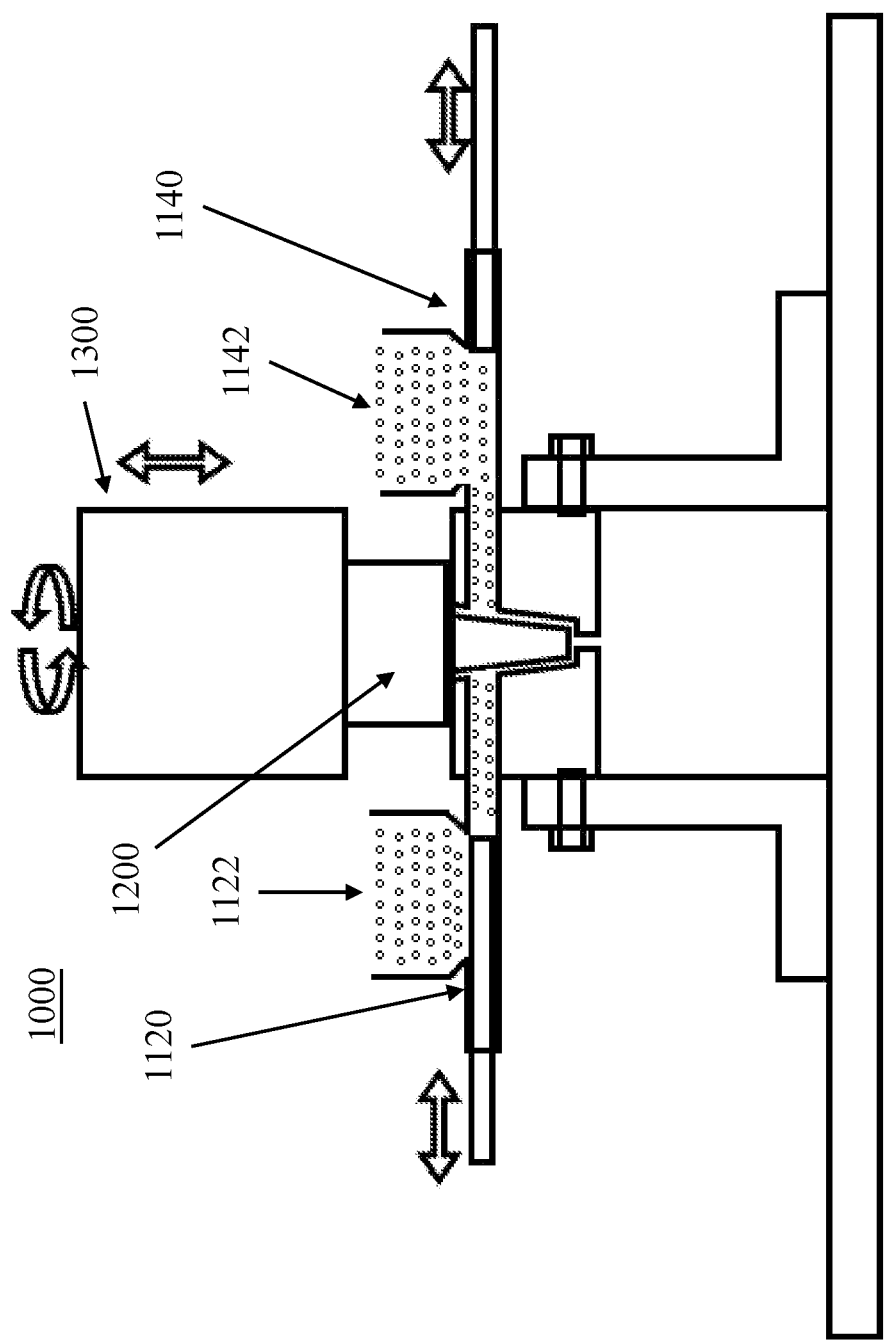
FIG. 10 is a cross-sectional view, taken at section S-S of FIG. 12, of an exemplary embodiment of a machine 1000.
Figure 11:
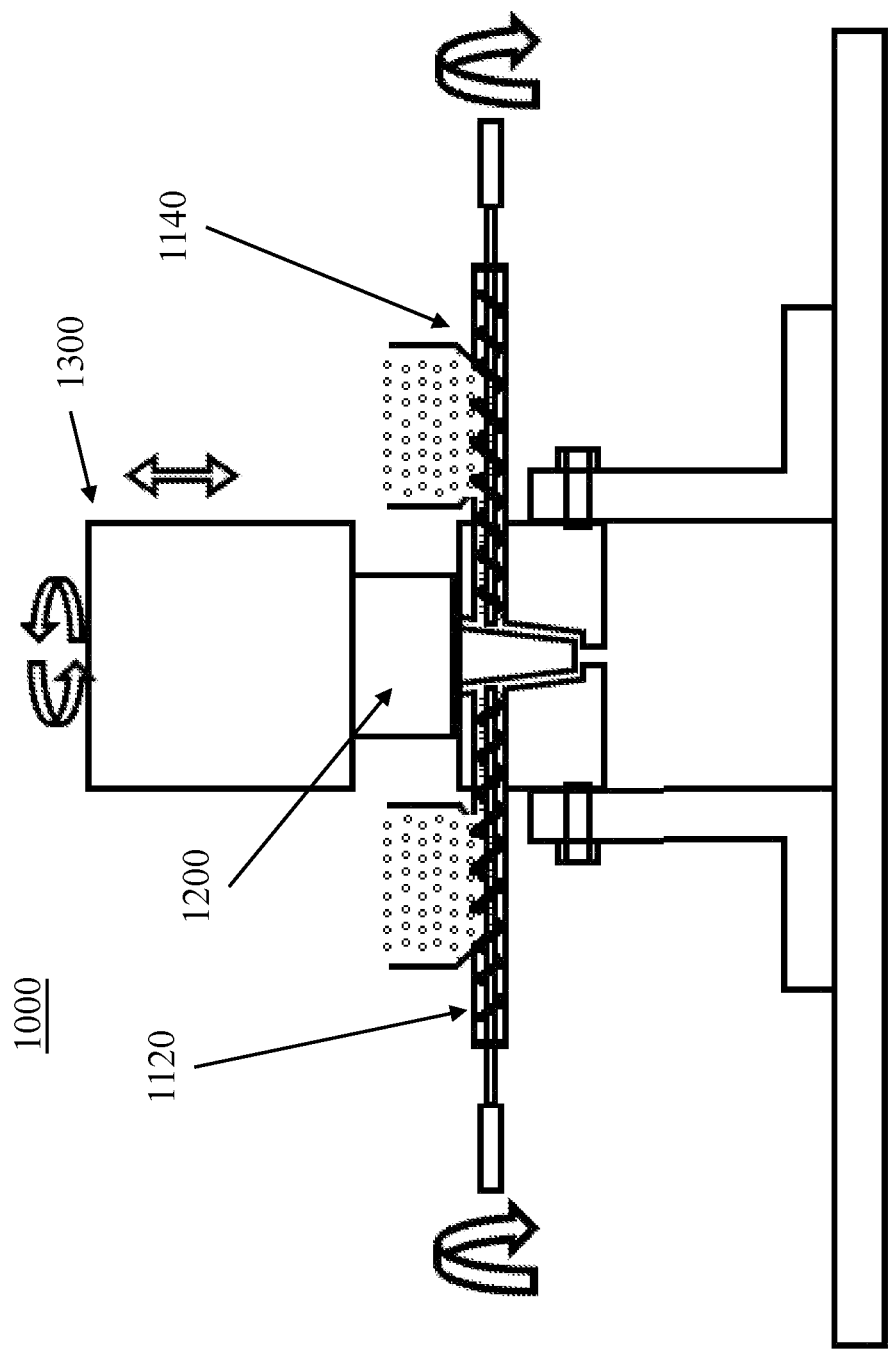
FIG. 11 is a cross-sectional view, taken at section S-S of FIG. 12, of an exemplary embodiment of a machine 1000.

As shown in FIG. 7, feeder 1120 can comprise a feedport opening 1121 and/or a feed mechanism 1123, 1143. Feedstock 1122 can enter feedport 1124 through feedport entrance 1121 and/or feed mechanism 1123 can move feedstock 1122 through feedport 1124 towards cavity 1900 and out of feedport 1124 through feedport exit 1126. In certain exemplary embodiments, a feedport can have any cross-sectional shape. In certain exemplary embodiments, a feedport can be narrower, as measured perpendicular to the rotational axis R-R of rotor 1200, than the reach and/or maximum outer radius of rotation of rotor 1200. In certain exemplary embodiments, the dimensions of the feedport can be selected to prevent the feedstock from entering cavity 1900 in a manner, location, and/or orientation that the feedstock would avoid contact with and/or bypass rotor 1200 without being plastically deformed. One or more feedstocks in non-liquid state and/or a solid-state can be fed through one or more feedports together or separately. For example, discrete solid-state feedstocks such as, but not limited to, powder, pellets, chunks, and/or agglomerates, and/or continuous solids such as rods, wires, and/or tubes with fillings, can be fed through one or more feedports together or separately. One feedstock can be malleable and/or deformable at a temperature between room temperature and the melting point of that feedstock. A feed mechanism can be chosen according to the feedstock requirement. For example, for a discrete solid feedstock a reciprocating piston-type feeding mechanism can be used as shown in FIGS. 7, 8, and 10. For continuous feeding of a solid feedstock, a pinch roller-type feeding mechanism, as shown in FIG. 9, and/or a gear-type mechanism, can be used. For feedstocks such as powder metals, ceramic powder, fly ash, swarfs, pellets, etc., an Archimedes screw/auger-type feeding mechanism, as shown in FIG. 11, and/or a piston-type feeding mechanism can be used separately or in combination.

Rotor 1200 and/or container 1400 can have various surface features such as fins, flutes, slots, threads, steps, nubs, buttons, protrusions, and/or predetermined geometries. The dimensions of container 1400, cavity 1900, and/or feedport 1124, 1144 can be related to the dimensions of rotor 1200. To avoid contact between rotor 1200 and container 1400, within a given horizontal plane that cuts perpendicularly through rotational axis R-R, while rotor 1200 is rotating and/or translating, the inner diameter of container 1400 can be larger than the outer diameter of the contained portion 1260 of rotor 1200 by approximately 0.1 mm to approximately 100 mm. The overall length of container 1400 can be shorter or longer than rotor 1200 as a whole and/or than the combined length of semi-contained portion 1240 and contained portion 1260 of rotor 1200. A feedport can be as wide as the width of rotor 1200 and/or narrower than that width at any given location of feedport. The magnitude of the radial gap $G_R$ between rotor 1200 and container 1400's interior side wall can vary along the axial direction (i.e., can vary from one horizontal plane that cuts perpendicularly through rotational axis R-R and another such plane) and/or can be between approximately 0.1 mm and approximately 100 mm.

The magnitude of the radial gap $G_R$ or the axial gap $G_A$ can be as small as zero when rotor 1200 is inserted into container 1400 sufficiently that rotor 1200 contacts container 1400. If enough of rotor 1200 is removed from container 1400, such that none of the contained portion 1260 of rotor 1200 is below the centroid of feedport exit 1126, the radial gap $G_R$ might grow to half the width of cavity 1900, which would extend radially across the entire inside of container 1400.

The overall angle of container 1400's interior side wall can be and/or vary between approximately 0° and approximately 45° with respect to rotor 1200's rotational axis R-R, and/or locally can be and/or vary between approximately 0° and approximately 90° with respect to rotor 1200's rotational axis R-R at any point along that axis. The overall angle of rotor 1200's side wall angle can be and/or vary between approximately 0° and approximately 45° with respect to rotational axis R-R, and/or locally can be and/or vary between approximately 0° and approximately 90° with respect to rotor 1200's rotational axis R-R at any point along that axis. The exterior wall(s) of rotor 1200 and the internal wall(s) container 1400 need not be parallel to each other.

Figures 20, 21:
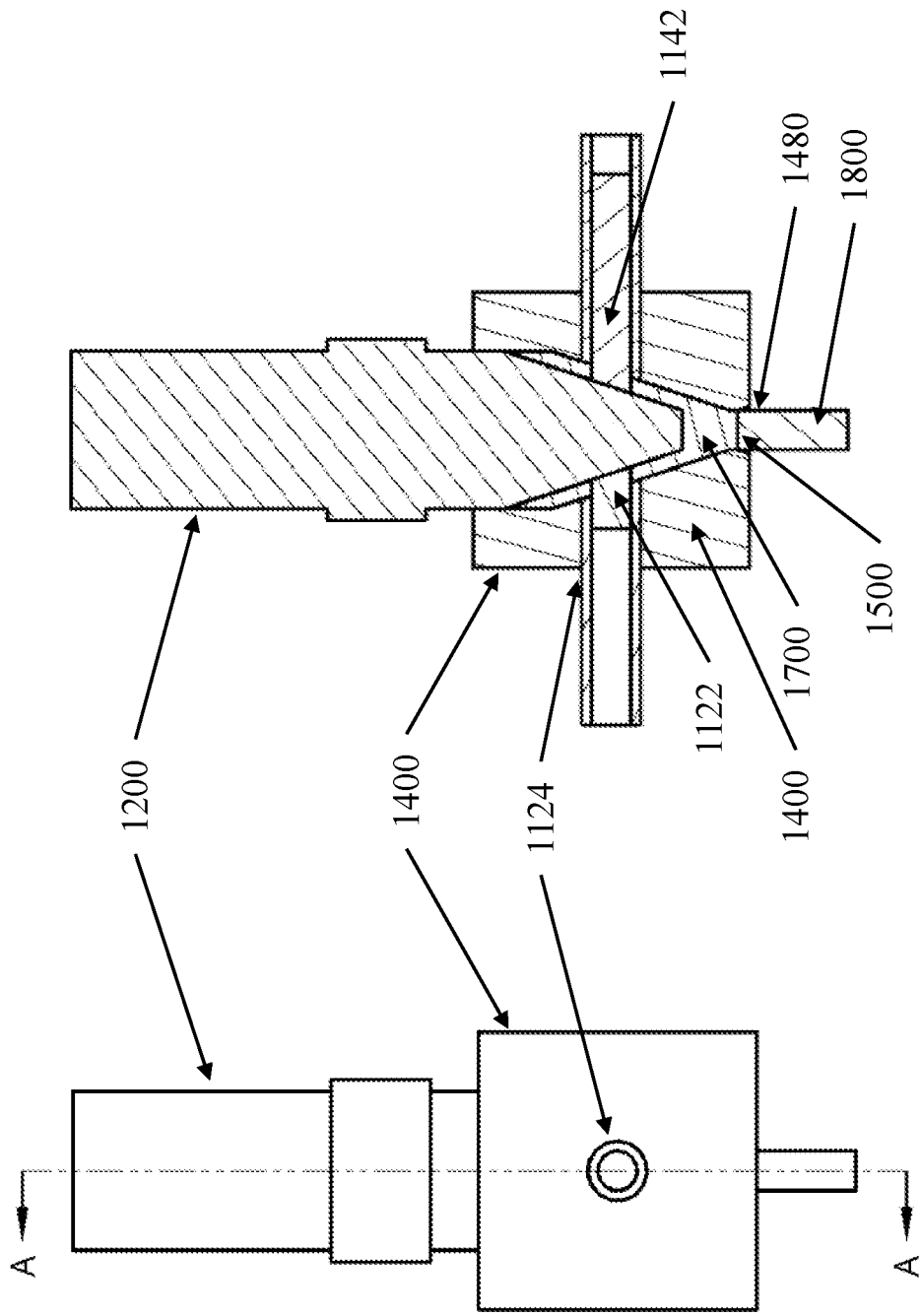
FIG. 20 is a side view of an exemplary embodiment of a machine 1000.
FIG. 21 is a cross-sectional view, taken at section A-A of FIG. 20, of an exemplary embodiment of a machine 1000.

As shown in FIGS. 20-29, rotor 1200, cavity 1900, container 1400, and/or die 1500 can be configured to produce a predetermined geometry for the extruded material. Examples of rotor and container configurations that can be used to produce rods and/or wires are shown in FIGS. 20 and 21. At die 1500 and/or container exit 1480, rotor 1200 can be configured in such way that extruded material 1800 is fully consolidated. The distance between the exit of die 1500 and the end of rotor 1200, the rotational speed of rotor 1200, and/or the feedstock feed rate can be varied between approximately 1 mm and approximately 100 mm, between approximately 1 rpm and approximately 10,000 rpm, and/or between approximately 1 mm/min and approximately 10,000 mm/min, respectively, to control the consolidation efficiency for a given combination of feedstock(s), rotor 1200, and/or container 1400.

Figures 46, 47:
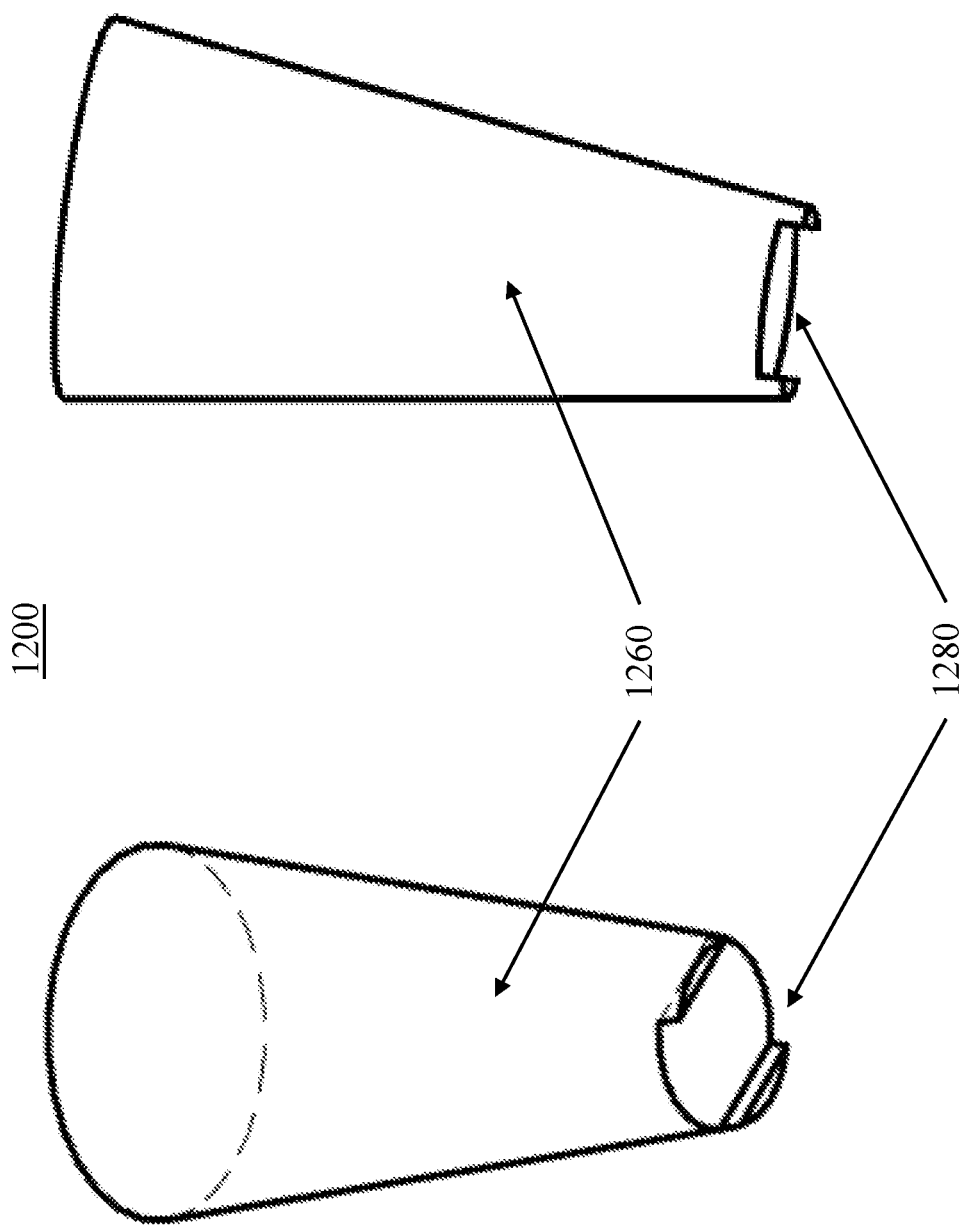
FIG. 46 is a perspective view of an exemplary embodiment of a rotor 1200.
FIG. 47 is a perspective view of an exemplary embodiment of a rotor 1200.
Figures 99, 100:
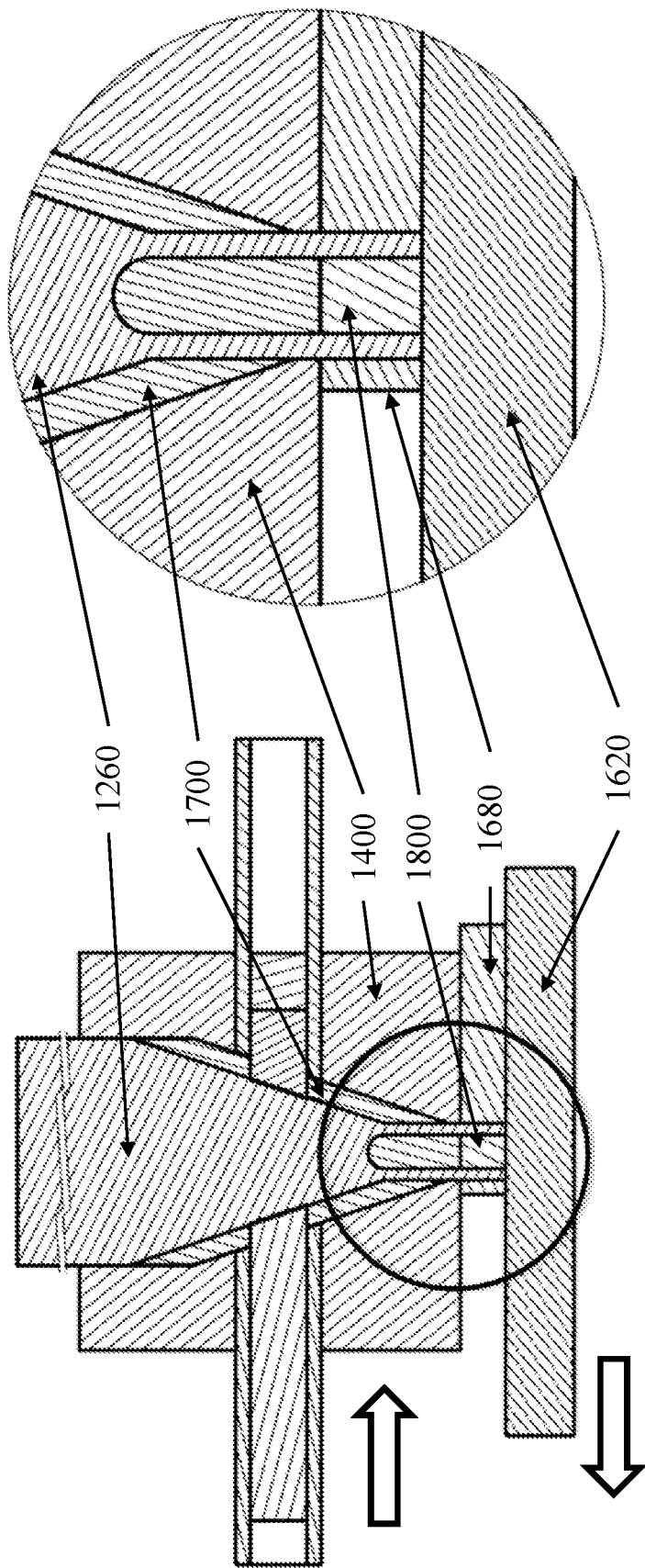
FIG. 99 is a cross-sectional view, taken at section A-A of FIG. 97, of an exemplary embodiment of machine 1000.
FIG. 100 is a detailed view of an identified portion of FIG. 99.
Figures 101, 102:
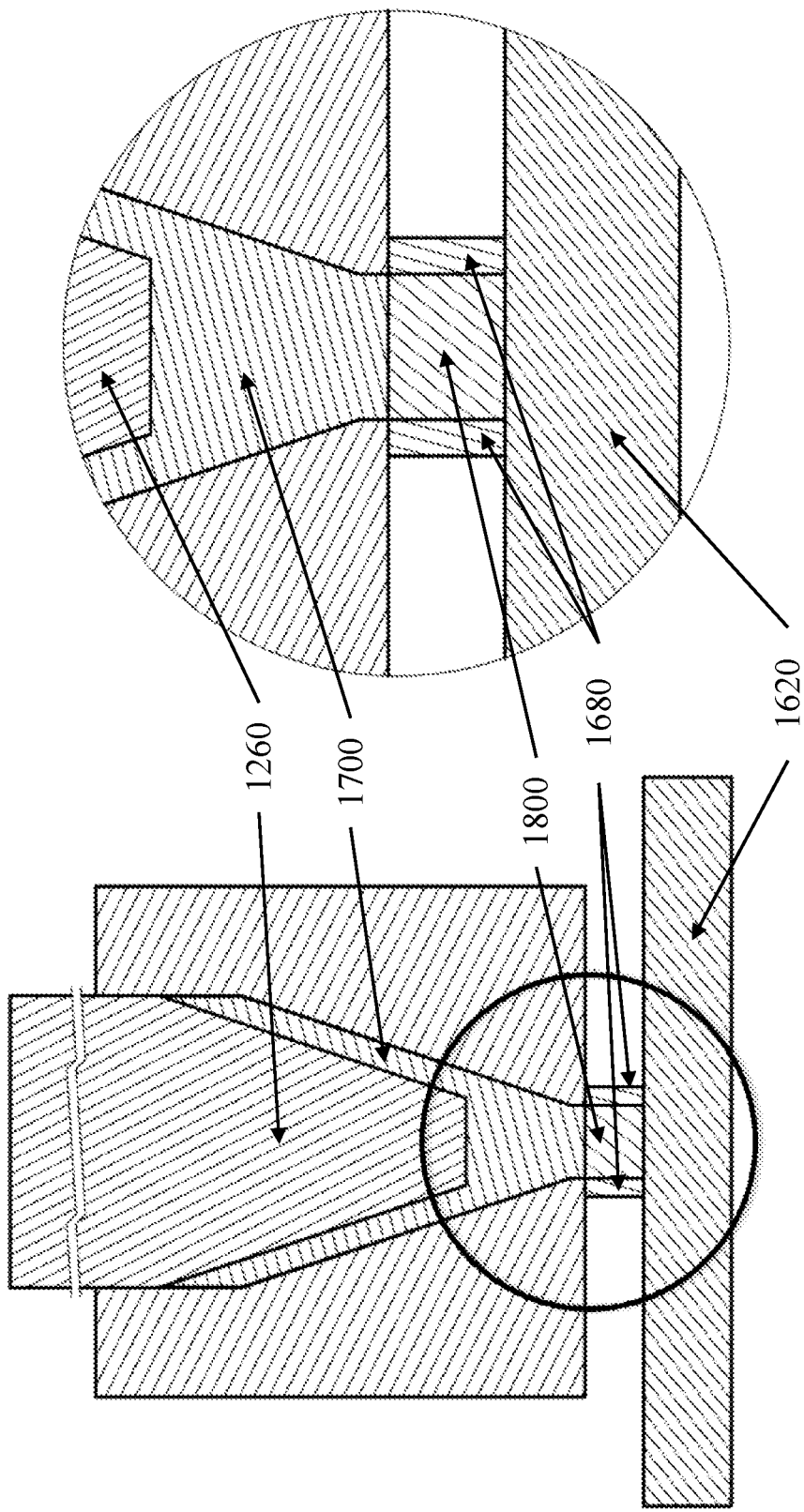
FIG. 101 is a cross-sectional view, taken at section B-B of FIG. 98, of an exemplary embodiment of machine 1000.
FIG. 102 is a detailed view of an identified portion of FIG. 101.

FIGS. 28, 29, and 97-102 show example configurations of rotor 1200, container 1400, and substrate 1620, upon which extruded material can be deposited. A rotor with distal end portion 1280, such as shown FIGS. 46 and 47, can used for depositing extruded material 1800 onto substrate 1620 as deposited material 1680. The rotor end portion 1280 can touch substrate 1620 and/or generate frictional heat, deform the surface of substrate 1620, and/or break a contaminated and/or oxidized layer on the surface of substrate 1620. During this process, extruded material 1800 can flow within the encircled area of the end portion and/or fill the space between substrate 1620 and rotor 1200. As shown in FIG. 99, upon a relative movement of substrate 1620 and container 1400, extruded material 1800 can be deposited onto substrate 1620 as deposited material 1680. The deformation and/or heat generated by the rotary motion of rotor 1200's distal end portion 1280 under a hydrostatic pressure can cause some extruded material to flow in front of the distal end portion 1280 in the direction of its relative movement and/or produce a metallurgical bonding between deposited material 1680 and substrate 1620.

Figure 22:
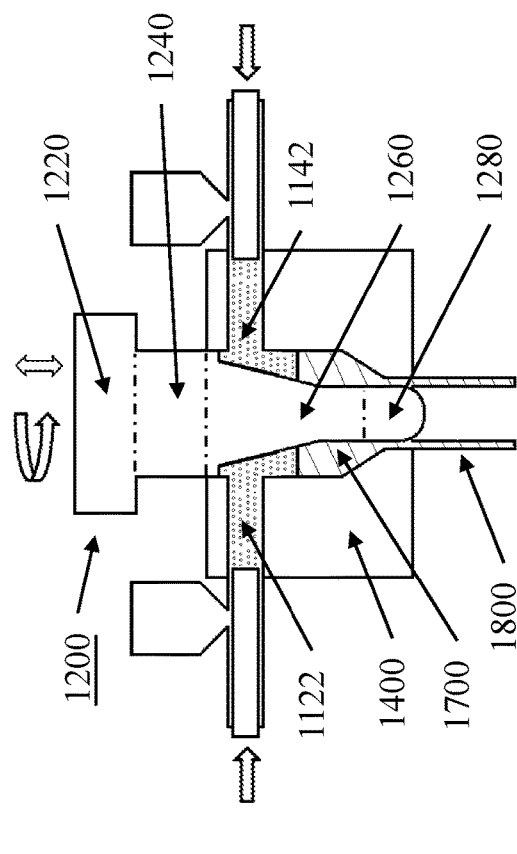
FIG. 22 is a cross-sectional view, taken at section S-S of FIG. 12 of an exemplary embodiment of a machine 1000.
Figure 23:
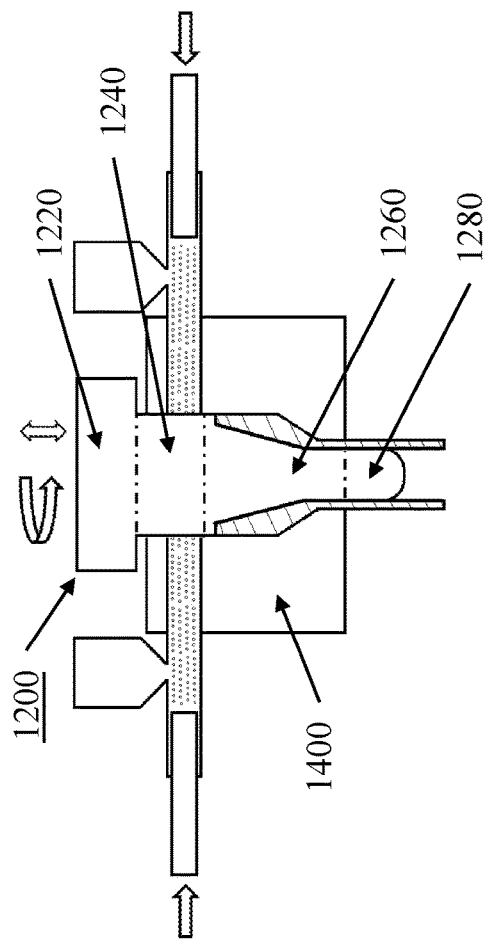
FIG. 23 is a cross-sectional view, taken at section S-S of FIG. 12, of an exemplary embodiment of a machine 1000.
Figures 26, 27:
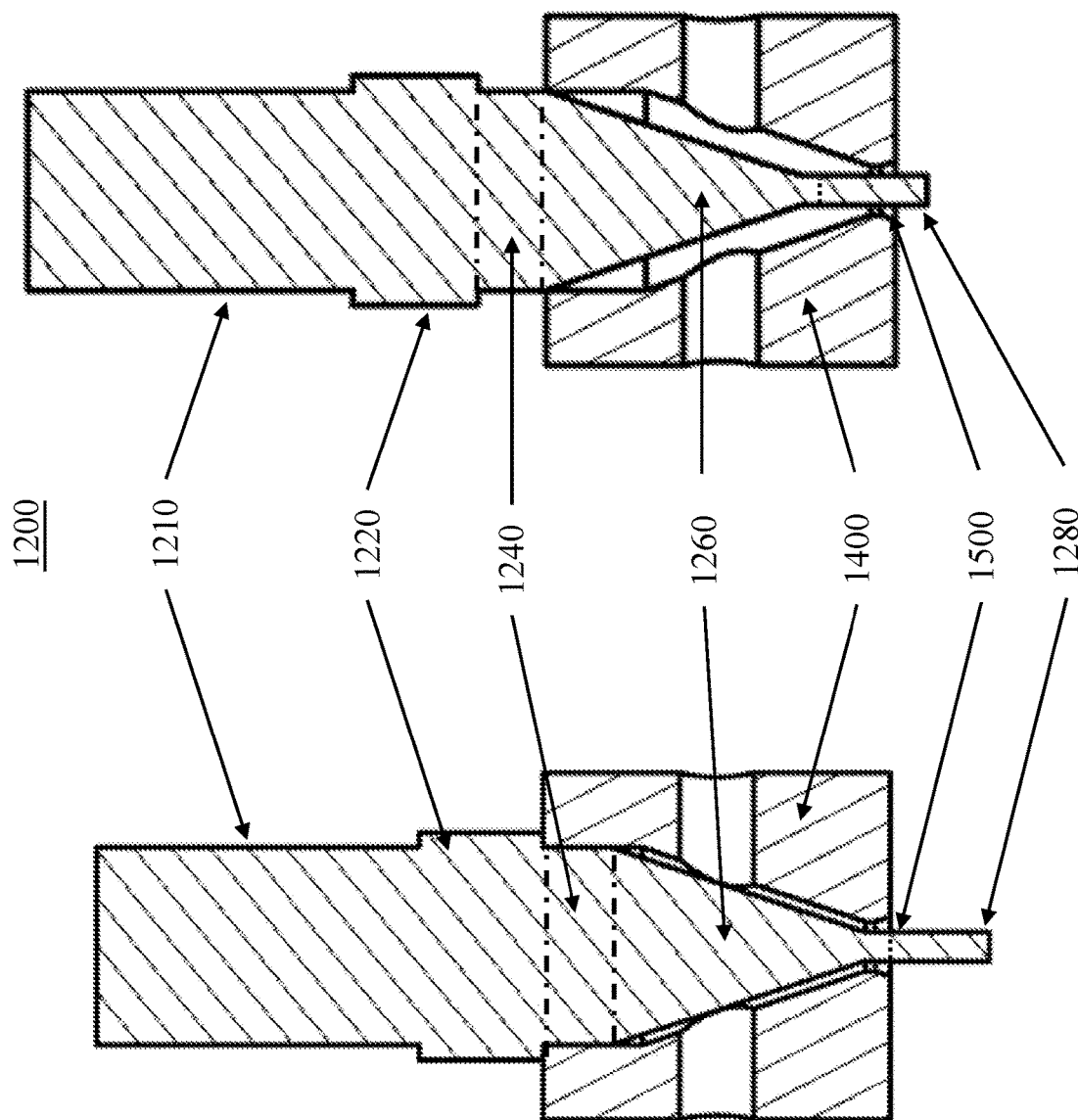
FIG. 26 is a cross-sectional view, taken at section S-S of FIG. 12, of an exemplary embodiment of a machine 1000.
FIG. 27 is a cross-sectional view, taken at section S-S of FIG. 12, of an exemplary embodiment of a machine 1000.
Figures 42, 43:
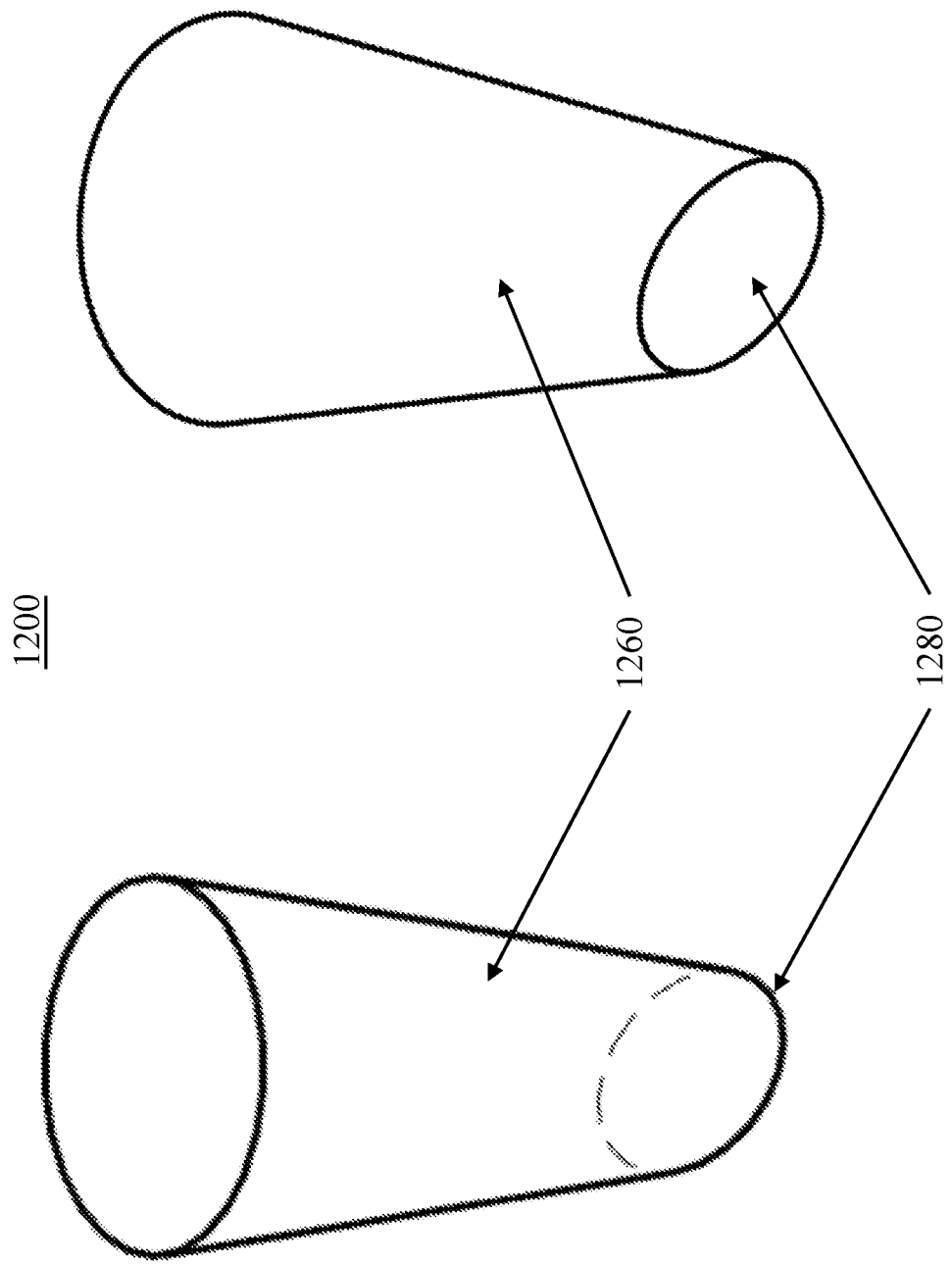
FIG. 42 is a side view of an exemplary embodiment of a rotor 1200.
FIG. 43 is a perspective view of an exemplary embodiment of a rotor 1200.
Figure 86:
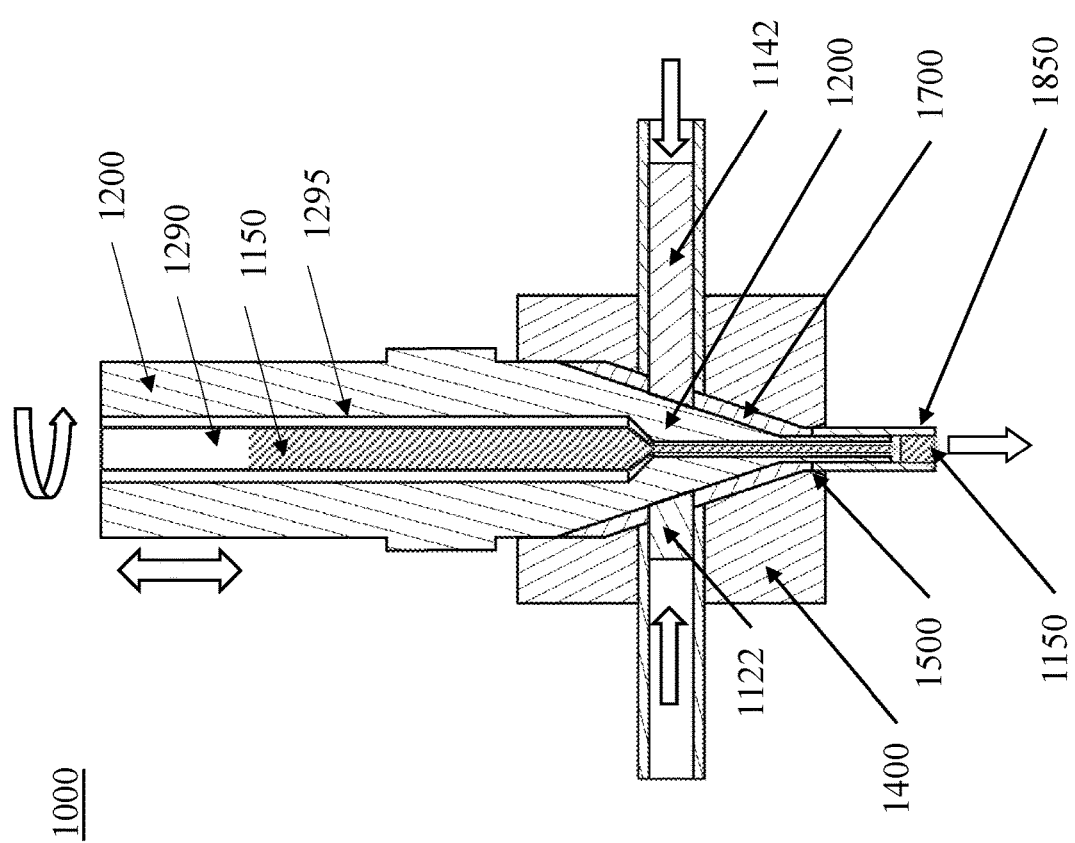
FIG. 86 is a cross-sectional view, taken at section S-S of FIG. 12, of an exemplary embodiment of a machine 1000.
Figure 87:
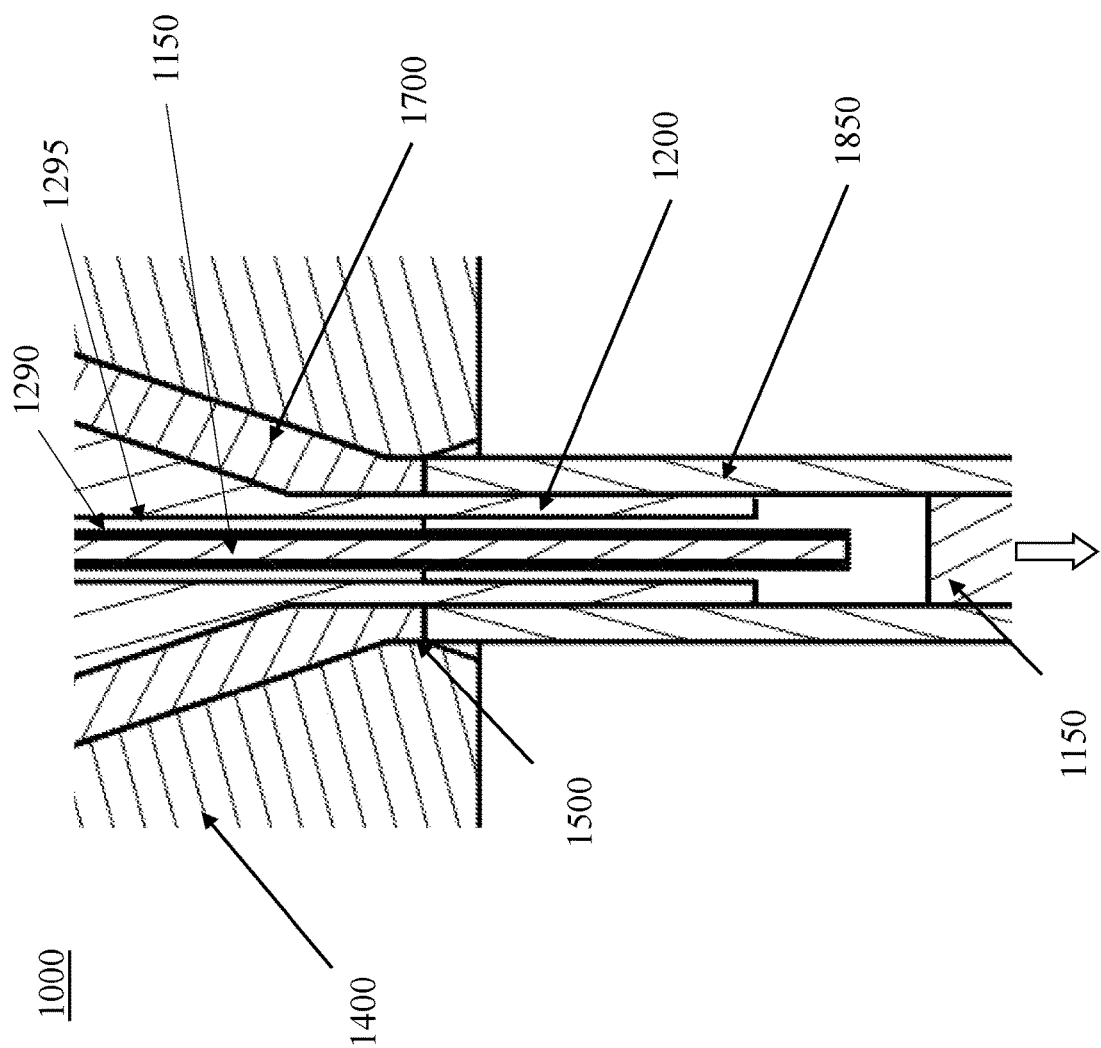
FIG. 87 is a detailed view of FIG. 86, of an exemplary embodiment of a machine 1000.

FIGS. 22 and 23 show an example configuration of rotor 1200 and container 1400 for producing extruded material 1800 in tube and/or pipe form where an annular cross-sectional shape (i.e., defining an inner space of the extruded material that is circular or any closed polygonal shape, such as oval, triangular, rectangular, square, hexagonal, etc.) can be defined between rotor 1200 and the exit of die 1500 and/or applied via tool 1000 to extruded material 1800. The inner and/or outer diameters of that, e.g., annular, shape can define the dimensions of the cross-section of the produced annular tube and/or pipe. FIGS. 86 and 87 show an example configuration of a rotor 1200 and container 1400 for producing materials in tube, pipe, and/or wire form 1850 with internal filling 1150 in them, that filling 1150 being one or more fluxes, metals, alloys, and/or ceramics. Such tubes, pipes, and/or wires 1850 can be produced in any length, and/or can be used as filler rods for joining, welding, overlaying/cladding, and/or thermal and/or cold spray coating. Secondary phases with higher electrical and/or thermal conductivity, such as graphene and/or carbon nano-tubes, and/or silver and copper, can serve as a filling 1150 in lower conductivity tubes 1850 to enhance electrical and/or thermal conduction. Super-conducting materials that are very brittle and/or harder to processes can be serve as a filling 1150 in metallic alloy tubes 1850 for ease of handling and/or further processing. Ceramic particles and/or fibers of various sizes can serve as a filling 1150 that can stiffen and/or strengthen an extruded tube 1850. Radioactive, toxic, and/or corrosive filling materials 1150 can be safely stored by placement within a closed, extruded tube 1850 for an extended period of time. The above-mentioned applications can be performed with or without any post-process manufacturing steps such as heat treatment, wire drawing, machining, and/or grinding, etc. To prevent a filling from falling out, an extruded tube, pipe, and/or wire 1850 can be crimped and/or plugged at one or both ends. Filling 1150 can be fed into tube, pipe, and/or wire 1850 through a conduit 1290 defined in a rotor passage 1295 located in a center and/or interior of rotor 1200.

In certain exemplary embodiments, rotor passage 1295 can serve as a back-extrusion channel via which stirred material and/or extruded material flows toward the proximal/driven end of the rotor.

In certain exemplary embodiments, rotor 1200, container 1400, and/or die 1500 can cooperate to apply to extruded material 1800 any desired collapsed and/or non-polygonal cross-sectional shape, such as ell, channel, T, I, etc.

Figure 15:
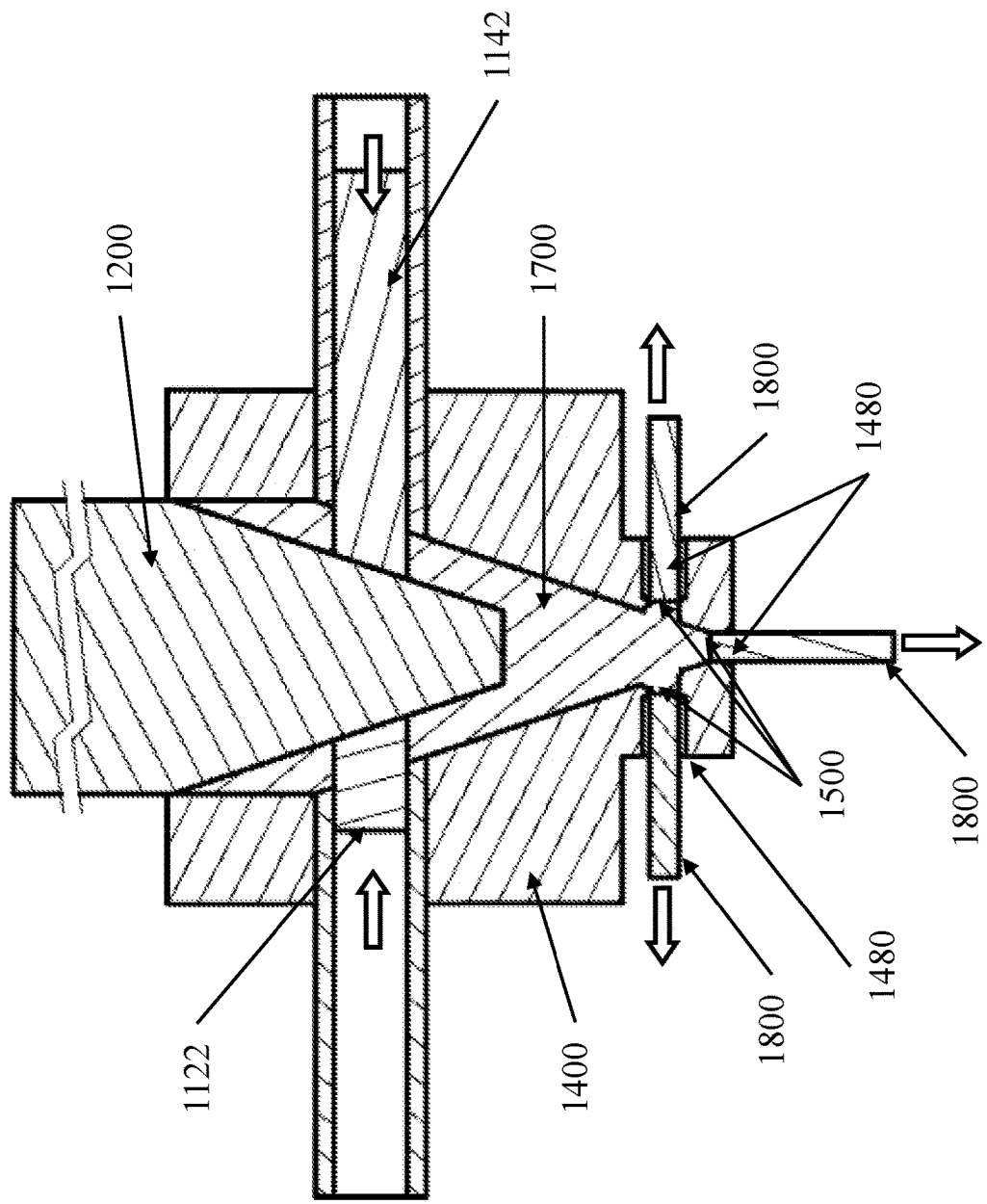
FIG. 15 is a cross-sectional view, taken at section S-S of FIG. 12, of an exemplary embodiment of a machine 1000.
Figure 16:
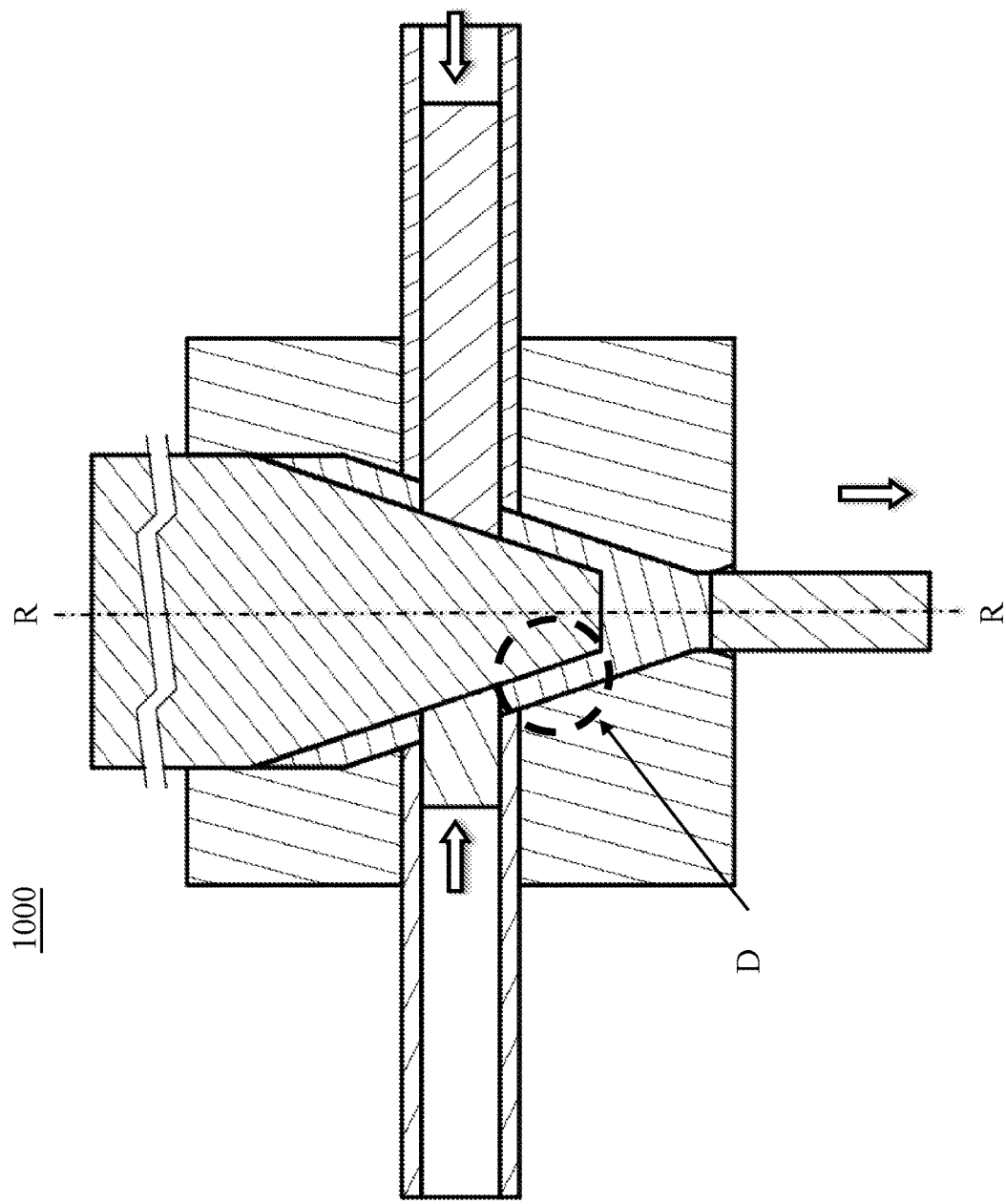
FIG. 16 is a cross-sectional view, taken at section S-S of FIG. 12, of an exemplary embodiment of a machine 1000.

Machine 1000 can utilize any number of feeders, feedports, dies, and/or container exits. For example, FIG. 15 shows an exemplary configuration having multiple dies 1500 and container exits 1480. A feedport, die, and/or container exit can be oriented at an angle between 0° and 90° to the rotational axis R-R of rotor 1200 as measured with respect to a plane that perpendicularly intersects axis R-R.

Machine 1000 can be positioned in any orientation such that rotational axis R-R is at any angle with respect to a horizontal plane. Since the feedstock can be plastically deformed, be embedded and/or dispersed in a plastically deformed material, and/or react and/or alloy with a plastically deformed material, the orientation of axis R-R need not adversely affect the operation of machine 1000. However, the feedport orientation might need to be adjusted based on the feedstock and orientation of axis R-R.

FIGS. 22 and 23 show an exemplary embodiment where severe plastic deformation, microstructural modification, consolidation, and/or extrusion can happen cyclically. In each cycle, a solid, powder, and/or granular feedstock 1122, 1142 can be consolidated, dispersed, alloyed, and/or extruded. This process can be applicable for processing high temperature feedstocks such as iron, nickel, cobalt, zirconium, and/or tungsten, and/or their alloys and/or composites. At step 1, for those feedstocks that might fall through cavity 1900 and die 1500, a piece of solid feedstock that is from approximately 0.1 mm to approximately 10 mm wider than the largest dimension of die 1500, and that has been pre-placed in container 1400, can be stirred to cover the die opening, which can support the compressive forces needed to compact and/or consolidate the powder and/or granular feedstock. At step 2 of the cycle, rotor 1200 can be partially retracted from container 1400 to expand cavity 1900 and/or to open one or more feedports 1124, 1144. One or more feedstocks 1122, 1142 can be pushed into a corresponding feedport 1124, 1144 using, e.g., a screw conveyer and/or piston-type push rod, and then on into container 1400 and/or cavity 1900. At step 3, the rotating rotor 1200 can be plunged into container 1400 to compress the feedstock 1122, 1142 within cavity 1900. During this step frictional and/or adiabatic heat (i.e., heat occurring in essentially only the stirred material due to deformation and/or with no appreciable heating of the rotor and/or container) can be generated, along with an intense shear deformation, which can be sufficient to generate conformal contact between the particles of the feedstock. The shear deformation under compressive forces can create metal-to-metal contact between the particles and/or with a previously consolidated feedstock. During this operation any contaminated and/or oxidized layer on the surface of the feedstock can be broken to establish a metal-to-metal contact. Upon further plunging of rotor 1200 the consolidated stirred material 1700 can be extruded through the die with further reduction in cross section. During this step the feed tube can be filled from the powder hopper and/or degassed with the help of the process heat. At the end of step 3 rotor 1200 can be retracted and/or cooled. Steps 2 and 3 can be repeated to continuously create consolidated and extruded material 1800. The entire process can happen in an inert argon atmosphere, potentially under a slightly positive pressure, to avoid oxidation of the feedstock 1122, 1142, stirred material 1700, and/or extruded material 1800 and/or to ensure safe operation.

FIGS. 40-63 show some exemplary geometries for distal end portion 1280 of an exemplary rotor 1200. Any of these geometries can used to aid the flow of stirred material 1700 through cavity 1900 to die 1500. The geometries at the distal end portion 1280 of rotor 1200 can cause additional mixing prior to extrusion and/or can generate additional pressure and/or temperature to ease the stirred material 1700 through the die. Distal end portion 1280 can include and/or define, e.g., nubs and/or protrusions, which can increase rotor 1200's mixing capability and/or can be used in composite material manufacturing to create a substantially uniform microstructure in the extruded material 1800. Rotor 1200 and/or container 1400 can have and/or define various geometric features, such as fins, flutes, flats, slots, threads, steps, nubs, buttons, and/or protrusions, on their exterior surfaces and/or interior surfaces.

As shown in FIGS. 64-84, container 1400 can have and/or define any of a wide variety of geometric features, which in some embodiments can define the shape of cavity 1900. For example, container 1400 can define steps and/or stairs, a smooth transition to the die, steps and/or transitions made of different materials, can be contained in a separate structure such as container housing 1440, a die 1500 contained in another structure such as die plate 1520, a die 1500 made of another material, a die 1500 attached to container 1400, a top portion of container 1400 made of another material, and/or compared to rotor 1200 and/or the remainder of container 1400, the cavity-facing inner surface 1420 of container 1400 can have a different material and/or texture, such as coated, polished, honed, ground, machined, sand blasted, shot peened, laser engraved, and/or hammered compared to another surface of container 1400 and/or a surface of rotor 1200, such as an exterior surface of semi-contained portion 1240, contained portion 1260, and/or distal end portion 1280. A smooth geometric transition in and/or on the cavity-facing interior surface of container 1400 and/or such an outer surface of rotor 1200 can be beneficial in processing monolithic feedstocks. Steps and/or stair features in and/or on the interior surface of container 1400, possibly created by forming container 1400 from multiple layers 1460, can increase material mixing capability. The shape and/or size transitions of container 1400 and/or rotor 1200 can avoid rotor breakage by distribution of the stress on rotor 1200. Container 1400 being directly in contact with feedstock 1122 and/or stirred material 1700 can provide high temperature stability such as when container 1400 and/or semi-contained portion 1240, contained portion 1260, and/or distal end portion 1280 of rotor 1200 is made from and/or coated with refractory metals and/or their alloys and/or ceramic materials, and even from those materials, alloys, solid-state solutions, and/or composites that lack toughness. In such cases, the cavity-facing inner surface 1420 of container 1400 can be coated with and/or contained in a tougher material. In certain exemplary embodiments, the material of container 1400, semi-contained portion 1240, contained portion 1260, distal end portion 1280, and/or feedstock(s) 1122, 1142 can be paired to reduce or increase friction between them due to adhesive nature of their materials to each other. The texture and/or roughness of one or more cavity-facing interior surfaces 1420 of container 1400, semi-contained portion 1240, contained portion 1260, and/or distal end portion 1280 can be configured to increase and/or decrease the friction generated within cavity 1900 due to the ploughing nature of a harder material into softer materials. Similarly, the friction condition and/or coefficient can be modified using different materials and/or surface textures for container 1400, semi-contained portion 1240, contained portion 1260, and/or distal end portion 1280. Container 1400 can be manufactured with integral components such as feedport and/or die, or the die and/or feedport can be separate components configured to be attached to container 1400. In certain exemplary embodiments, all or any portion of rotor 1200, such as semi-contained portion 1240, contained portion 1260, and/or distal end portion 1280, and/or container 1400 can be made using one or more materials, such as tool steels, stainless steels, nickel alloys, cobalt alloys, tungsten alloys, rhenium alloys, and/or their composites, and/or carbide, nitrides, and/or oxides of various elements such as cubic boron nitride, silicon carbide, tungsten carbide, titanium carbide, titanium nitride, alumina, zirconia, etc., and/or coatings such as thermal spray coatings, physical and or chemical vapor-deposited coatings, including diamond-like carbon coatings, and/or titanium nitride, etc. Rotor 1200, semi-contained portion 1240, contained portion 1260, distal end portion 1280, and/or container 1400 can have one or more internal cooling arrangements such as cooling passages for any coolants and/or can be made of highly conductive material such as aluminum, copper, silver, and/or gold configured to enhance heat extraction, heat transfer, cooling, and/or heating, such as via resistive heating, inductive heating, convective heating, and/or infrared heating, etc.

Certain exemplary embodiments can be configured for feeding a solid feedstock of predetermined maximum length using an existing machine tool with a rotating spindle. In certain exemplary embodiments, such as shown in FIG. 6, a feeder frame 1670 can be constructed using two frame shafts and two frame bars. One end of a piston type push rod can be connected to the frame bars and the other end of the push rod can be free to move inside the feedport. One side of feeder frame 1670 can be attached to a reciprocating motion generation device through a load cell. The stroke length and/or speed of the reciprocating motion can be programmable. When the motion is created, the feeder frame 1670 can move one of push rod towards the container, and/or the other away from the container. The push rod moving away from the container can open the feedport opening. When the feedport opening is sufficiently opened, a solid feedstock rod can fall inside the feedport and/or the motion of feeder frame 1670 can be reversed. The push rod can move the feedstock towards the container, during which time the applied force on the feedstock can be measured by the load cell and/or a feeding rate can be calculated and/or recorded in a datalogging device in the control system. The reciprocating motion is illustrated as being created by linear electrical actuator, but the motion can be created by any actuation means such as, but not limited to, pneumatic and/or hydraulic actuators. In certain exemplary embodiments, when severe plastically deformed material, composite, consolidated powder, and/or solid-state alloyed material is generated and/or extruded, the extruded material and/or processed material can be deflected by a deflector to a predetermined direction.

In certain exemplary embodiments, a reversible container can be configured to be split into two halves, which can be aligned for reassembly using one or more alignment pins. The container can be made to split and/or separate in any orientation such as parallel, perpendicular, and/or at an angle to the rotational axis of the rotor. Having the ability to split and/or separate can allow access to the cavity and/or interior portion of the container for cleaning and/or fixing. Similarly, the ability for the rotor to be made of multiple materials and/or components can help optimize the manufacturing cost and/or performance.

In certain exemplary embodiments, the contained portion of the rotor can be generally frustum shaped and/or can have an approximately 0.5 mm to approximately 500 mm top diameter at the proximal end, and approximately 0 mm (i.e., a sharply pointed end) to approximately 490 mm diameter at the distal end, and/or approximately 1 mm to approximately 1000 mm in length, and/or can have a stepped spiral feature on its outer surface with an approximately 0.1 mm to 100 mm depth and/or an approximately 0.1 mm to approximately 100 mm pitch. The container can have an outside diameter of approximately 1 mm to 700 mm and/or an overall length of approximately 10 mm to 1000 mm.

Referring to FIGS. 20-29, from the perspective of drive 1300, adjacent to drive 1300 (which can include any spindle, coupling, gearbox, transmission, or other mechanism connecting a source of rotational and/or translational power to rotor 1200), in certain exemplary embodiments, rotor 1200 can define a proximal shoulder, shank, and/or non-contact portion 1210 configured to operatively connect to a spindle and/or drive shaft and/or configured to not operatively contact feedstock and/or stirred material. Adjacent to proximal non-contact portion 1210, rotor 1200 can define a proximal contact portion 1220 that can operatively contact feedstock and/or stirred material but not operatively enter container 1400. Adjacent to contact portion 1220, rotor 1200 can define a semi-contained portion 1240 configured to operatively enter and exit container 1400. Adjacent to semi-contact portion 1240, rotor 1200 can define a contained portion 1260 configured to operatively remain in container 1400. Adjacent to contained portion 1260, rotor 1200 can define a distal end portion 1280 configured to operatively interface with die 1500 to define a longitudinal cross-sectional shape of extruded material 1800.

Figure 69:
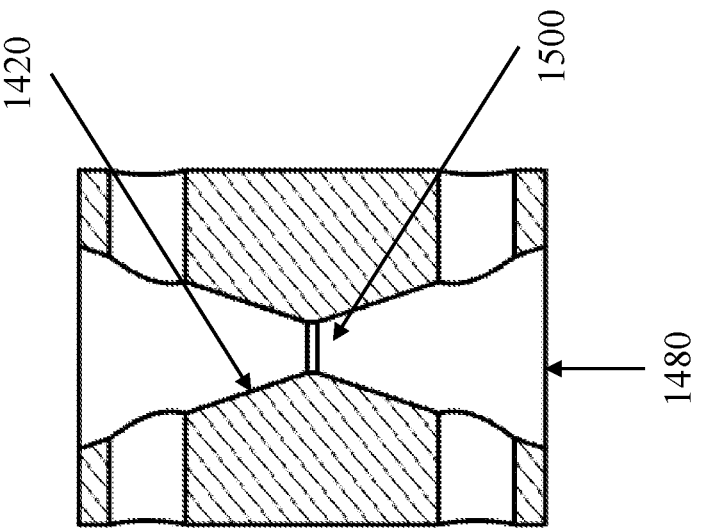
FIG. 69 is a cross-sectional view, taken at section B-B of FIG. 68, of an exemplary embodiment of a container 1400.
Figure 68:
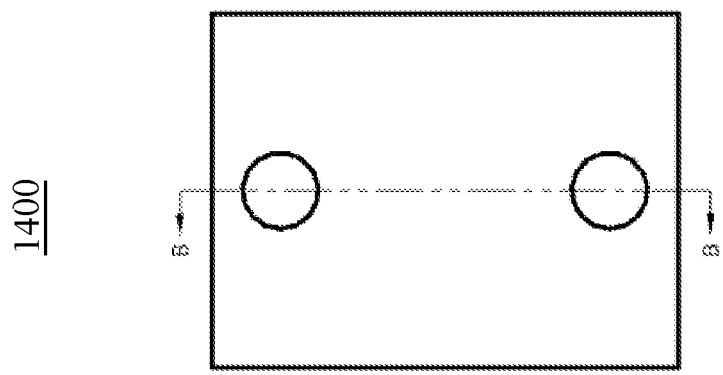
FIG. 68 is a side view of an exemplary embodiment of a container 1400.
Figure 67:
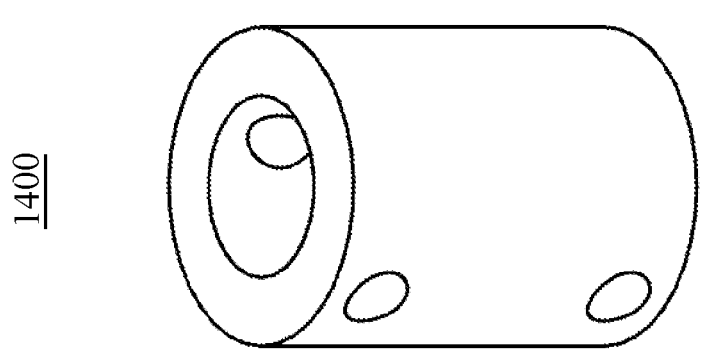
FIG. 67 is a perspective view of an exemplary embodiment of a container 1400.
Figure 72:
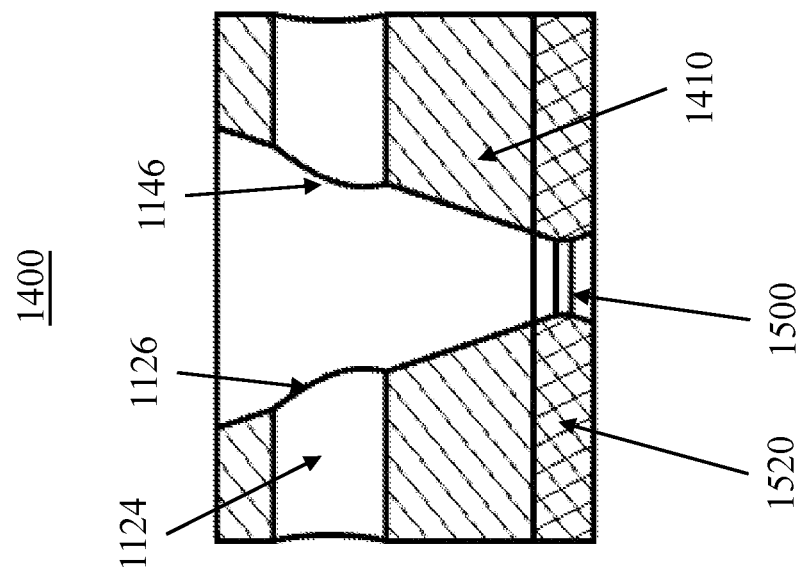
FIG. 72 is a cross-sectional view, taken at section B-B of FIG. 71, of an exemplary embodiment of a container 1400.
Figure 71:
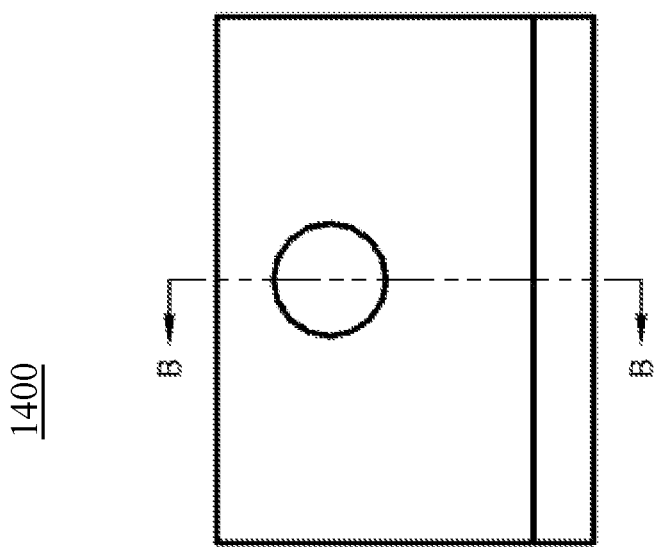
FIG. 71 is a side view of an exemplary embodiment of a container 1400.
Figure 70:
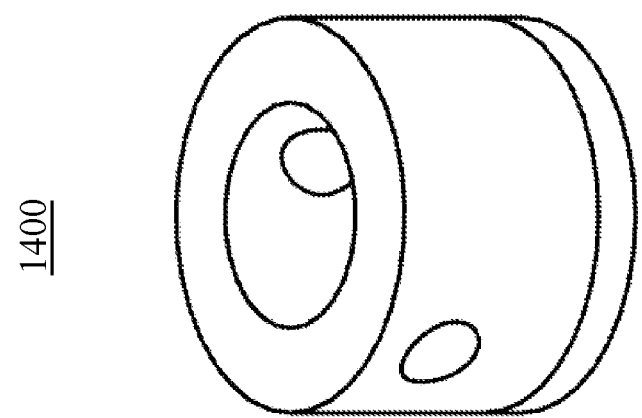
FIG. 70 is a perspective view of an exemplary embodiment of a container 1400.
Figure 75:
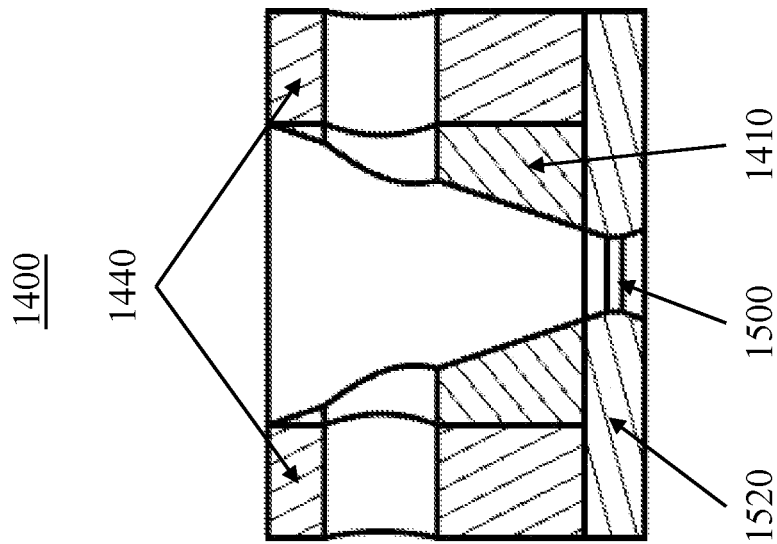
FIG. 75 is a cross-sectional view, taken at section B-B of FIG. 74, of an exemplary embodiment of a container 1400.
Figure 74:
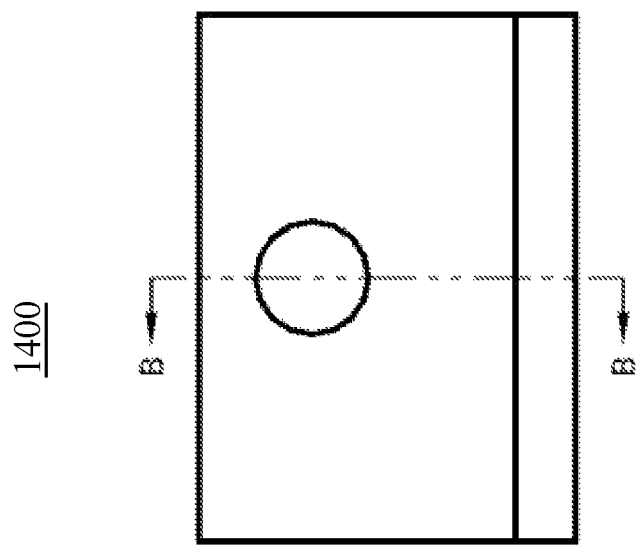
FIG. 74 is a side view of an exemplary embodiment of a container 1400.
Figure 73:
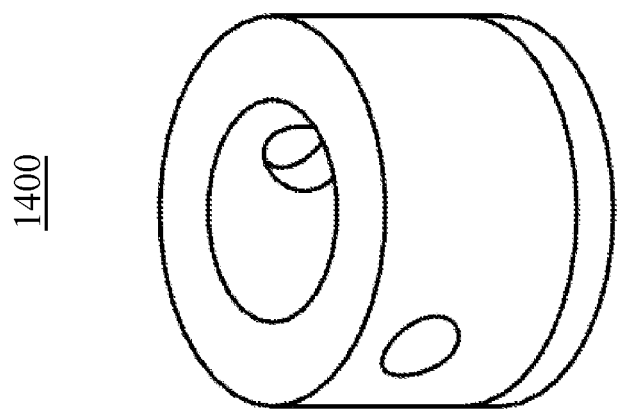
FIG. 73 is a perspective view of an exemplary embodiment of a container 1400.
Figure 78:
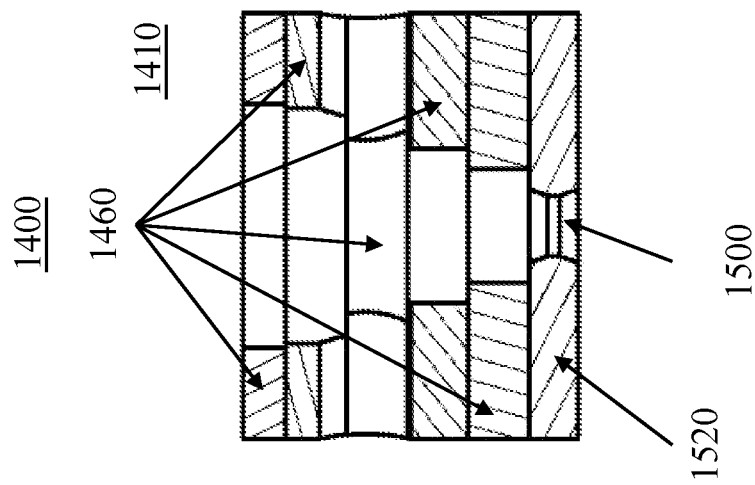
FIG. 78 is a cross-sectional view, taken at section B-B of FIG. 77, of an exemplary embodiment of a container 1400.
Figure 77:
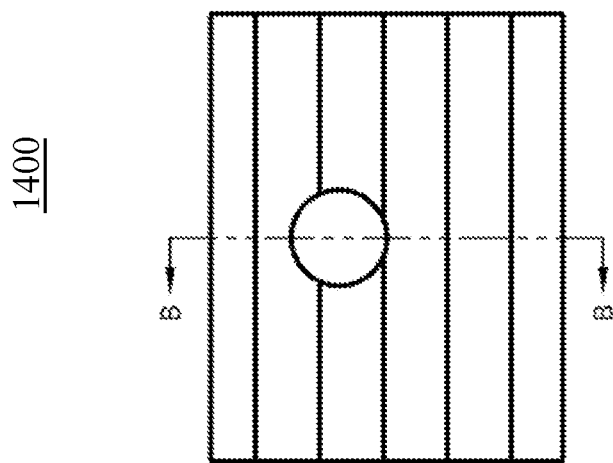
FIG. 77 is a side view of an exemplary embodiment of a container 1400.
Figure 76:
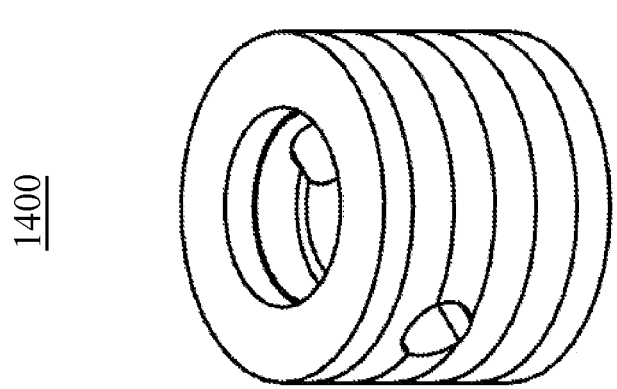
FIG. 76 is a perspective view of an exemplary embodiment of a container 1400.
Figure 81:
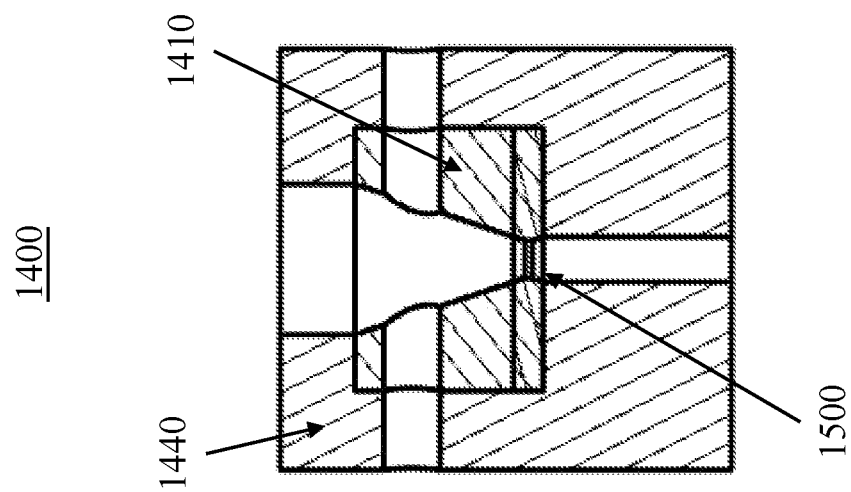
FIG. 81 is a cross-sectional view, taken at section B-B of FIG. 80, of an exemplary embodiment of a container 1400.
Figure 80:
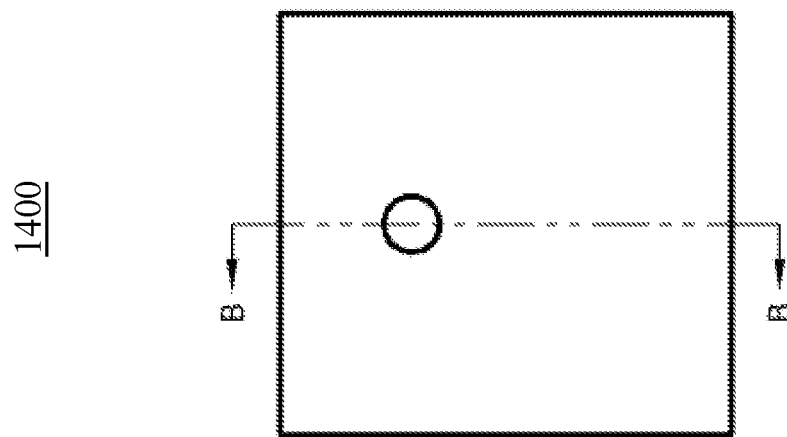
FIG. 80 is a side view of an exemplary embodiment of a container 1400.
Figure 79:
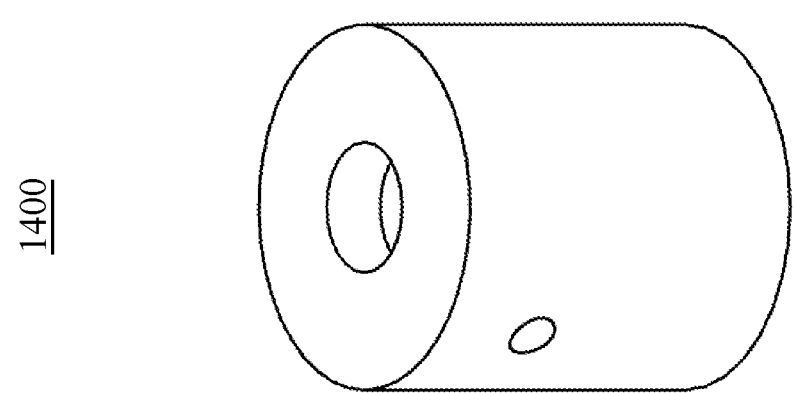
FIG. 79 is a perspective view of an exemplary embodiment of a container 1400.
Figure 84:
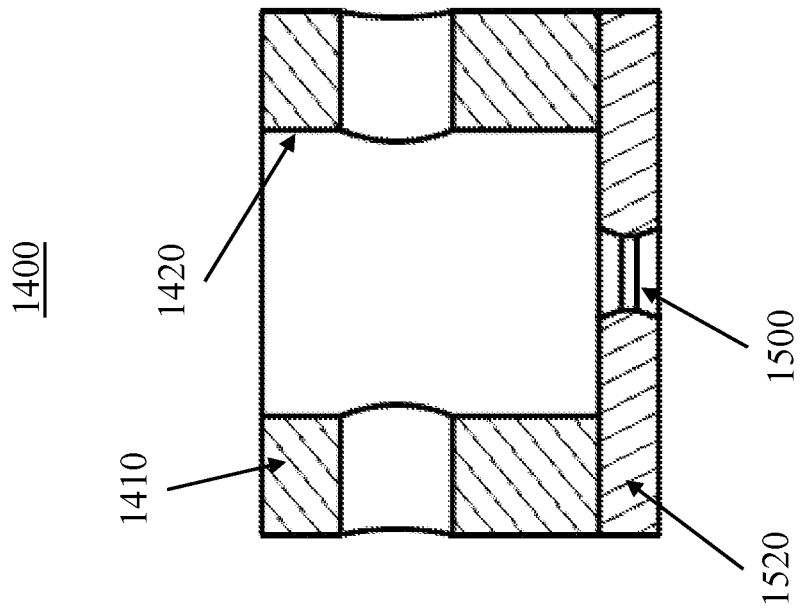
FIG. 84 is a cross-sectional view, taken at section B-B of FIG. 83, of an exemplary embodiment of a container 1400.
Figure 83:
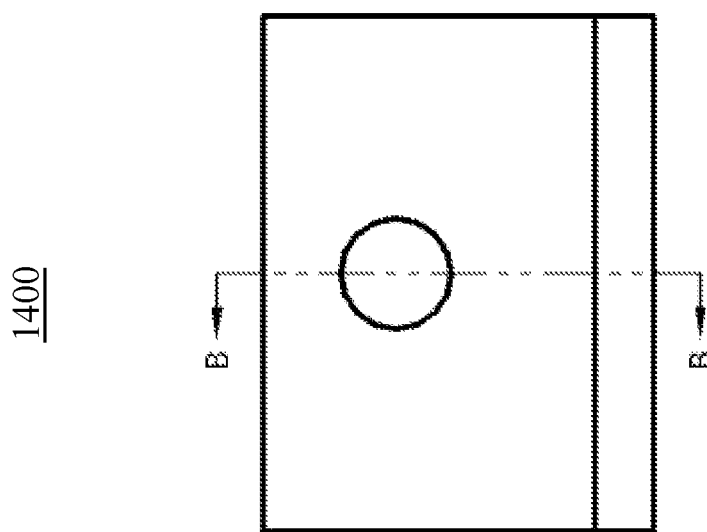
FIG. 83 is a side view of an exemplary embodiment of a container 1400.
Figure 82:
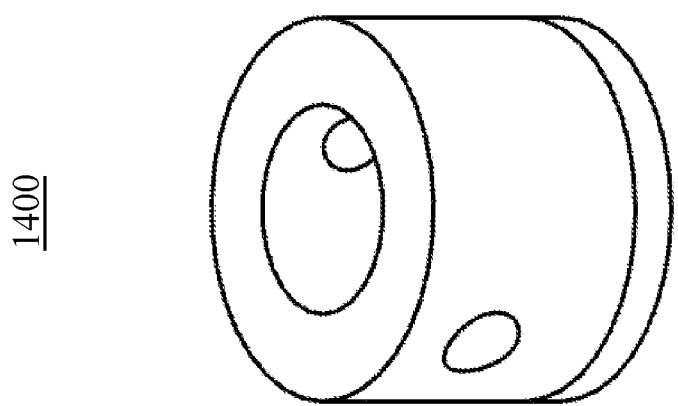
FIG. 82 is a perspective view of an exemplary embodiment of a container 1400.

As shown in FIGS. 67-69, container 1400 can be designed to be reversible, having two opposing internal cavities, e.g., one on the top and other in the bottom, each of which, by itself, can accommodate a rotor 1200. The dimensions of the cavities, which can be cooperative with rotor 1200, can be approximately 1 mm to 500 mm in internal diameter at the widest location and/or approximately 0.01 mm to 250 mm in internal diameter at the narrowest location. In certain exemplary embodiments, a passage can connect these two cavities, and/or this passage can act as a die during the operation. Cavity 1900 can be symmetric about the rotational axis of rotor 1200. Container 1400 can be symmetric about its mid-plane perpendicular to the rotation axis. This can allow container 1400 to be used from both sides of the die.

Rotor 1200 and/or container 1400 can be manufactured using a CNC machining and/or grinding operation. Rotor 1200 and/or container 1400 can be made of, e.g., H13 tool steel, which can be pre-annealed and/or heat treated after manufacturing using one or more heat treatment cycles involving solutionizing, air cooling, and/or tempering.

Figure 91:
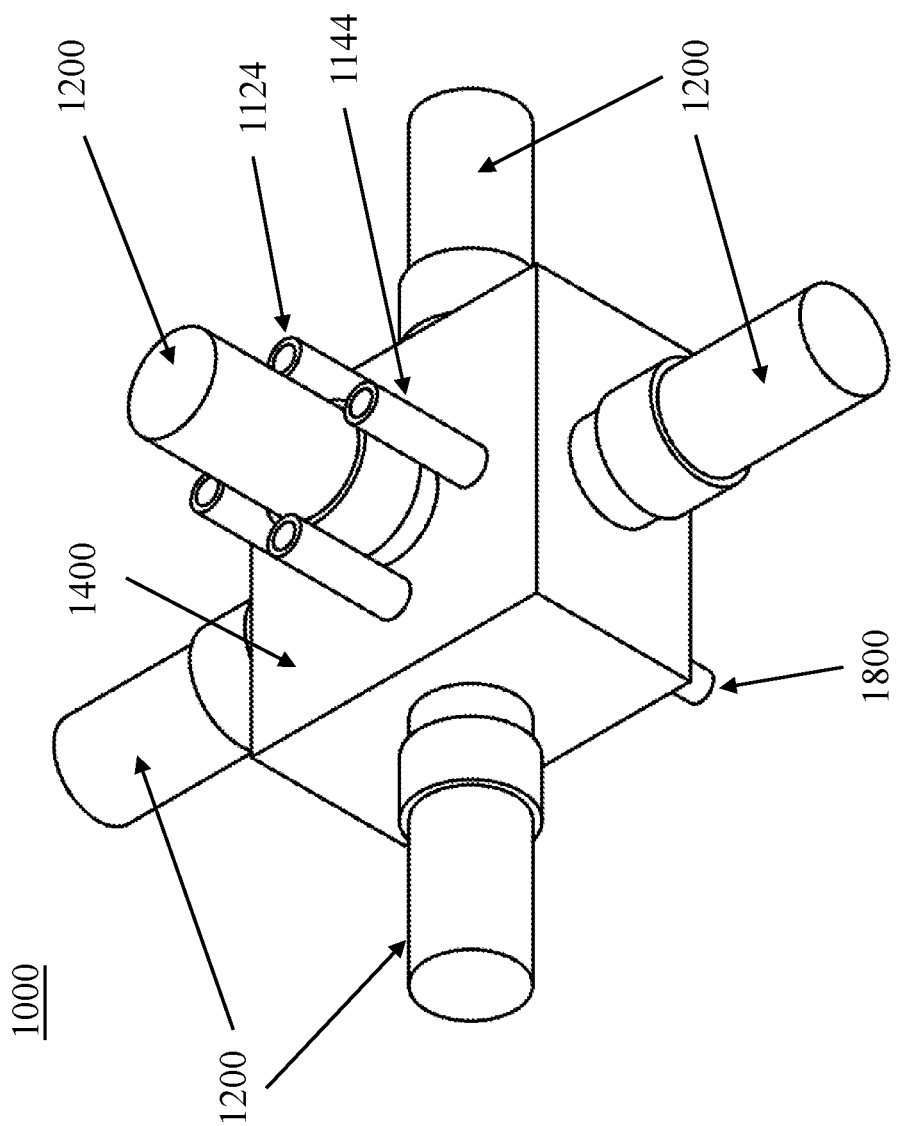
FIG. 91 is a perspective view of an exemplary embodiment of a machine 1000.
Figure 92:
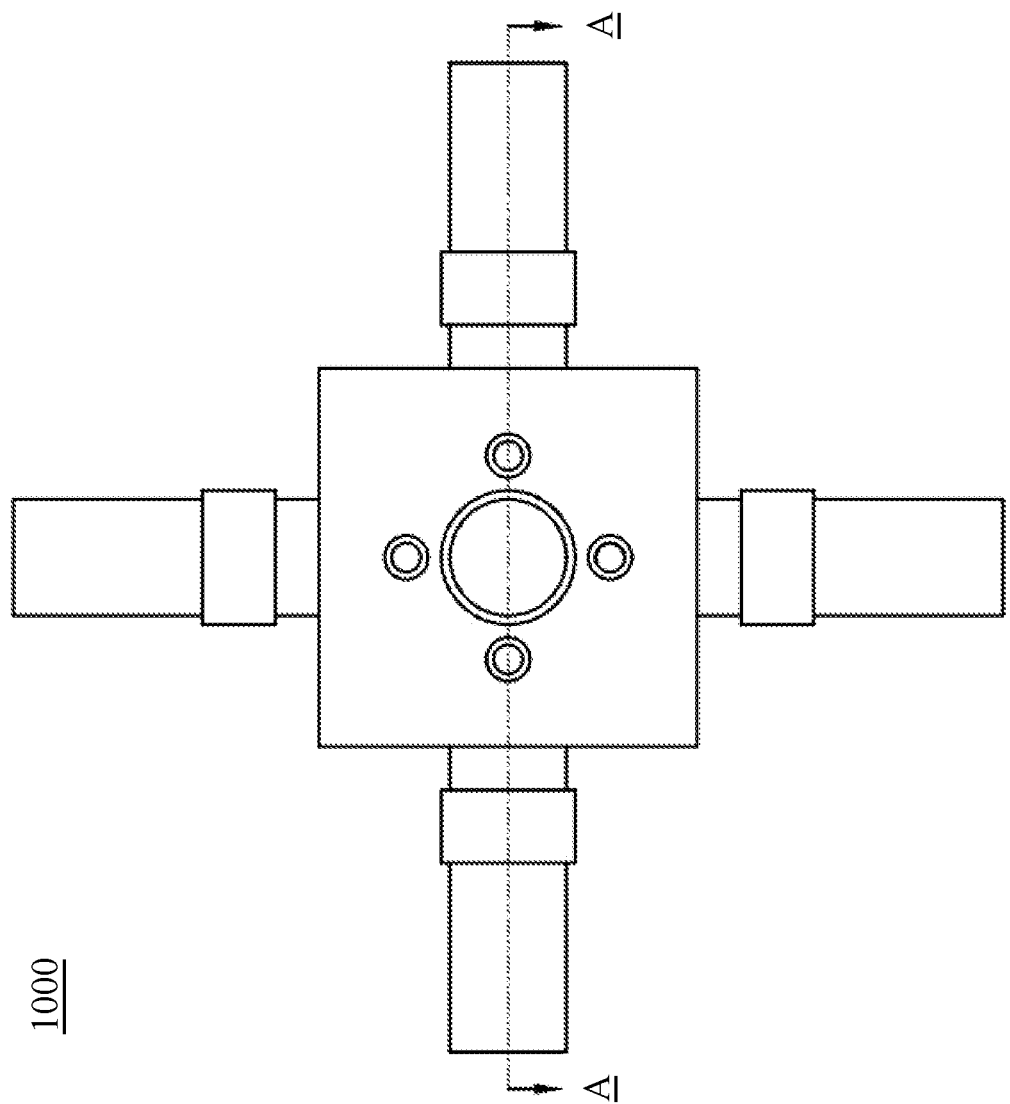
FIG. 92 is a top view of an exemplary embodiment of a machine 1000.
Figure 93:
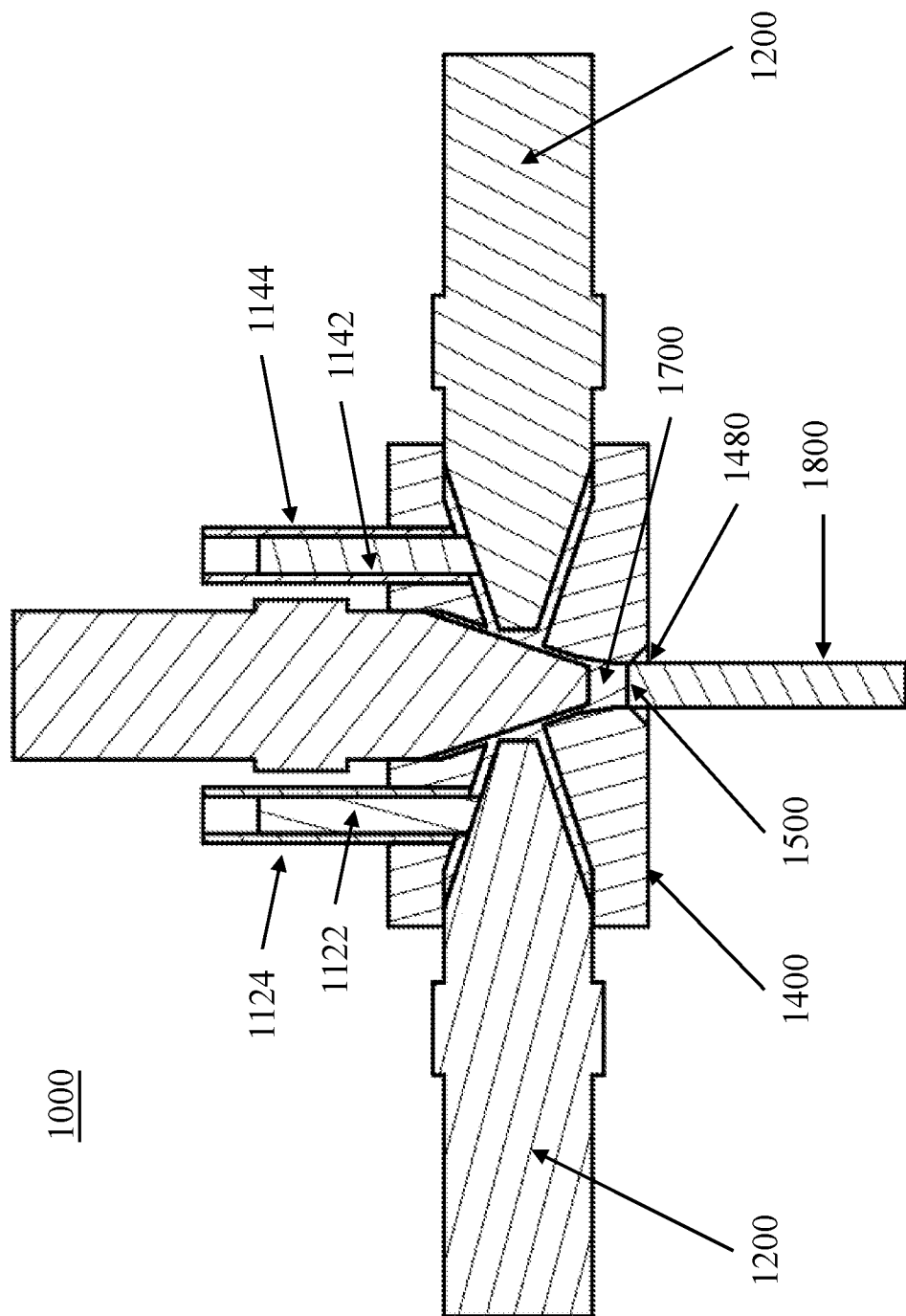
FIG. 93 is a cross-sectional view, taken at section A-A of FIG. 92, of an exemplary embodiment of a machine 1000.

As shown in FIGS. 91-93, certain exemplary embodiments of machine 1000 can utilize multiple rotors 1200 that each rotate within, and/or translate at least partially in and out of, a single common container 1400. In certain exemplary embodiments, a multi-rotor machine can utilize two opposing rotors, each having its own die, the extruded material from which leaves the container via a common exit. In certain exemplary embodiments, a multi-rotor machine can utilize a single common container within which can operate two opposing rotors, each opposing rotor fed by its own feedport and rotating within its own cavity. Stirred material can exit those cavities via a tube in one or more of the rotors, thereby allowing for back-extrusion through each such rotor.

As shown in FIGS. 91-93, certain exemplary embodiments of machine 1000 can provide for a single common container 1400 within which multiple rotors 1200 can operate. These rotors can, but need not, be opposing. For example, two rotors 1200 can oppose one another along a common first rotational axis, and another two rotors can oppose one another along a common second rotational axis that can be, e.g., coincident, non-coincident, parallel, non-parallel, angled, perpendicular, etc. with the common first rotational axis. A fifth rotor can rotate along a third rotational axis that can be, e.g., coincident, non-coincident, parallel, non-parallel, angled, and/or perpendicular, etc. with respect to the common first rotational axis and/or the common second rotational axis. Any number of feedstocks 1122, 1142 can be provided via any number of feedports 1124, 1144 to any number of cavities within which stirred material 1700 can be formed. Extruded material 1800 can pass through any number of dies 1500 and/or can leave the container via any number of container exits 1480.

Certain exemplary embodiments can be configured to extrude solid aluminum alloy filler feedstocks continuously. Feedstock can be fed using a piston mechanism that can be connected to a reciprocating linear motion-producing electrical cylinder. Certain exemplary embodiments can connect the reciprocating piston mechanism to the electrical cylinder. In this arrangement, the feedport ends can be rigidly mounted on to a fixture while the shaft of the feeder frame 1670 and/or push rod can slide freely through the fixture. In certain exemplary embodiments, solid feedstock can be loaded onto a cartridge.

Certain exemplary embodiments can provide for feeding similar feedstocks in any non-liquid form, such as granular materials, ball milled powders, chopped wires, and/or metal shavings etc., through one or multiple feedports and extruding through singular or multiple die exit to continuously produce severe plastically deformed processed material, microstructurally refined materials, and/or billets, such as via the following process steps:

Certain exemplary embodiments can provide for feeding dissimilar feedstocks in any non-liquid form through one or multiple feedports and/or extruding through singular and/or multiple die exit to continuously produce composite materials, solid-state alloys, in-situ composites, and/or in-situ alloys.

The desired rotation speed, translation distance, speed of rotor, and/or feedstock feed rate can be controlled through a control system. Based on the measured forces, torques, and/or temperatures, process parameters such as rotation speed, translation speed, and/or feedstock feed rate can be varied. In certain exemplary embodiments, the parameters can be fed to the control system through a human-machine interface, such as to a computer and/or corresponding software program. The control system can communicate with the drive, spindle, and/or feeding drive units while monitoring and/or recording, e.g., the position of rotor 1200, the temperature of container 1400, and/or the temperature and/or flowrate of extruded material 1800, forces on the spindle and/or feeding system, spindle torque, speed of rotation, and/or translation distance and/or rate of change of the speed of rotor 1200 and/or feedstock, etc. Additional capabilities such as but not limited to cooling, heating, and/or energy recovery and/or recycling units can be added to the system.

Figure 85:
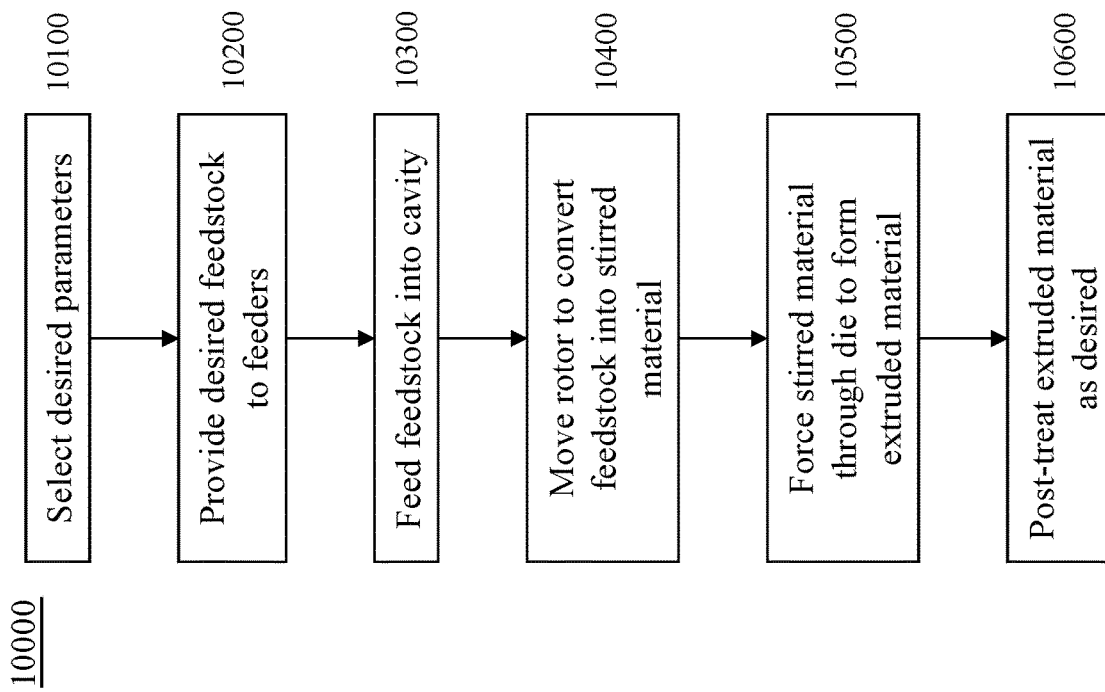
FIG. 85 is a block flow diagram of an exemplary embodiment of a process 10000.

Referring to FIG. 85, certain exemplary embodiments can provide a process and/or method 10000, which can comprise any of the following activities:

At activity 10100, desired component parameters (e.g., types of, e.g., feeders, rotors, containers, and/or dies; sizes and dimensions; materials; properties; etc.), feedstock parameters (e.g., shape, form, and/or properties of feedstocks), extruded material parameters (e.g., shape, form, and/or properties of extruded material), and/or process parameters (e.g., feedstock flowrates, rotational speed, translation speed, translation distance, feed pressure, and/or cavity temperature, etc.) can be selected;

At activity 10200, each desired feedstock can be provided to a corresponding feeder;

At activity 10300, feedstock can be fed into the cavity;

At activity 10400, while monitoring, adjusting, and/or controlling process parameters, the rotor can be moved (e.g., rotated and/or translated) to convert and/or process the feedstock(s) into a stirred material, e.g., via severe plastic deformation, chemical reaction, alloying, compositing, bonding, consolidating, melting, segregation, partitioning, precipitating, etc.);

At activity 10500, the stirred material can be forced through a die, such as via forward extrusion and/or back-extrusion, to form extruded material; and/or At activity 10600, the extruded material can be post-treated and/or post-processed (via e.g., cutting to length, stretching, drawing, cooling, heating, 3-D printing, depositing, bonding, heat treating, pickling, anodizing, galvanizing, oxidizing, machining, finishing, coating, painting, insulating, magnetizing, marking, re-processing, recycling, assembling, packaging, etc.) as desired.

In certain exemplary embodiments, parameters (e.g., feedstocks, process variables, etc.) can be varied and/or controlled to impart a change in a property of extruded material 1800 along a longitudinal axis of that material. That is, there can be a difference in properties between an extruded material that exits die 1500 slightly before extruded material extruded from the same machine 1000, that later extruded material at least initially connected to the earlier extruded material as the later material is extruded from machine 1000.

In certain exemplary embodiments, the geometry of the contained portion 1260, the geometry of container inner surface 1420, the wiping mechanism, and/or the movement of rotor 1200 can be configured to cause stirred material to advance toward die 1500 in a manner that creates a steady state operating condition for machine 1000 that is defined by a positively-valued (i.e., non-zero) and uniform average flowrate of extruded material 1800 out of machine 1000, that average calculated over a predetermined time interval selected from a range of 1 second to 3 minutes, such as 2 seconds, 10 seconds, 20 seconds, 1 minute, 2 minutes, etc. Thus, at steady state, regardless of whether feedstock 1122, 1142 enters cavity 1900 continuously, intermittently, and/or cyclically, and/or whether rotor 1200 axially translates, reciprocates, and/or oscillates, and/or whether rotor 1200 radially wobbles, and/or rotor 1200 moves in any non-uniform manner during a smaller time interval, extruded material 1800 can flow continuously and/or uniformly from machine 1000 according to the just-described predetermined averaging technique. At steady state, the combined average flowrate of all extruded material 1800 from machine 1000 can be non-zero and equal to the combined average flowrate of all feedstocks entering cavity 1900, such that the steady state operating condition of machine 1000 can extend for a predetermined time ranging from 1 minute to 100 hours (or more).

Certain exemplary embodiments can provide a method for producing an extruded material from one or more feedstocks, the method comprising performing the activities of:

feeding a deformable solid-state first feedstock selected from the one or more feedstocks through a stationary first feedport and into a cavity defined between a rotor and an inner wall of a stationary container;

upon contacting the first feedstock with the rotor, without melting the first feedstock, creating a stirred material within the cavity via activities comprising plastically deforming the first feedstock;

continuously extruding the stirred material from the cavity through one or more dies to generate an extruded material;

during the feeding of the first feedstock into the cavity, wiping a portion of the stirred material from the rotor;

during the feeding of the first feedstock into the cavity, feeding a second feedstock selected from the one or more feedstocks through a stationary second feedport and into the cavity;

incorporating the second feedstock into the stirred material;

dividing the second feedstock;

within the cavity, reacting the second feedstock with the first feedstock;

metallurgically and seamlessly bonding the stirred material within the cavity;

consolidating the stirred material within the cavity;
causing the stirred material to undergo melting, segregation, partitioning, or precipitation;
depositing the extruded material onto a substrate;
bonding the extruded material to a substrate; and/or
during the plastically deforming activity, alloying the first feedstock with a second feedstock selected from the one or more feedstock;

wherein:
the rotor defines a rotational axis about which the rotor is configured to operatively rotate;
the rotor defines a contained portion that operatively remains within the container;
the first feedstock is fed through the stationary first feedport while the contained portion of the rotor is operatively rotating;
the contained portion has a generally conical frustum shape that defines a proximal end and a distal end, the proximal end located closer to a driven portion of the rotor than the distal end;
while the contained portion is operatively rotating:
a magnitude of an axial gap continuously changes across time, the axial gap measured along a first line extending in a predetermined perpetual cross-sectional plane that includes the rotational axis, the first line extending parallel to the rotational axis, the gap being the shortest distance, on the predetermined perpetual cross-sectional plane and along the first line, between (a) the exterior surface of the rotor and (b) a second line that extends in the predetermined perpetual cross-sectional plane, is perpendicular to the rotational axis, and intersects a centroid of an exit of the first feedport; and/or
a magnitude of a radial gap continuously changes across time, the radial gap measured along the second line and being the shortest distance, on the predetermined perpetual cross-sectional plane and along the second line, between the exterior of the rotor and the first line;
as viewed along the rotational axis from the distal end, a visible proximal perimeter of the rotor located proximal from the distal end is greater than a visible distal perimeter of the rotor located at the distal end;
said feeding activity occurs continuously, cyclically, and/or reciprocatingly;
said extruding activity comprises back-extruding the extruded material through the rotor;
the rotational axis is configured to operatively wobble while the rotor is rotating;
the rotor does not operatively effect the activity of feeding the first feedstock when the contained portion operatively translates along the rotational axis;
the contained portion is configured to operatively oscillate along the rotational axis;
the contained portion is configured to operatively reciprocate along the rotational axis;
the rotor is configured to operatively change the volume of the cavity while the rotor is operatively translating along the rotational axis of the rotor;
the rotor defines one or more fins, flutes, flats, slots, steps, stepped spirals, nubs, buttons, cutting edges, and/or protrusions;
the inner wall of the container defines one or more fins, flutes, flats, slots, steps, stepped spirals, nubs, buttons, cutting edges, and/or protrusions;
the first feedstock enters the cavity in direction non-parallel to the rotational axis;
the extruded material is extruded through the die in direction non-parallel to the rotational axis;
the rotor and the die are configured to cooperatively impose an elongated form onto the extruded material, the elongated form having an annular shape;
a composition of the extruded material varies along a longitudinal axis of the extruded material;
at least one property of the extruded material varies along a longitudinal axis of the extruded material;
at least one feedstock from the one or more feedstocks is in the form of particulates, powder, granules, machined chips, and/or swarfs;
at least one feedstock from the one or more feedstocks comprises a metal, alloy, ceramic, polymer, or glass;
the extruded material has the general form of a pipe, tube, wire, rod, sheet and or channel;
the extruded material has the form of a pipe or tube filled with a material other than the extruded material;
the extruded material comprises a pure metal, an alloy, and/or a composite; and/or
the extruded material has a microstructure defined by substantially uniform distribution of grain structure and one or more secondary phases;

Certain exemplary embodiments can provide a method for producing an extruded material from one or more feedstocks, the method comprising performing the activities of:
feeding a deformable solid-state first feedstock selected from the one or more feedstocks through a stationary first feedport and into a cavity defined between a rotor and an inner wall of a stationary container;
upon contacting the first feedstock with the rotor, without melting the first feedstock, creating a stirred material within the cavity via activities comprising plastically deforming the first feedstock; and/or
continuously extruding the stirred material from the cavity through one or more dies to generate an extruded material;

wherein:
the rotor defines a rotational axis about which the rotor is configured to operatively rotate;
a contained portion of the rotor is configured to operatively remain within the container while operatively translating along the rotational axis;
the first feedstock is fed through the stationary first feedport while the contained portion is operatively rotating;
the rotor defines a semi-contained portion located immediately adjacent to the contained portion;
the rotor defines a contained perimeter located in a plane that is oriented perpendicularly to the rotational axis and that separates the contained portion from the semi-contained portion;
the semi-contained portion operatively enters and exits the container;
the feeding activity is operatively halted when the semi-contained portion begins entering the container;
the contained portion has a generally conical frustum shape that defines a proximal end and a distal end, the proximal end located closer to a driven portion of the rotor than the distal end;
while the contained portion is operatively rotating and translating:

a magnitude of an axial gap continuously changes across time, the axial gap measured along a first line extending in a predetermined perpetual cross-sectional plane that includes the rotational axis, the first line extending parallel to the rotational axis, the gap being the shortest distance, on the predetermined perpetual cross-sectional plane and along the first line, between (a) the exterior surface of the rotor and (b) a second line that extends in the predetermined perpetual cross-sectional plane, is perpendicular to the rotational axis, and intersects a centroid of an exit of the first feedport; and/or a magnitude of a radial gap continuously changes across time, the radial gap measured along the second line and being the shortest distance, on the predetermined perpetual cross-sectional plane and along the second line, between the exterior of the rotor and the first line; and/or as viewed along the rotational axis from the distal end, a visible proximal perimeter of the rotor located proximal from the distal end is greater than a visible distal perimeter of the rotor located at the distal end.

Certain exemplary embodiments can provide a machine configured for producing an extruded material from one or more feedstocks, the machine comprising:

a feedstock feeder that operatively feeds a deformable solid-state first feedstock selected from the one or more feedstocks through a stationary first feedport and into a cavity defined between a rotating rotor and an inner wall of a stationary container;

a rotor that, upon contacting the first feedstock with the rotating rotor and without melting the first feedstock, operatively creates an unmelted stirred material within the cavity via activities comprising plastically deforming the first feedstock;

a translatable feeder frame connected to the container and configured to operatively translate the one or more dies into a predetermined relative position with respect to a 3D printing bed; and/or a 3D printing bed that operatively translates into a predetermined relative position with respect to the one or more dies;

wherein:

the rotor defines a rotational axis about which the rotor is configured to operatively rotate;

a contained portion of the rotor is configured to operatively remain within the container while operatively translating along the rotational axis;

the first feedstock is fed through the stationary first feedport while the contained portion is operatively rotating;

the rotor defines a semi-contained portion located immediately adjacent to the contained portion;

the rotor defines a contained perimeter located in a plane that is oriented perpendicularly to the rotational axis and that separates the contained portion from the semi-contained portion;

the semi-contained portion operatively enters and exits the container;

the machine operatively halts feeding the first feedstock when the semi-contained portion begins entering the container;

the contained perimeter is greater than a terminal perimeter located at a non-driven terminal end of the rotor;

the rotor has a generally conical frustum shape;

while the contained portion is operatively rotating and/or translating:

a magnitude of an axial gap continuously changes across time, the axial gap measured along a first line extending in a predetermined perpetual cross-sectional plane that includes the rotational axis, the first line extending parallel to the rotational axis, the gap being the shortest distance, on the predetermined perpetual cross-sectional plane and along the first line, between (a) the exterior surface of the rotor and (b) a second line that extends in the predetermined perpetual cross-sectional plane, is perpendicular to the rotational axis, and intersects a centroid of an exit of the first feedport; and/or a magnitude of a radial gap continuously changes across time, the radial gap measured along the second line and being the shortest distance, on the predetermined perpetual cross-sectional plane and along the second line, between the exterior of the rotor and the first line;

as viewed along the rotational axis from the distal end, a visible proximal perimeter of the rotor located proximal from the distal end is greater than a visible distal perimeter of the rotor located at the distal end; and/or while the first feedstock is plastically deformed, a microstructure of the first feedstock is changed.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

3D—three dimensional, that is, characterized by dimensions, such as width, depth, and height, measured along each of three mutually orthogonal axes.

3D print—to make parts and/or products using a computer-driven, additive process, one layer at a time using plastic, metal, and other materials directly from CAD drawings that have been cross sectioned into thousands of layers.

a—at least one.

about—around and/or approximately.

above—at a higher level.

across—from one side, point, and/or moment to another.

activity—an action, act, step, and/or process or portion thereof.

adapt—to design, make, set up, arrange, shape, configure, and/or make suitable and/or fit for a specific purpose, function, use, and/or situation.

adapter—a device used to effect operative compatibility between different parts of one or more pieces of an apparatus or system.

adjacent—in close proximity to, near, next to, close, and/or contiguous;
adjoining; and/or neighboring.
after—following in time and/or subsequent to.
alloy—(v.) to unify, join, and/or form an amalgam and/or alloy; (n.) a metallic solid and/or liquid that is composed of a homogeneous mixture of two or more metals or of metals and nonmetal and/or metalloid elements, usually for the purpose of imparting and/or increasing specific characteristics and/or properties; and/or a union, possessing metallic properties of two or more metallic elements or of nonmetallic element(s) and metallic elements(s) which are not pure compounds and which are miscible with each other, which at least to a certain extent when molten forms a more or less homogeneous liquid having a metallic matrix and which does not separate into distinct layers when solid. Such combinations when solidified from a melt may consist of mechanical mixtures, entectics, entectoids, solid solutions, or in part of chemical compounds one or more of which may exist at the same time.
along—through, on, beside, over, in line with, and/or parallel to the length and/or direction of; and/or from one end to the other of.
an—at least one.
and—in conjunction with.
and/or—either in conjunction with or in alternative to.
annular—shaped like a ring.
any—one, some, every, and/or all without specification.
apparatus—an appliance or device for a particular purpose.
approximately—about and/or nearly the same as.
are—to exist.
around—about, surrounding, and/or on substantially all sides of; and/or approximately.
as long as—if and/or since.
associate—to join, connect together, and/or relate.
at—in, on, and/or near.
at least—not less than, and possibly more than.
at least one—not less than one, and possibly more than one.
away—on a path directed from a predetermined location.
axial—located on, around, or in the direction of an axis.
axis—a straight line about which a body and/or geometric object rotates and/or can be conceived to rotate and/or a center line to which parts of a structure and/or body can be referred.
bed—a machine base on which a moving part carrying a tool and/or workpiece slides.
begin—to start.
between—in a separating interval and/or intermediate to.
bond—to attach and/or fasten things together.
button—a volume of material attached to a surface by bonding and/or fastener.
by—via and/or with the use and/or help of.
can—is capable of, in at least some embodiments.
cause—to bring about, provoke, precipitate, produce, elicit, be the reason for, result in, and/or effect.
cavity—a hollow area defined within an object and/or a passageway between objects
centroid—the center of mass of an object of uniform density and/or a geometric figure; and/or the point whose coordinates are the mean values of the coordinates of the points of a geometric figure and/or set.
ceramic—any of various hard, brittle, heat-resistant, and corrosion-resistant materials made by shaping and then firing a nonmetallic mineral, such as clay, at a high temperature, and/or the nonmetallic mineral from which such materials can be formed, such as, for example, silica, silicon carbide, alumina, zirconium oxide, and/or fused silica, calcium sulfate, luminescent optical ceramics, bio-ceramics, and/or plaster, etc.
change—(v.) to alter, modify, and/or cause to be different; (n.) the act, process, and/or result of altering and/or modifying.
channel—(v) to cause to flow via a defined passage, conduit, and/or groove adapted to convey one or more fluids. (n) a passage, conduit, and/or groove adapted to convey one or more fluids.
closer—physically nearer.
closest—physically nearest.
component—a distinct constituent element and/or part; and/or one of a set of two or more vectors having a sum equal to a given vector.
composite—made of diverse materials, each of which is identifiable, at least in part, in the final product.
composition—a composition of matter and/or an aggregate, mixture, reaction product, and/or result of combining two or more substances.
composition of matter—a combination, reaction product, compound, mixture, formulation, material, and/or composite formed by a human and/or automation from two or more substances and/or elements.
comprising—including but not limited to.
conceive—to imagine, conceptualize, form, and/or develop in the mind.
configure—to design, arrange, set up, shape, and/or make suitable and/or fit for a specific purpose, function, use, and/or situation.
conical—of, relating to, or shaped like a cone.
connect—to join or fasten together.
consolidate—to form into a compact mass.
contact—to touch.
contain—to, at least partially retain, restrain, and/or hold and/or keep within limits.
container—something that, at least partially, holds, carries, and/or encloses one or more items for transport, storage, and/or protection, etc.
containing—including but not limited to.
continuously—in a manner uninterrupted in time, sequence, substance, and/or extent.
convert—to transform, adapt, and/or change.
cooperatively—in concert.
corresponding—related, associated, accompanying, similar in purpose and/or position, conforming in every respect, and/or equivalent and/or agreeing in amount, quantity, magnitude, quality, and/or degree.
couplable—capable of being joined, connected, and/or linked together.
coupling—linking in some fashion.
cross-section—a section formed by a plane cutting through an object, usually at a right angle to an axis.
create—to make, form, produce, generate, bring into being, and/or cause to exist.
cut—to penetrate with a sharp edge; to strike a narrow opening in; to separate from a main body; detach; and/or to form by penetrating.
cycle—an interval of time during which a characteristic, often regularly repeated event, and/or sequence of events occurs.
cyclical—of, relating to, and/or characterized by cycles.
define—to establish the meaning, relationship, outline, form, and/or structure of; and/or to precisely and/or distinctly describe and/or specify.

deform—to alter a shape of something by pressure and/or stress.
deposit—to lay down, leave, and/or place.
derive—to receive, obtain, and/or produce from a source and/or origin.
determine—to find out, obtain, calculate, decide, deduce, ascertain, and/or come to a decision, typically by investigation, reasoning, and/or calculation.
device—a machine, manufacture, and/or collection thereof.
die—a device that defines one or more holes through which plastic, metal, and/or other ductile and/or flowable material is extruded and/or drawn.
dimension—an extension in a given direction and/or a measurement in length, width, or thickness.
direction—a spatial relation between something and a course along which it points and/or moves; a distance independent relationship between two points in space that specifies the position of either with respect to the other; and/or a relationship by which the alignment and/or orientation of any position with respect to any other position is established.
distinct—discrete and/or readily distinguishable from all others.
distribution—a spatial array.
divide—to separate and/or segregate.
does not—fails to perform in a predetermined manner.
driven—powered, operated, and/or controlled.
during—at some time in a time interval.
each—every one of a group considered individually.
edge—a border at which a surface terminates.
effect—to provoke, elicit, cause, bring into existence, to bring about, and/or to produce as a result.
effective—sufficient to bring about, provoke, elicit, and/or cause.
elongated—drawn out, made spatially longer, and/or having more length than width.
embodiment—an implementation, manifestation, and/or concrete representation.
end—an extremity and its vicinity of something that has length; a terminus.
enter—to come and/or flow into.
equal—substantially the same as.
estimate—(n) a calculated value approximating an actual value; (v) to calculate and/or determine approximately and/or tentatively.
exemplary—serving as an example, instance, and/or illustration.
exit—(v) to leave and/or flow out of; (n) a passage, opening, and/or way out.
extend—to reach spatially outward and/or to move out and/or away from.
exterior—substantially non-interior; and/or a region that is outside of a device and/or system.
extrude—to shape by forcing through a die.
feed—to introduce, deliver, and/or cause to flow toward and/or into, such as to an operation.
feeder—a device that moves material to an operation.
feedstock—a raw material used in the manufacture of a product.
fill—to introduce a filling to a container during operation.
fin—a relatively thin projecting rib and/or ridge.
first—an initial element in a set.
flat—a flat surface and/or part.
flute—a elongated groove.
for—with a purpose of.
form—(v) to produce, make, compose, construct, build, generate, and/or create; (n) a phase, structure, and/or appearance.
frame—a structure adapted to support and/or contain something.
from—used to indicate a source, origin, and/or location thereof.
frustum—the part of a three-dimensional object, such as a cone or
pyramid (which can be substantially solid or hollow), located between two parallel planes cutting the object, especially the section between the base and a plane parallel to the base.
further—in addition.
gap—a space between objects.
generally—popularly; widely; usually; for the most part; without reference to particular instances or details; and/or not specifically.
generate—to create, produce, give rise to, and/or bring into existence.
glass—an inorganic product: (a) the constituents of which generally include a glass former (e.g., $As_2O_3$, $B_2O_3$ $GeO_2$, $P_2O_5$, $SiO_2$, $V_2O_5$) that has an essential characteristic of creating and/or maintaining, singly, or in a mixture, that type of structural disorder characteristic of a glassy condition, other oxides that approach glass forming properties (e.g., $Al_2O_3$, BeO, PbO, $Sb_2O_3$ $TiO_2$, ZnO and $ZrO_2$), as well as oxides that are practically devoid of glass forming tendencies (e.g., BaO, CaO, $K_2O$, $Li_2O$, MgO, $Na_2O$ and SrO), however, pure and modified silica, silicon and slag are also included; (b) formed by fusion and cooled to a rigid condition generally without crystallization; (c) having no definite melting point (whereby the mass has the characteristic of passing through a plastic state before reaching a liquid state when heated); (d) incapable in the solid state of permanent deformation; and (e) that which fractures when subject to deformation tension.
grain structure—arrangement of crystals and/or components.
greater—larger, higher, and/or more than.
halt—to stop, discontinue, and/or fully impede motion in a predetermined and/or principle direction.
having—possessing, characterized by, comprising, and/or including but not limited to.
immediately—with no object and/or space intervening.
impose—to bring about by authority and/or force.
including—including but not limited to.
incorporate—to cause to comprise.
initialize—to prepare something for use and/or some future event.
inner—closer than another to the center and/or middle.
install—to connect, set in position, and/or prepare for use.
into—to a condition, state, or form of, and/or toward, in the direction of, and/or to the inside of.
is—to exist in actuality.
less than—having a measurably smaller magnitude and/or degree as compared to something else.
line—a straight one-dimensional geometrical element of infinite length whose identity is determined by two points.
located—situated approximately in a particular spot and/or position.
longitudinal—of and/or relating to a length; placed and/or running lengthwise.

longitudinal axis—a straight line defined parallel to an object's length and passing through a centroid of the object.

machine—a device and/or assembly adapted to perform at least one task.

magnitude—a number assigned to a quantity so that it can be compared with other quantities.

material—a substance and/or composition.

may—is allowed and/or permitted to, in at least some embodiments.

measure—to determine, as a dimension, quantification, and/or capacity, etc., by observation.

melt—to be changed from a solid to a liquid state, especially by the application of heat.

metal—any of a category of electropositive elements that usually have a shiny surface, are generally good conductors of heat and electricity, and can be melted or fused, hammered into thin sheets, or drawn into wires; an element that is not designated a nonmetal, i.e., not H, B, C, Si, N, P, O, S, Se, Te, a halogen (i.e., F, Cl, Br, I, At,), or a noble gas (i.e., He, Ne, Ar, Kr, Xe, Rn).

metallurgical—of or relating to the science that deals with procedures used in extracting metals from their ores, purifying and alloying metals, creating useful objects from metals, and the study of metals and/or their properties in bulk and/or at the atomic level.

method—one or more acts that are performed upon subject matter to be transformed to a different state or thing and/or are tied to a particular apparatus, said one or more acts not a fundamental principal and not pre-empting all uses of a fundamental principal.

microstructure—a structure on a microscopic scale, such as under magnification of 50× or greater.

more—a quantifier meaning greater in size, amount, extent, and/or degree.

no—an absence of and/or lacking any.

non-driven—not driven.

non-parallel—not parallel.

nub—a protuberance, knob, and/or projection.

occur—to take place.

one—being and/or amounting to a single unit, individual, and/or entire thing, item, and/or object.

onto—on top of; to a position on; upon.

operable—practicable and/or fit, ready, and/or configured to be put into its intended use and/or service.

operatively—in a manner able to function and/or to work.

or—a conjunction used to indicate alternatives, typically appearing only before the last item in a group of alternative items.

oscillate—to vibrate, swing back and forth with a steady, uninterrupted rhythm, and/or vary between alternate extremes, usually within a definable period of time.

other—a different and/or distinct entity and/or not the same as already mentioned and/or implied.

outer—farther than another from the center and/or middle.

outside—beyond a range, boundary, and/or limit; and/or not within.

particulate—minute separate particles that are handled as bulk and not as individual pieces.

partition—to divide and/or separate into parts.

per—for each and/or by means of.

perform—to begin, take action, do, fulfill, accomplish, carry out, and/or complete, such as in accordance with one or more criterion.

perimeter—the outer limits or boundary of an area.

perpendicular—intersecting at or forming substantially right angles.

perpetual—continuing, existing, and/or being so forever and/or for an indefinitely long time.

phase—a distinct state of matter characterized by homogeneous composition and properties and the possession of a clearly defined boundary pipe—A hollow cylinder or tube used to conduct a liquid, gas, or finely divided solid.

plane—a substantially flat surface and/or a surface containing all the straight lines that connect any arbitrarily-selected two points on it.

plastically—characterized by the capability of, and/or fact of, being shaped, reshaped, formed, and/or deformed.

plurality—the state of being plural and/or more than one.

point—(n.) a defined physical and/or logical location in at least a two-dimensional system and/or an element in a geometrically described set and/or a measurement or representation of a measurement having a time coordinate and a non-time coordinate. (v.) to aim and/or indicate a position and/or direction of.

polymer—a chemical compound and/or mixture of compounds formed by polymerization (a chemical reaction in which two or more molecules (often called "monomers") combine via covalent chemical bonds to form larger molecules that contain repeating structural units). Examples of polymers include ABS's, polyacetates, polyacrylics, alkyds, epoxies, fluorothermoplastics, liquid crystal polymers, nylons, styrene acrylonitriles, polybutylene terephthalates, polycarbonates, thermoplastic elastomers, polyketones, polypropylenes, polyethylenes, polystyrenes, PVC's, polyesters, polyurethanes, thermoplastic rubbers, and/or polyamides, etc.

port—an opening adapted for insertion and/or passage of a part and/or material.

portion—a visually and/or physically distinguishable part, component, section, percentage, ratio, and/or quantity that is less than a larger whole.

position—(n) a place and/or location, often relative to a reference point. (v) to place, locate, orient, and/or arrange.

pre-—a prefix that precedes an activity that has occurred beforehand and/or in advance.

precipitate—to separate a solid from a solution.

predetermine—to determine, decide, and/or establish in advance.

prevent—to hinder, avert, and/or keep from occurring.

prior—before and/or preceding in time or order.

probability—a quantitative representation of a likelihood of an occurrence.

produce—to create, manufacture, make, and/or generate via a physical effort.

product—something produced by human and/or mechanical effort.

project—to calculate, estimate, or predict.

property—a real, tangible, and/or intangible property.

protrusion—something that projects from an object and/or a surface.

provide—to furnish, supply, give, and/or make available.

pure—having a substantially homogeneous and/or uniform composition, not mixed, and/or substantially free of foreign substances.

radial—pertain to that (e.g., lines, bars, beams of light, etc.) that radiates and/or emanates from and/or converges to a common center and/or central point; arranged like the radii of a circle range—a measure of an extent of a set of values and/or an amount and/or extent of variation.

ratio—a relationship between two quantities expressed as a quotient of one divided by the other.

ray—a straight line extending from a point (also called half-line).

react—to cause (a substance or substances) to undergo a chemical reaction.

receive—to get as a signal, take, acquire, and/or obtain.

reciprocating—to move back and forth alternately.

recommend—to suggest, praise, commend, and/or endorse.

reduce—to make and/or become lesser and/or smaller.

relative—considered with reference to and/or in comparison to something else.

remain—to stay in substantially a same location, position, and/or state.

remove—to eliminate, remove, and/or delete, and/or to move from a place or position occupied.

repeat—to do again and/or perform again.

repeatedly—again and again; repetitively.

request—to express a desire for and/or ask for.

result—(n.) an outcome and/or consequence of a particular action, operation, and/or course; (v.) to cause an outcome and/or consequence of a particular action, operation, and/or course.

rod—an elongated structure having a cross-sections taken perpendicular to its longitudinal axis that are substantially elliptical and/or circular shaped, substantially uniform, and/or small in relation to its length.

rotate—to turn around an axis and/or center.

rotational—about and/or around an axis.

rotor—a rotating portion of a machine.

said—when used in a system or device claim, an article indicating a subsequent claim term that has been previously introduced.

seamless—not having and/or joined by a seam or seams and/or smoothly continuous and/or uniform in quality.

second—an element of a set that follows a first element.

secondary—second in an ordering.

section—a representation of a solid object as it would appear if cut by an intersecting plane, so that the internal structure is displayed.

segregate—to separate and/or space apart.

select—to make a choice or selection from alternatives.

semi—contained-partially contained.

separate—(n) distinct and/or not touching; (v) to disunite, space, set, or keep apart and/or to be positioned intermediate to.

set—a related plurality.

severe plastic deformation—the imposition of an average plastic shear strain in excess of 0.5 on feedstock under stress.

shape—(n.) a characteristic surface, outline, and/or contour of an entity; (v) to apply a characteristic surface, outline, and/or contour to an entity.

sheet—a broad, relatively thin, surface, layer, and/or covering having two parallel surfaces both dimensions of which are large in comparison with the third dimension.

slot—a channel, opening, and/or aperture having a longer length than a width of the opening.

solid-state—a material that is neither liquid nor gaseous, but instead of definite shape and/or form.

species—a class of individuals and/or objects grouped by virtue of their common attributes and assigned a common name; a division subordinate to a genus.

spiral—a path of a point in a plane moving around a central point while, on average, receding from or approaching it. When considering a spiral that generally recedes from the central point, for a given rotation about the central point, the spiral need not have a continuously increasing radius from the central point, however, each successive turn will have an increasing radius. Thus, a portion of a spiral can be linear and/or curvilinear.

stationary—substantially fixed with respect to an object of reference.

step—a ledge and/or offset.

stir—to move about actively and/or busily; to pass a material through, usually in circular motions, so as to mix or cool the material; and/or to use an implement to move or rearrange a material.

store—to place, hold, and/or retain data, typically in a memory.

substantially—to a great extent and/or degree.

substrate—an underlying material, surface, and/or layer.

support—to bear the weight of, especially from below.

surface—the face, exterior, and/or outer boundary of an object and/or a material layer constituting and/or resembling such a boundary.

system—a collection of mechanisms, devices, machines, articles of manufacture, processes, data, and/or instructions, the collection designed to perform one or more specific functions.

terminal—of, at, relating to, and/or forming a limit, boundary, extremity, and/or end.

that—used as the subject or object of a relative clause; a pronoun used to indicate a thing as indicated, mentioned before, present, and/or well known.

through—across, among, between, and/or in one side and out the opposite and/or another side of.

to—a preposition adapted for use for expressing purpose.

transform—to change in measurable: form, appearance, nature, and/or character.

translate—to move in a non-rotational manner and/or along a substantially linear path, which can include wobbling, oscillating, vibrating, and/or reciprocating.

transmit—to send as a signal, provide, furnish, and/or supply.

treatment—an act, manner, or method of handling and/or dealing with someone and/or something.

tube—a pipe, hollow cylinder, and/or hollow rodlike member consisting of a wall shaped in the form of a simple closed curve and extending axially, providing a conduit throughout its length wherein the wall might vary along its axial length in transverse dimensions and/or shape; and/or an elongate member having a longitudinal axis and defining a longitudinal cross-section resembling any closed shape such as, for example, a circle, a non-circle such as an oval (which generally can include a shape that is substantially in the form of an obround, ellipse, limaçon, cardioid, cartesian oval, and/or Cassini oval, etc.), and/or a polygon such as a triangle, rectangle, square, hexagon, the shape of the letter "D", the shape of the letter "P", etc. Thus, a right circular cylinder is one form of a tube, an elliptic cylinder is another form of a tube having an elliptical longitudinal cross-section, and a generalized cylinder is yet another form of a tube.

undergo—to experience and/or be subjected to.

uniform—relatively homogenous.
unmelted—not melted.
upon—immediately or very soon after; and/or on the occasion of.
use—to put into service.
varies—changes over time.
via—by way of, with, and/or utilizing.
view—to look at, observe, gaze upon, examine, inspect, watch, study, and/or consider.
volume—a mass and/or a three-dimensional region that an object and/or substance occupies.
wall—a partition, structure, and/or mass that serves to enclose, divide, separate, segregate, define, and/or protect a volume.
weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.
when—at a time and/or during the time at which.
wherein—in regard to which; and; and/or in addition to.
which—a pronoun adapted to be used in clauses to represent a specified antecedent.
wipe—to rub, pass over, spread, smear, dislocate, move, remove, and/or urge away from.
wire—an electrically conductive metallic strand and/or rod, wherein all the diameters of the cross-sectional area taken at right angles to its length are of substantially the same dimension, and the cross-sectional area is small enough to allow substantial flexibility and/or resiliency and permit bending and/or flexing without substantial metal flow. A wire can be stranded, cored, coated, and/or covered.
with—accompanied by.
with regard to—about, regarding, relative to, and/or in relation to.
with respect to—about, regarding, relative to, and/or in relation to.
within—inside the limits of.
without—not accompanied by and/or lacking.
wobble—to move and/or rotate with an uneven and/or rocking motion and/or unsteadily from side to side.
zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:
any two or more described substances can be mixed, combined, reacted, separated, and/or segregated;
any described characteristic, function, activity, substance, component, and/or structural element, or any combination thereof, can be specifically included, duplicated, excluded, combined, reordered, reconfigured, integrated, and/or segregated;
any described interrelationship, sequence, and/or dependence between any described characteristics, functions, activities, substances, components, and/or structural elements can be omitted, changed, varied, and/or reordered;
any described activity can be performed manually, semi-automatically, and/or automatically;
any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112 (f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A method for producing an extruded material from one or more feedstocks, the method comprising performing the activities of:
   feeding a solid-state first feedstock selected from the one or more feedstocks through a first feedport and into a cavity defined between a rotor and an inner wall of a stationary container;
   upon contacting the first feedstock with the rotor, creating a stirred material within the cavity via activities comprising plastically deforming the first feedstock;
   via a container protrusion, wiping a portion of the stirred material from the rotor; and
   continuously extruding the stirred material from the cavity through a die to generate an extruded material;
   wherein:
      the rotor defines a rotational axis about which the rotor is configured to operatively rotate;
      the rotor defines a contained portion that operatively remains within the container;
      the first feedstock is fed through the first feedport while the contained portion of the rotor is operatively rotating;
      the contained portion has a generally conical frustum shape that defines a proximal end and a distal end, the proximal end located closer to a driven portion of the rotor than the distal end;
      while the contained portion is operatively rotating:
         a magnitude of an axial gap continuously changes across time, the axial gap measured along a first line extending in a predetermined perpetual cross-sectional plane that includes the rotational axis, the first line extending parallel to the rotational axis, the gap being the shortest distance, on the predetermined perpetual cross-sectional plane and along the first line, between (a) the exterior surface of the rotor and (b) a second line that extends in the predetermined perpetual cross-sectional plane, is perpendicular to the rotational axis, and intersects a centroid of an exit of the first feedport; and
         a magnitude of a radial gap continuously changes across time, the radial gap measured along the second line and being the shortest distance, on the predetermined perpetual cross-sectional plane and along the second line, between the exterior of the rotor and the first line; and
      as viewed along the rotational axis from the distal end, a visible proximal perimeter of the rotor located proximal from the distal end is greater than a visible distal perimeter of the rotor located at the distal end.

2. The method of claim 1, wherein:
the wiping of the portion of the stirred material from the rotor occurs during the feeding of the first feedstock into the cavity.

3. The method of claim 1, further comprising:
during the feeding of the first feedstock into the cavity, feeding a second feedstock selected from the one or more feedstocks through a second feedport and into the cavity.

4. The method of claim 1, further comprising:
during the feeding of the first feedstock into the cavity, feeding a second feedstock selected from the one or more feedstocks through a second feedport and into the cavity; and
incorporating the second feedstock into the stirred material.

5. The method of claim 1, further comprising:
during the feeding of the first feedstock into the cavity, feeding a second feedstock selected from the one or more feedstocks through a second feedport and into the cavity;
dividing the second feedstock; and
incorporating the second feedstock into the stirred material.

6. The method of claim 1, further comprising:
during the feeding of the first feedstock into the cavity, feeding a second feedstock selected from the one or more feedstocks through a second feedport and into the cavity; and
within the cavity, reacting the second feedstock with the first feedstock.

7. The method of claim 1, further comprising:
metallurgically and seamlessly bonding or consolidating the stirred material within the cavity.

8. The method of claim 1, further comprising:
causing the stirred material to undergo melting, segregation, partitioning, or precipitation.

9. The method of claim 1, further comprising:
depositing the extruded material onto a substrate.

10. The method of claim 1, further comprising:
during the plastically deforming activity, alloying the first feedstock with a second feedstock selected from the one or more feedstocks.

11. The method of claim 1, wherein:
said feeding activity occurs continuously.

12. The method of claim 1, wherein:
said feeding activity occurs cyclically.

13. The method of claim 1, wherein:
said extruding activity comprises back-extruding the extruded material through the rotor.

14. The method of claim 1, wherein:
the rotor does not operatively effect the activity of feeding the first feedstock when the contained portion operatively translates along the rotational axis.

15. The method of claim 1, wherein:
the rotor is configured to operatively change the volume of the cavity while the rotor is operatively translating along the rotational axis of the rotor.

16. The method of claim 1, wherein:
the rotor defines one or more fins, flutes, flats, slots, steps, stepped spirals, nubs, buttons, cutting edges, and/or protrusions.

17. The method of claim 1, wherein:
the container defines one or more fins, flutes, flats, slots, steps, stepped spirals, nubs, buttons, cutting edges, and/or protrusions.

18. The method of claim 1, wherein:
the first feedstock enters the cavity in direction non-parallel to the rotational axis.

19. The method of claim 1, wherein:
the extruded material is extruded through the die in direction non-parallel to the rotational axis.

20. The method of claim 1, wherein:
the rotor and the die are configured to cooperatively impose an elongated form onto the extruded material, the elongated form having an annular shape.

21. The method of claim 1, wherein:
a composition of the extruded material varies along a longitudinal axis of the extruded material.

22. The method of claim 1, wherein:
at least one feedstock from the one or more feedstocks is in the form of particulates, powder, granules, machined chips, and/or swarfs.

23. The method of claim 1, wherein:
at least one feedstock from the one or more feedstocks comprises a metal, alloy, ceramic, polymer, or glass.

24. The method of claim 1, wherein:
the extruded material has the form of a pipe or tube filled with a material other than the extruded material.

25. The method of claim 1, wherein:
the extruded material comprises a pure metal, an alloy, and/or a composite.

26. The method of claim 1, wherein:
the extruded material has a microstructure defined by substantially uniform distribution of grain structure and one or more secondary phases.

27. The method of claim 1, wherein:
the die is integral to the container.

28. The method of claim 1, wherein:
the die is non-integral to the container.

29. The method of claim 1, wherein:
the container is operatively fixed to a platform and/or frame.

30. The method of claim 1, wherein:
the container defines one or more cavity-facing and/or externally-facing stirred material flow control features.

31. The method of claim 1, wherein:
the rotor defines one or more stirred material flow control features.

32. The method of claim 1, wherein:
the activities are performed in an inert atmosphere.

33. The method of claim 1, further comprising:
forming a 3D printed component from the extruded material.

34. The method of claim 1, further comprising:
depositing extruded material onto a substrate to form deposited material.

35. The method of claim 1, further comprising:
deforming the substrate or previously deposited material via movement of the rotor and/or extruded material.

36. The method of claim 1, further comprising:
heating the substrate or previously deposited material via movement of the rotor and/or extruded material.

37. The method of claim 1, further comprising:
creating metallurgical bonding between the extruded material and a substrate.

38. The method of claim 1, further comprising:
creating bonding between the extruded material and a substrate.

39. The method of claim 1, further comprising:
creating bonding between the extruded material and a previously extruded material.

40. The method of claim 1, further comprising:
creating metallurgical bonding between the extruded material and previously extruded material.

41. The method of claim 1, further comprising:
creating bonding between the extruded material and previously extruded material.

42. The method of claim 1, further comprising:
cooling the rotor, container, and/or extruded material.

43. The method of claim 1, further comprising:
heating the rotor, container, and/or extruded material.

44. The method of claim 1, further comprising:
recovering heat energy dissipated through the rotor and/or container.

45. A method for producing an extruded material from one or more feedstocks, the method comprising performing the activities of:
feeding a deformable solid-state first feedstock selected from the one or more feedstocks through a first feedport and into a cavity defined between a rotor and an inner wall of a stationary container;
upon contacting the first feedstock with the rotor, creating a stirred material within the cavity via activities comprising plastically deforming the first feedstock;

via a container protrusion, wiping a portion of the stirred material from the rotor; and
continuously extruding the stirred material from the cavity through a die to generate an extruded material;
wherein:
the rotor defines a rotational axis about which the rotor is configured to operatively rotate;
the rotor defines a contained portion that operatively remains within the container;
the first feedstock is fed through the stationary first feedport while the contained portion of the rotor is operatively rotating;
the contained portion has a generally conical frustum shape that defines a proximal end and a distal end, the proximal end located closer to a driven portion of the rotor than the distal end;
while the contained portion is operatively rotating:
a magnitude of an axial gap continuously changes across time, the axial gap measured along a first line extending in a predetermined perpetual cross-sectional plane that includes the rotational axis, the first line extending parallel to the rotational axis, the gap being the shortest distance, on the predetermined perpetual cross-sectional plane and along the first line, between (a) the exterior surface of the rotor and (b) a second line that extends in the predetermined perpetual cross-sectional plane, is perpendicular to the rotational axis, and intersects a centroid of an exit of the first feedport; or
a magnitude of a radial gap continuously changes across time, the radial gap measured along the second line and being the shortest distance, on the predetermined perpetual cross-sectional plane and along the second line, between the exterior of the rotor and the first line; and
as viewed along the rotational axis from the distal end, a visible proximal perimeter of the rotor located proximal from the distal end is greater than a visible distal perimeter of the rotor located at the distal end.

46. A method for producing an extruded material from one or more feedstocks, the method comprising performing the activities of:
feeding a deformable solid-state first feedstock selected from the one or more feedstocks through a first feedport and into a cavity defined between a rotor and an inner wall of a stationary container;
upon contacting the first feedstock with the rotor, creating a stirred material within the cavity via activities comprising plastically deforming the first feedstock;
via a container protrusion, wiping a portion of the stirred material from the rotor; and
continuously extruding the stirred material from the cavity through one or more dies to generate an extruded material;
wherein:
the rotor defines a rotational axis about which the rotor operatively rotates and along which the rotor is operatively translates;
a contained portion of the rotor is configured to operatively remain within the container while operatively translating along the rotational axis;
the first feedstock is fed through the first feedport while the contained portion is operatively rotating about the rotational axis and/or translating along to the rotational axis;
the rotor defines a semi-contained portion located immediately adjacent to the contained portion;

the rotor defines a contained perimeter located in a plane that is oriented perpendicularly to the rotational axis and that separates the contained portion from the semi-contained portion;
the semi-contained portion operatively enters and exits the container;
the feeding activity is operatively halted when the semi-contained portion begins entering the container;
the contained portion has a generally conical frustum shape that defines a proximal end and a distal end, the proximal end located closer to a driven portion of the rotor than the distal end;
while the contained portion is operatively rotating about the rotational axis and operatively translating along the rotational axis:
a magnitude of an axial gap continuously changes across time, the axial gap measured along a first line extending in a predetermined perpetual cross-sectional plane that includes the rotational axis, the first line extending parallel to the rotational axis, the gap being the shortest distance, on the predetermined perpetual cross-sectional plane and along the first line, between (a) the exterior surface of the rotor and (b) a second line that extends in the predetermined perpetual cross-sectional plane, is perpendicular to the rotational axis, and intersects a centroid of an exit of the first feedport; and/or
a magnitude of a radial gap continuously changes across time, the radial gap measured along the second line and being the shortest distance, on the predetermined perpetual cross-sectional plane and along the second line, between the exterior of the rotor and the first line; and
as viewed along the rotational axis from the distal end, a visible proximal perimeter of the rotor located proximal from the distal end is greater than a visible distal perimeter of the rotor located at the distal end.

47. A method for producing an extruded material from one or more feedstocks, the method comprising performing the activities of:
feeding a deformable solid-state first feedstock selected from the one or more feedstocks through a first feedport and into a cavity defined between a rotor and an inner wall of a stationary container;
upon contacting the first feedstock with the rotor, creating a stirred material within the cavity via activities comprising plastically deforming the first feedstock;
via a container protrusion, wiping a portion of the stirred material from the rotor; and
continuously extruding the stirred material from the cavity through one or more dies to generate an extruded material;
wherein:
the rotor defines a rotational axis about which the rotor is configured to operatively rotate and/or along which the rotor is configured to operatively translate;
a contained portion of the rotor is configured to operatively remain within the container while operatively translating along the rotational axis;
the first feedstock is fed through the first feedport while the contained portion is operatively rotating about the rotational axis and/or operatively translating along the rotational axis;
the rotor defines a semi-contained portion located immediately adjacent to the contained portion;

the rotor defines a contained perimeter located in a plane that is oriented perpendicularly to the rotational axis and that separates the contained portion from the semi-contained portion;

the semi-contained portion operatively enters and exits the container;

the feeding activity is operatively halted when the semi-contained portion begins entering the container;

the contained portion has a generally conical frustum shape that defines a proximal end and a distal end, the proximal end located closer to a driven portion of the rotor than the distal end;

while the contained portion is operatively translating:
  a magnitude of an axial gap continuously changes across time, the axial gap measured along a first line extending in a predetermined perpetual cross-sectional plane that includes the rotational axis, the first line extending parallel to the rotational axis, the gap being the shortest distance, on the predetermined perpetual cross-sectional plane and along the first line, between (a) the exterior surface of the rotor and (b) a second line that extends in the predetermined perpetual cross-sectional plane, is perpendicular to the rotational axis, and intersects a centroid of an exit of the first feedport; and/or
  a magnitude of a radial gap continuously changes across time, the radial gap measured along the second line and being the shortest distance, on the predetermined perpetual cross-sectional plane and along the second line, between the exterior of the rotor and the first line; and as viewed along the rotational axis from the distal end, a visible proximal perimeter of the rotor located proximal from the distal end is greater than a visible distal perimeter of the rotor located at the distal end.

48. A machine configured for producing an extruded material from one or more feedstocks, the machine comprising:

a feedstock feeder that operatively feeds a deformable solid-state first feedstock selected from the one or more feedstocks through a first feedport and into a cavity defined between a rotating rotor and an inner wall of a stationary container;

a rotor that, upon contacting the first feedstock with the rotor operatively creates a stirred material within the cavity via activities comprising plastically deforming the first feedstock; and a container protrusion that operatively wipes a portion of the unmelted stirred material from the rotor;

wherein:
  the rotor defines a rotational axis about which the rotor is configured to operatively rotate and/or along which the rotor is configured to operatively translate;
  a contained portion of the rotor is configured to operatively remain within the container while operatively translating along the rotational axis;
  the first feedstock is fed through the first feedport while the contained portion is operatively rotating about the rotational axis and/or translating along the rotational axis;
  the rotor defines a semi-contained portion located immediately adjacent to the contained portion;
  the rotor defines a contained perimeter located in a plane that is oriented perpendicularly to the rotational axis and that separates the contained portion from the semi-contained portion;
  the semi-contained portion operatively enters and exits the container;
  the machine operatively halts feeding the first feedstock when the semi-contained portion begins entering the container;
  the contained perimeter is greater than a terminal perimeter located at a non-driven terminal end of the rotor;
  the rotor has a generally conical frustum shape;
  while the contained portion is operatively rotating about the rotational axis and/or translating along the rotational axis:
    a magnitude of an axial gap continuously changes across time, the axial gap measured along a first line extending in a predetermined perpetual cross-sectional plane that includes the rotational axis, the first line extending parallel to the rotational axis, the gap being the shortest distance, on the predetermined perpetual cross-sectional plane and along the first line, between (a) the exterior surface of the rotor and (b) a second line that extends in the predetermined perpetual cross-sectional plane, is perpendicular to the rotational axis, and intersects a centroid of an exit of the first feedport; and/or
    a magnitude of a radial gap continuously changes across time, the radial gap measured along the second line and being the shortest distance, on the predetermined perpetual cross-sectional plane and along the second line, between the exterior of the rotor and the first line;
  as viewed along the rotational axis from the distal end, a visible proximal perimeter of the rotor located proximal from the distal end is greater than a visible distal perimeter of the rotor located at the distal end; and
  while the first feedstock is plastically deformed, a microstructure of the first feedstock is changed.

49. The machine of claim 48, further comprising:
a translatable feeder frame connected to the container and configured to operatively feed a predetermined quantity of one or more of feedstocks through the first feedport and into the cavity.

50. The machine of claim 48, further comprising:
a 3D printing bed that operatively translates into a predetermined relative position with respect to the one or more dies.

51. The machine of claim 48, further comprising:
one or more cooling passages extending within the rotor and/or the container.

52. The machine of claim 48, wherein:
the rotor is operably attached to a rotary spindle of a machine tool.

* * * * *